US006952688B1

(12) United States Patent
Goldman et al.

(10) Patent No.: US 6,952,688 B1
(45) Date of Patent: Oct. 4, 2005

(54) KNOWLEDGE-ENGINEERING PROTOCOL-SUITE

(75) Inventors: Arnold J. Goldman, Jerusalem (IL); Joseph Fisher, Jerusalem (IL); Jehuda Hartman, Rehovot (IL); Shlomo Sarel, Ma'aleh Michmash (IL)

(73) Assignee: Insyst Ltd., Jerusalem (IL)

( * ) Notice: Subject to any disclaimer, the term of this patent is extended or adjusted under 35 U.S.C. 154(b) by 816 days.

(21) Appl. No.: 09/588,681

(22) Filed: Jun. 7, 2000

(30) Foreign Application Priority Data

Oct. 31, 1999 (IL) .................................... 132663

(51) Int. Cl.⁷ .............................................. G06N 5/00
(52) U.S. Cl. ........................................ 706/45; 706/47
(58) Field of Search .......................... 706/45; 455/411; 713/201

(56) References Cited

U.S. PATENT DOCUMENTS

| | | | |
|---|---|---|---|
| 4,970,658 A | | 11/1990 | Durbin et al. |
| 5,325,466 A | | 6/1994 | Kornacker |
| 5,414,812 A | * | 5/1995 | Filip et al. .............. 707/103 R |
| 5,414,833 A | * | 5/1995 | Hershey et al. .............. 713/201 |
| 5,440,478 A | | 8/1995 | Fisher et al. |
| 5,479,340 A | | 12/1995 | Fox et al. |
| 5,483,468 A | | 1/1996 | Chen et al. |
| 5,546,507 A | | 8/1996 | Staub |
| 5,550,896 A | * | 8/1996 | Chavez, Jr. .................. 455/411 |
| 5,787,425 A | | 7/1998 | Bigus |
| 5,862,054 A | | 1/1999 | Li |
| 5,875,285 A | | 2/1999 | Chang |
| 6,032,146 A | | 2/2000 | Chadha et al. |
| 6,073,138 A | | 6/2000 | de l'Etraz et al. |
| 6,134,555 A | | 10/2000 | Chadha et al. |
| 6,240,329 B1 | | 5/2001 | Sun |
| 6,249,712 B1 | | 6/2001 | Boiquaye |
| 6,263,255 B1 | | 7/2001 | Tan et al. |

FOREIGN PATENT DOCUMENTS

WO    WO00/00874    1/2000

OTHER PUBLICATIONS www.domainmgt.com/mtg/starfire/industry-specific-auto.htm, DOMAIN Manufacturing (Dec. 30, 1999).
Wysiwyg://414nttp:www.semy.com, "SEMY Engineering Homepage" (Dec, 30, 1999).
www.npl.com, HPL Corporation web pages. (Dec. 12, 1999).
www.tencor.com, KLA-Tencor Company Overview, (Dec. 12, 1999).

(Continued)

*Primary Examiner*—Wilbert L. Starks, Jr.

(57) ABSTRACT

A Knowledge-Engineering Protocol-Suite is presented that generally includes methods and systems, apparatus for search-space organizational validation, and appurtenances for use therewith. The protocol-suite includes a search-space organizational validation method for synergistically combining knowledge bases of disparate resolution data-sets, such as by actual or simulated integrating of lower resolution expert-experience based model-like templates to higher resolution empirical data-capture dense quantitative search-spaces. Furthermore, from alternative technological vantages, the suite relates to situations where this synergetic combining is beneficially accomplished, such as in control systems, command control systems, command control communications systems, computational apparatus associated with the aforesaid, and to quantitative modeling and measuring tools used therewith. The protocol-suite also includes facile algorithmic tools for use with the method and a process-modeling computer for use in a distributed asynchronous system of process modeling computers.

22 Claims, 25 Drawing Sheets

OTHER PUBLICATIONS www.triant.com, Triant Technologies, Inc. webpage, (Dec. 30, 1999).

www.ydyn.com, Yield Dynamics, Inc. webpage, (Dec. 12, 1999).

www.adventact.com, Adventa Control Technologies, Inc. webpages, (Dec. 12, 1999).

www.ObjectSpace.com, ObjectSpace webpages, (Dec. 12, 1999).

www.Knights.com, Knights Technology, Inc., webpages (Dec. 12, 1999).

Constuctivist Foundations of Modeling—A Kantian Perspective, Marco C. Bettoni, Internat. Journal of Intelligent Systems, vol. 12, No. 8, Aug. 1998, pp 577-595.

Knights Technology, Inc. at-a-Glance, http://www.knights.com/ktglance.htm [18 -pages].

Work in Progress: Visual Specification of Knowledge Bases, Gavrilova, et al http://www.csa.ru/Inst/gorb_dep/artific/IA/ben-last.htm [8-pages].

Object Space Solutions for a Connected World, http://www.ObjectsSpace.com/products/prodCatalyst.asp [11-pages].

Adventa Corporate Overview, http://www.adventact.com/corporat.htm [28 pages].

Domain Manufacturing, http://www.domainmfg.com/mfg/starfire/industry-specific-auto.htm [10 pages].

HPL Corporate http://www.hpl.com/Corporate/history.htm [6 pages].

SEMY Engineering Home Page http://www.semy.com [9 pages].

KLA-Tencor: Leading the Yield Management Market http://www.tencor.com [15 pages].

Yield Dynamics, Inc. http://www.ydyn.com/products/yield.htm [9 pages].

Triant Our Products http://www.triant.com/top.html [10 pages].

Artificial Intelligence and Manufacturing: A Research Planning Report, Leslie D. Interrante Aug. 8, 1997, http://sigmans.cs.umn.edu/sigmanwrk/report96.htm [34 pages].

On the Epistemology and Management of Electronic Design Automation Knowledge, Scott et al, http://www.azstarnet.com/šscottmc/medak/Epistermology.htm [17 pages].

Army Medical Knowledge Engineering System (AMKES) —A Three-Tier Knowledge Harvestig Environment, Merritt et al, Practical Applications of Java 1999 Conference Proceedings, http://amzi.harvard.net/articles/amkes_pajava99.htm [7 pages].

Final Model Business Case Report for the OSD CALS IWSDB Project, An MVP Joint Venture, ManTech International Corporation, Dec. 2, 1994, Kidwell et al., http://www2.dcnicn.com/cals/iwsdb/task07/html/a024/Fmodbus1.htm [77 pages].

Computer Aided Knowledge Engineering, British Steel, Mackenzie, http://www.cogsys.co.uk/cake/CAKE-TestSite-BS.htm [12 pages].

\* cited by examiner

KNOWLEDGE-ENGINEERING PROTOCOL-SUITE

GENERAL FIELD OF THE INVENTION

The present invention generally relates to knowledge-engineering, to search-space organizational validation therein, and to protocol-suites for use therewith.

More specifically, the present invention relates to synergistically combining knowledge bases of disparate resolution data-sets, such as by actual or simulated integrating of lower resolution expert-experience based model-like templates to higher resolution empirical data-capture dense quantitative search-spaces.

Furthermore, given the inherent interdisciplinary nature of the present invention, from alternative technological vantages, the present invention may also be understood to relate to knowledge-engineering embodiments where this synergetic combining is beneficially accomplished, such as in control systems, command control systems, command control communications systems, computational apparatus associated with the aforesaid, and to quantitative modeling and measuring tools used therewith. Equivalently, the present invention may be understood to relate to domains in which this synergetic combining is applied, such as design and fabrication of semiconductors, integrated circuits, medical treatment modalities, social engineering models, corporate management enterprise systems, transactional modifications for financial business practices, or substantially any other organized modality of practice or information; technological, bio-physical, mercantile, social, etc.

GENERAL BACKGROUND OF THE INVENTION

In the fields of knowledge-engineering, database management, modeling, simulation, and expert systems, one common problem relates to forming valid optimization strategies over domains having constituent data-sets of assorted characters.

In this context, data-sets of assorted characters relates to data-sets that differ with respect to data structure complexity, to data resolution, to data quantification, or to any combination thereof. Data structure complexity, data resolution, and data quantification may each relate to one-dimensional metrics or to multi-parametric characterizations.

In the context of the present document, data structure complexity, hereinafter "complexity", generally relates to local interconnectivity between a data element being characterized with respect to complexity and other data elements, and similarly global interconnectivity between any data-set, which includes this data element, and other data-sets. For example, a root node in a binary tree locally has two children branches of its own, and similarly may globally have many relationships that relate it to root nodes of other data structures.

In the context of the present document, data resolution, hereinafter "resolution", generally relates to an embedded relational concept wherein data-sets and proper data subsets are identified. The subset has a higher resolution than the superset, in that detailed data is placed in the subset while overview data is placed in the superset. For example, a superset may be a workflow overview organization, while subsets contain detailed charts of productivity measurements for each station in the workflow process.

In the context of the present document, data quantification, hereinafter "quantification", generally relates to a common sense notion of measurement precision. For example, in physics or chemistry it is common to measure a phenomenon to some known precision (e.g. velocity at mm/sec or pH to four decimal places), while in market surveys it is common to measure customer satisfaction using perhaps two to five select-only-one categories. While the average for a large number of surveyed customers may reach the same numerical precision as a physical measurement for a perhaps smaller number of samplings, nevertheless common sense still says that the physical measurement is a more realistic quantification than the survey result.

At the present juncture, it is necessary to appreciate that quantification disparities exist, and that known systems' design methodologies encourage relating data-sets of like quantification while they discourage relating data-sets of disparate quantification. Likewise, in a non-systems context, one could internally assign synthetic fractional quantification measures to semantic data-sets, and thereby presumably differentiate between their relative degrees of linguistic ambiguity, nomenclature variability, etc. However, synthetic fractional quantification measures used in a semantic environment would need to remain differentiated from quantification measures for their associated referents; at least so as to avoid semiotic symbol with referent confusions.

There are many examples of system-type problems related to forming valid optimization strategies over domains having constituent data-sets of assorted characters. According to one such example, there would be benefits if one could validly combine consumers' perceptions of fruit and vegetable quality with the agronomists' data capture universe; wherein is recorded precise measures of genetic makeup, growing conditions, biochemical variations, etc. According to another example, there would be benefits if one could validly combine demographic and actuarial databases with personal medical records and medical research data. Today, validly forming such strategies is a haphazard undertaking, of often-questionable objective value. More generally stated, there would be benefit if one could validly posit optimization strategies over domains having constituent data-sets of assorted characters; differing in complexity, resolution, and quantification.

Database management and knowledge-engineering represent a class of computer-implemented strategies for addressing such problems. Database management relates to organizational tools for establishing and maintaining data-sets of assorted character. For example, Boyce-Codd normal forms address tradeoff issues of efficiency and redundancy in very large purpose-specific data banks. However, database management does not address how to best benefit from knowledge that is held in these data banks.

Accordingly, there has arisen a discipline, currently called knowledge-engineering that attempts to generalize knowledge characterization strategies over heterogeneous domains having constituent data-sets of assorted characters; differing in complexity, resolution, and quantification. To date, knowledge-engineering's most significant contribution has been the semantic search engine, which has subtle embodiment variations called search robots, search agents, data mining tools, etc. While search engines have proved to be very versatile tools for data-sets dominated by semantic content, they have not yet evolved into methodologies that provide meaningful linkages with data-sets having quantified characters. Thus, the general need in the art remains to validly posit optimization strategies over domains having constituent data-sets of assorted characters; differing in complexity, resolution, and quantification.

A number of other classes of computer-implemented strategies are currently fashionable for addressing such problems. Examples of such strategies include modeling, expert systems, statistical process control, and neural networks. While each of these strategies has contributed some modest advance over its respective prior art, it is generally appreciated that these strategies are insufficiently modular to allow facile integration of new conceptualizations of ideas, which are brought into consideration by their implementation. Furthermore, the validity of the design process, which facilitates a computer implementation of any of these strategies, is often dependent on the level of genius of design team. Clearly, this is an inherent weakness, the alleviation of which would be of benefit in countless technological and econometric disciplines, especially if the method of alleviation is conceptually facile and straightforward for computerized implementation.

More specifically, a critical discussion of modeling, expert systems, statistical process control, and neural networks is forthcoming.

Modeling may be generally described as a low complexity topological graph describing node relations wherein each node corresponds to a data structure of empirical data. These nodes are homogeneously relating to a lower resolution and homogeneously relating to like quantification, while the associated data structures are disparately relating to higher resolution and to homogeneously like quantification within each data structure but not necessarily between data structures. The model is then used to simulate how the modeled system might react to a hypothetical perturbation of some of the empirical data.

Typically, modeling is applied in situations where there are many variables having complex interactions, especially where some of these interactions must be described using non-linear equations or using random variation functional components. Modeling is also applied in situations where visualizations, of the variables and their interactions, are believed to contribute to understanding aspects of the system being modeled.

Conceptually, the simplest models posit a pair-wise functional relationship between variables, such that each variable is a node of the topological graph and the pair-wise relationship describes the low complexity. The higher resolution data-sets then are used to describe an empirical manifold in the multi-dimensional space, as described by the pair-wise functionally orthogonal variables. Ordinary algebra, calculus, or statistics is then applied to simulate hypothetical empirical situations.

Conceptually, a more complex class of models posits multivariate functional relationship between assorted combinatorial groupings (n-tuples) of variables, wherein the aggregate of relationships join all of the variables into a single topological graph. Somewhat like the simpler models, higher resolution data-sets then are used to describe an empirical manifold for each relationship between the assorted combinatorial groupings of variables. Integrating a relational rule set with ordinary algebra, calculus, or statistics then allows hypothetical empirical situations to be simulated.

Conceptually, a most complex class of models posits embedding of either or both of the above described models within nodes of the more complex class of models. The designing and integrating of relational rules then becomes a cumbersome task that depends on the level of genius of design team, especially for computer implementations. Likewise, the classes of hypothetical empirical situations to be simulated are generally limited by the structure of the design.

In order to escape from this type of limitation, a tedious class of modeling tools called expert systems has been developed. Conceptually, expert systems shift the focus of the simulation from the empirical data manifolds to the designing and integrating of relational rules. Since it is presumed that the experts have subsumed the empirical manifolds, simulating hypothetical empirical situations at the manifold level is replaced by simulating a higher complexity topological graph describing node relations. Expert systems then become a most complex class of models that are critically limited by the structure of their design. Methodologically, the only way to improve an expert system is by implementing a longitudinal study of interviewing experts and integrating their changes of mind and mood.

Another class of modeling tools, called process control models, has been developed. Here, the complexity of functional relationships between variables is grouped as a single node for each station in a process, and the topological graph of node relationships is according to the complexity of the process being modeled. Furthermore, each station in the process is internally amenable to any of the above modeling methodologies including expert systems, albeit as constrained by the inputs and outputs for each station. Independently, the overall process is likewise amenable to benefit from using any of the above modeling methodologies including expert systems, albeit as constrained by the topology of the process. Simply stated, process control focuses simulation and decision resources on a limited class of optimization hypotheses that are constrained by the topology of the process.

Process control models are chosen in circumstances where the overall process is pragmatically optimized by locally optimizing the process at each station. Furthermore, for most applications, process control focuses simulation and decision resources on a limited class of optimization hypotheses that are constrained by using the simplest modeling techniques for each station. For this reason, statistical process control tools, neural network tools, and similar tools have become popular, in that they can be facilely applied to any station, as if that station were isolated from factors at other stations.

In statistical process control (hereinafter SPC), gross statistically derived threshold-type limits are assigned individually for metrics associated with inputs or outputs at a station; wherein each of these metrics was considered in isolation, in conceptually similar ways to that used in the simplest class of modeling and simulation.

For example, an SPC station may assemble two primitive components C1 and C2 together to form an aggregated component C3. Each of these components has statistically defined acceptable tolerance limits for at least one measurable aspect of the component; C1 (min, max), C2 (min, max), and C3 (min, max). The presumption is that if all C1 components are in the range C1 (min, max) and if all C2 components are in the range C2 (min, max), then all C3 components will be in the range C3 (min, max). Simply stated, using SPC tells us to set off an alarm and call a control process engineer whenever C3 components are measured to be out of the range C3 (min, max); and this actually happens even if C1 and C2 components were within their acceptable tolerance limits.

When out of specification C3 components are produced, the process control engineer first decides either to stop the process or to let the process continue. Typically, the process is stopped when the result is potentially catastrophic, such as in nuclear power plant SPC or in chemical synthesis of essential therapeutic drugs. Otherwise, the process control engineer may elect to let the process continue, even though the resultant out of specification C3 components may be worth much less than in specification C3 components.

Regardless of the process control engineer's decision, there is a need in the art for a method of improving SPC. More specifically, there is a need in the art for automatic tools to aid the process control engineer in returning the process to producing C3-type components within acceptable tolerance limits.

One aspect of this standard SPC problem is that there is an accumulation of contingent degradation of tolerances, in a concatenation of specifications for a plurality of interdependent stations. Simply stated, when there is a plurality of independently defined specification limits, these specifications actually convolute at a higher resolution into a configuration where not every combination of input specification parameters yields an acceptable final station output result. Thus, there is a need in the art for a tool that allows SPC specifications to be convoluted at a higher combinatorial resolution.

Another way to appreciate this need is to consider SPC as a model of a multivariate functional relationship wherein an upper bound threshold manifold and a lower bound threshold manifold represent the solution limits for a predetermined volumetric region in an orthogonal solution space. Clearly, only in unusual circumstances, such as when the manifolds are parallel and also slice through the predetermined volumetric region in an absolutely orthogonal fashion, will the convolution of the SPC limits be equivalent for both low-resolution and high-resolution specifications. However, if the manifolds are parallel and also slice through the predetermined volumetric region in an absolutely orthogonal fashion, then virtually none of the variables in the domain of the multivariate functional relationships affect the results.

In neural networks, high-resolution empirical data is accumulated and correlated with low-resolution decision data, substantially in order to define limits like those that were defined in the SPC method. Neural networks are used in situations where setting specification threshold limits for inputs is excessively complex, often because input variables being measured are highly interdependent, and simultaneously where setting threshold limits for outputs is well understood or at least easy to define. Here too, there is a need in the art for a tool that contributes to defining acceptable tolerances for aspects of inputs to a neural network evaluated process, so as to beneficially improve metrics of productive throughput for that process.

Another way to appreciate this need is to consider a neural network as a model of a multivariate functional relationship wherein a very complex topological shape constitutes the solution limits for a predetermined volumetric region in an orthogonal solution space. While this may be correct, no additional understanding or progress may be derived from this solution. Therefore, when neural networks are used, improvements and innovations of the process are conceptually inhibited.

In accordance with all of the aforesaid general background, there is a need in the art for a knowledge-engineering protocol-suite:

to provide a unified frame of reference for the numerous aspects of knowledge-engineering;

whereby new knowledge-engineering apparatus and appurtenances may be independently designed to integrate facilely with each other; and that substantially provides a framework through which existing knowledge-engineering products may be compared, functionally de-convoluted, and seamlessly integrated to form large-scale knowledge-engineering systems.

Most professionals, working in knowledge-engineering, are familiar with the Open Systems Interconnect (OSI) reference model of the International Standards Organization (ISO). This well-known OSI model is a common point of reference for categorizing and describing network devices, protocols, and issues. Countless network devices are designed to operate at certain OSI protocol levels. Likewise, in today's ensemble of network protocols, virtually each of the known protocols can be mapped onto the OSI reference model. Accordingly, it would be of tremendous benefit if a knowledge-engineering protocol-suite could be provided that builds on this familiarity with the OSI model.

The (OSI) reference model offers a seven-layer model structure defining the "ideal" network communication architecture. This model allows communication software to be broken into modules. Each layer provides services needed by the next layer in a way that frees the upper layer from concern about how these services are provided. This simplifies the design of each layer.

With the emergence of open systems, the OSI model set rules that would allow different manufacturers to build products that would seamlessly interact. One of the key areas of importance is the interoperability of network technologies. As a result, this model was designed for the development of network protocols. Although no protocol has yet been developed using this model, it has come to be accepted as a standard way of describing and categorizing existing protocols.

OSI conceptually puts names to the different tasks that a computer network has to fulfill. The ISO model defines seven layers, providing a logical grouping of the network functions. This model is good for teaching, and for planning the implementation of a computer network. Furthermore, dividing functionality in defined layers has the advantage that different parts of the network can be provided from different vendors and still work together.

When describing the different layers, one starts from the bottom and proceeds up through the upper layers. This is because some of the functionality and problems of the higher layers result from properties of the lower layers. The network stack used in the Internet illustrates the fact that a network is (usually), not implemented exactly as described in the OSI model. One protocol stack in use is referred to as the TCP/IP (Transfer Control Protocol/Internet Protocol) stack.

In order to appreciate today's network architectures and devices, it is important to understand the seven layers of the OSI model and their respective functions. The OSI reference model protocol layers, each with a unique function, are as follows:

OSI Physical Layer (layer 1) is where the cable, connector, and signaling specifications are defined. This layer provides mechanical, electrical, functional, and procedural means to activate and deactivate physical transmission connections between data-links. This layer is concerned with the encoding and decoding of digital bits (1s and 0s) between network interfaces. It is typically a function of the interface card, rather than a software utility.

OSI Data-link Layer (layer 2) deals with getting data packets on and off the wire, error detection and correction, and retransmission. This layer is generally broken into two sub-layers: The LLC (Logical Link Control) on the upper half, which does the error checking; and the MAC (Medium Access Control) on the lower half, which deals with getting the data on and off the wire. This layer provides functional and procedural means for connectionless-mode transmission among networks. The data link layer is concerned with the transmission of packets from one network interface card to another, based on the physical address of the interface cards. Typical data link protocols are Token Ring and Ethernet. The device driver that comes with the network interface card typically enables these protocols. The device driver will be loaded in a specific order with the other protocol programs. The data link layer is a point-to-point protocol, much like an airline flight. If you have a direct flight, one plane can get you to your final destination. However, if you have a connecting flight, the plane gets you to your connection point, and another will get you from there to your destination, but its up to you to make the connection yourself. Bridges operate at this layer.

OSI Network Layer (layer 3) makes certain that a packet sent from one device to another actually gets there in a reasonable period of time. Routing and flow controls are performed here. This is the lowest layer of the OSI model that can remain ignorant of the physical network. This layer provides a means of connectionless-mode transmission among transport entities. It makes transport entities independent of routing and relay considerations associated with connectionless-mode transmission. The network layer is concerned with the end-to-end delivery of messages. It operates on the basis of network addresses that are global in nature. Using the airline example, the network layer makes sure that all the connecting flights are made, so that you will actually arrive in your final destination. Network layer protocols include the IPX portion of the Netware IPX/SPX protocol and the IP portion of the TCP/IP protocol stack. Routers operate at this level.

OSI Transport Layer (layer 4) makes sure the lower three layers are doing their job correctly, and provides a transparent, logical data stream between the end user and the network service being used. This is the lower layer that provides local user services. This layer provides transparent data transfer between sessions and relieves them of concern about achieving reliable and cost effective data transfer. SUPER-UX supports Transmission Control Protocol (TCP) and User Datagram Protocol (UDP). The transport layer is concerned with issues such as the safe, intact arrival of messages. It makes the receiver aware that it is going to receive a message, insures that it does get it, and can control the flow of the message if the receiver is getting it too fast, or re-transmit portions that arrive garbled. In our airline analogy, suppose you are flying your children to Grandma's house unaccompanied. The data link layer planes will make their flights. A small fee will insure that network layer ground attendants get your kids from one flight to their connection. The transport layer will call Grandma to let her know they are coming and what their luggage looks like, and will expect a call from Grandma when she has them safe and sound. Typical transport layer protocols are the SPX portion of Netware SPX/IPX and the TCP portion of TCP/IP.

OSI Session Layer (layer 5) is where communications between applications across a network are controlled. Testing for out-of-sequence packets and handling two-way communication are handled here. This layer provides the services needed by protocols in the presentation layer to organize and synchronize their dialogue and manage data exchange. The session layer is the layer that manages all the activities of the layers below it. It does this by establishing what is called a virtual connection. Essentially a virtual connection is established when a transmitting station exchanges messages with the receiving station, and tells it to set up and maintain a communications link. This is similar to what happens when you log into the network. Once you have logged in, a connection is maintained throughout the course of your user session until you log out, even though you may not be accessing the network continuously.

OSI Presentation Layer (layer 6) is where differences in data representation are dealt with. For example, UNIX-style line endings (CR only) might be converted to MS-DOS style (CRLF), or EBCIDIC to ASCII character sets. This layer manages the representation of the information that application layer protocols either communicate or reference during communication. The presentation layer's function is to establish a common data format between communicating nodes. It is responsible for formatting the data in a way the receiving node can understand. It may also perform data translation between different data formats. Examples of data format differences include byte ordering (should it be read from left to right, or vice versa) and character set (ASCII characters or IBMs EBCDIC character set) as well as differences in numeric representation.

OSI Application Layer (layer 7) is where the user applications software lies. Such issues as file access and transfer, virtual terminal emulation, inter-process communication, and the like are handled here. This layer serves as the window between corresponding application processes that are exchanging information. The application layer provides the user-accessible services of the network. These services include such things as network file transfer and management, remote job initiation and control, virtual terminal sessions with attached hosts, electronic mail services, and network directory services.

This seven-layer OSI reference model has proved to be a great conceptual catalyst for today's rapid developments of network infrastructure apparatus and associated software systems. Recalling the definitions presented at the beginning of this general background section, specifically for "complexity", "resolution" and "quantification", there is a need in the art for models that can accommodate modeling domains that differ greatly with respect to "complexity," "resolution," and "quantification". More specifically, it would be of tremendous benefit if a single knowledge-engineering protocol-suite could not only be built on the existing familiarity with the OSI model but also be facilely applied to disparate applications; such as those that differ greatly with respect to "complexity," "resolution," and "quantification".

The following technical articles and citations, patents, Internet accessible web-pages, and the like are thought to be useful for understanding the history of the art, the current state of the art, and the present needs and failings of the art. While it is presumed that the man of the art is already familiar with the substance conveyed by these items, others may find, in these items, concepts and descriptions that will advantageously supplement their appreciation of the present invention. Therefore, the citations given in this section do not constitute a disclosure for the man of the art, nor should they be considered as uniquely disclosing salient aspects of the prior art.

Expert Systems: Expert Systems—Design and Development, John Durkin; Prentice Hall International Inc. 1994, ISBN 0-13-348640-0, pp. 4–25.

Process Control: "Yield Analysis Software Solutions"—Pieter Burggraaf; Semiconductor International January 1996, pp. 79–85.

Statistical Process Control: Quality Control Handbook—Fourth Edition—J. M. Juran (Editor) McGraw-Hill Inc., 1988, 24.1–22 & 26.39–46.

Neural Networks: "An Introduction to computing with Neural Networks"—Richard P. Lippmann; IEEE ASSP Magazine April 1987, pp. 4–22.

GENERAL PRIOR ARTS TO THE INVENTION

The following technical articles and citations, patents, Internet accessible web-pages, and the like describe concepts, methods, systems, and apparatus useful for a better understanding of new, useful, or non-obvious aspects of the present invention; and implicitly therein for appreciating the innate inventive step leading thereto. In juxtaposition to the citations presented in the general background section, the citations given in this section do constitute a disclosure for the man of the art, and should be considered as uniquely disclosing salient aspects of the prior art.

In this context, existing commercial products, which circumstantially derive from granted or pending patents, should be considered as exploiting the best enabling mode of the technology disclosed in those respective patents.

Commercial Products:

Knights Technology—Sunnyvale, Calif.; U.S.A.

(www.knights.com)

Knights Technology creates software systems that allow engineers to collect, correlate, analyze, and report essential FAB data and to try to determine sources of semiconductor yield loss and wafer defects. Knights has several programs and an encyclopedic trouble-shooting guide. Knights gives its clients a very sophisticated but un-integrated tool kit. It can only leave the client dimly aware of the need of one smooth running global system that employs the variant pieces of software that are readily available today and would oversee production parameters and make adjustments, as necessary, automatically. Knights' product also suffers from the built in limitation of being defect oriented. It is true they might be successful in correcting random yield loss but they will completely miss the cause of systematic yield loss.

ObjectSpace—14850 Quorum Drive, Suite 500; Dallas Tex., U.S.A.

(www.objectspace.com)

ObjectSpace produces Advance Process Control (APC) software technology or system that enables Run-to-Run control and fault detection applications in the factory. The client would be better served if such software were not limited to a one variable adjustment. ObjectSpace leaves the industry in need of a software technology that has a more global view of the fabrication process and incorporates "wafer history" into a more dynamic, self-correcting system.

Adventa—3001 East Plano Parkway; Plano, Tex., U.S.A.

(www.adventact.com)

Adventa produces a suite of products for the control and management of a production wafer FAB. They are Control, Process, and Track WORKS respectively. Their product ProcessWORKS supports a model-based process control used in discrete manufacturing systems. Process models are used to calculate process settings on equipment for automatic recipe generation, based on desired process results. This makes for efficient production but limits correction to one locale, whereas the possible error or deviation may be in any one of many locales in the wafer history. Fixed formula negates the possibility of automatic self-adjustment and leaves the model in a static mode with limited overall optimization.

Domain Manufacturing Corporation—63 South Ave.; Burlington, Mass.; U.S.A.

(www.domainmfg.com)

Domain applies statistical measures of primary and secondary parameters or production data either as collected in real time during on line production or after completion of several production cycles. Their Pattern software detects and warns operators when abnormal process conditions occur. Off-line, Pattern's analysis capabilities can enable engineers to scan large volumes of data with the hope of identifying exceptional regions requiring further analysis and to assist engineers in identifying causes. The aforementioned software does not provide possible solutions, nor does it automatically expand its scope of analysis from the data that it collates.

Semy Engineering, Inc.—2340 West Shangri La; Phoenix, Ariz., U.S.A.

(www.SEMY.com)

Semy has a supervisory system and metrology tools that collect data from Advanced Run-to-Run Control closed loop systems. Based on the physical measurements derived from the metrology tools, user selected process parameters are automatically modified to keep the process centered. This application can be used to control a single step in the process using a feedback technique or it can automatically adjust a subsequent step based on the results of a previous step using a feed forward technique. The automatic adjustments are limited to the narrow parameters of the process recipes within specific limits established by the process engineer. This limits the trouble-shooting to a local target, without taking into consideration wafer history, and leaves the user with a static model that cannot implement past data analysis into the present model.

HPL—San Jose Gateway Plaza, 2033 Gateway Place; San Jose, Calif., U.S.A.

(www.hpl.com)

HPL offers a package of four standard Failure Analysis Navigation and Visualization solutions. Their software provides integrated access to data that harbors yield loss cause information, product and process engineering and design data, in-line fabrication dafa, test data, and other data; with the ability to add new data without changing application software. User interactive modes of operation of their software include some systematic correlation of information; which "drill-down" to root causes of failures and yield limiters. When there is an alarm, the engineers and design experts must come in; and, using a mining tool, locate the defect, and make the necessary adjustment. The system would be more effective if the model possessed a self-learning mode that would, in future alarm situations, be able to point to possible defect areas and suggest solutions, and in so doing would be able save valuable time and increase yield levels.

KLA-Tencor Corporation—160 Rio Robles; San Jose, Calif., U.S.A.

(www.kla.com)

KLA-Tencor manufactures a combination of hardware and software systems that have application in identifying and helping to reduce defects in integrated circuit fabrication. The KLA-Tencor yield management consultants must decide where and how much to sample. This methodology of FAB yield evaluation paired with certain defect source analysis techniques hopefully may lead to a rapid isolation of a defect source. Once the FAB parameters have been breached, the defect becomes more readily observable, measured, and located, by the engineers if they can correctly interpret the software analysis and recommendations. They are saddled with the same limitation and narrowness of view as Knights in that they are defect oriented.

Triant Technologies Inc.—20 Townsite Road; Nanaimo, BC, Canada (www.triant.com)

Triant Technologies Inc.'s focus is on improving overall equipment effectiveness by providing solutions that increase equipment up time, minimizing the use of test wafers, accrue useful data on process problem areas, and reduce scrap. The company's monitoring components range from a data collection system to a real-time multivariate modeling system. The collected data is stored for both on- and off-line visualization. Both gross and subtle equipment faults are detected by the employment of set point and model-based monitoring and alarming. These technologies reduce false alarms and thus allow the process engineers to determine the source and cause of the fault. If the problem is not in the fabrication equipment, then the speed in which the correction is made is no longer in the hands of Triant's technologies, but in the hands of other yield management and fault detection and analysis tools. Triant apparently believes that modeling tools have reached their limit in terms of effectiveness. Because of this, their Tools employ models that are in the main defect driven; and manual rather than automatic in their operational mode. Thus, their Tools are in the end, static models lacking a self-learning ability; unable to suggest possible solutions once an actual process alarm has been rung.

Yield Dynamics, Inc.—Santa Clara, Calif., U.S.A.

(www.ydyn.com)

Yield Dynamics markets a suite of seven products in yield analysis; including data viewing, charting and analysis, wafer map data, data mining and advanced statistical tools. In the area of statistics they provide an option for multivariate analysis by adding a suite of advanced statistical algorithms to their product; allowing for the viewing of many parameters simultaneously; and, hopefully, uncovering relationships that standard univariate techniques are unable to capture due to their complicated interdependencies. The increase in analysis tools, and the accumulation of more and more data, cries out for an APC model that is more automated and dynamic; a self learning empirical model that provides a more holistic view of the fabrication process and incorporates an ability to point to the possible causes of the detected deviation, and that suggest solutions. The state of the art model is one that is capable of gathering increasingly larger and larger amounts of data—which the engineers are forced to dig their way through with their "mining tools"—in search of a possible solutions. A continued increase in data gathering, with an apparent decrease in the ability to analyze it, signals diminishing returns for the industry.

These aforementioned commercial products are generally targeted to process control problems found in integrated circuit fabrication facilities (FABs), where many state-of-the-art approaches are often applied. FABs represent a most complex class of real world problem to which modeling techniques have been applied. So, it appears fair to conclude that, essentially, the best available commercial products are not substantially better than the heretofore-available component tools, as described in the General Background of the Invention section. Accordingly, there remains a need in the art for more application independent tools, or for tools that will allow analysis down to the individual instantiation level, or for tools that will allow integration of empirically known units according to their actual interactions. More particularly, there is a special need in the art for a method that will simultaneously facilitate progress for all of these diverse disjunctive needs.

ADVANTAGES, OBJECTS AND BENEFITS OF THE INVENTION

The knowledge-engineering protocol-suite of the present invention may be facilely applied to disparate applications; such as those that differ greatly with respect to "complexity," "resolution," and "quantification". In order to appreciate this as an advantage, a brief matrix of non-limiting examples will now be presented.

The sample illustrative examples in the General Background of the Invention section related to (firstly) combining consumers' perceptions of fruit and vegetable quality with the agronomists' data capture universe; and, (secondly) to combining demographic and actuarial databases with personal medical records and medical research data. From a domain of knowledge-engineering problems, additional typical illustrative examples may be categorized according to nine discrete classification regions in the matrix. These nine regions are designated according to the parameters: "complexity" and "quantification"; and therein (for each parameter), according to an initial subjective assessment categorization of High, Middle, or Low.

Initial Global Search-Space Complexity (High . . . Middle . . . Low) relates to: A measure of graph directed topology size, such as total number of nodes in a model representation, and ranges of branching ratios therein, such as inputs and outputs for a given node.

Characteristic Local Region Quantify-Ability (High . . . Middle . . . Low) relates to: A measure of nodes or of relationships in the graph directed topology characterizing if it is the case that variables therein are numerically measured to a predetermined degree of precision (High or Middle) or if it is the case that these variables are only designated to a logical categorization (Low).

While recognizing that the forthcoming matrix of typical example problems has been categorized arbitrarily, it should be appreciated that a shift in categorization would nevertheless be substantially transparent with respect to operations in the knowledge-engineering protocol-suite of the present invention.

The purpose of these forthcoming examples is to introduce a forum of discourse wherein the broad aspect benefits of the present invention may be further appreciated. By expanding the notions of Complexity and Quantify-ability, it will become evident that the domain of problems on which the knowledge-engineering protocol-suite of the present invention operates is substantially broader than domains for methods of the prior art.

Accordingly, the method of the present invention will be understood as having greater utility than methods of the prior art. This improved utility is because the present method operates over a broader domain of problems. Furthermore, this improved utility is because the present method allows problems to be defined according to a plurality of perspectives. Ultimately, this improved utility is because the present method provides a convenient protocol suite compartmentalization for conceptualizing relationships between the perspectives and relevant empirical data sets, and therein provides facile tools for understanding and developing these relationships. In the context of the prior art, each of the forthcoming examples should be appreciated as representing a juxtaposition of perspectives with empirical data sets that heretofore demanded a large-scale custom-built software system.

TABLE OF CONTENTS FOR MATRIX OF TYPICAL EXAMPLE PROBLEMS

1) Complexity Measure High & Quantify-Ability Measure High
   a) Semi-Conductor Design And Fabrication
   b) Automotive Design And Fabrication
2) Complexity Measure High & Quantify-Ability Measure Middle
   a) Multi-Scale/Resolution Models For Health Optimization
   b) "Ordinary" Medical Diagnosis & Treatment
3) Complexity Measure High & Quantify-Ability Measure Low
   a) Triage (Medical Emergency Classification & Prioritization Of Casualties)
   b) Occupational Measurement And Tracking
4) Complexity Measure Middle & Quantify-Ability Measure High
   a) Macro-Economic Models
   b) Experimental Physics
5) Complexity Measure Middle & Quantify-Ability Measure Middle
   a) Psychiatric Behavior Intervention
   b) Psychophysics Experiments
6) Complexity Measure Middle & Quantify-Ability Measure Low
   a) Market Research
   b) Advertisement Portfolio Management
7) Complexity Measure Low & Quantify-Ability Measure High
   a) Engine Control
   b) Cow Life Cycle
8) Complexity Measure Low & Quantify-Ability Measure Middle
   a) Sub Set Of Assembly Or Service Process
   b) Gardening (or other common "How to" topics)
9) Complexity Measure Low & Quantify-Ability Measure Low
   a) Customer Satisfaction Surveys
   b) Voting Preference NOTE: These typical problems are strictly non-limiting examples that have been selected so that the diverse domain of utility of the present invention may be broadly appreciated. Alternative illustrative examples might equally well be found in the many degrees of detail that are commonly employed when describing and operating in a large command control communications systems environment.

BRIEF DESCRIPTION FOR EACH OF THE EXAMPLE PROBLEMS (1a) Complexity Measure High & Quantify-Ability Measure High—Semi-Conductor Design and Fabrication Example:

This example relates to a network of events starting from a discussion about an initial design concept and concluding when a packaged semiconductor from a batch of substantially identical semiconductors is quality categorized by an end of process testing system. This network of events includes inter-relations between hundreds of thousands of related steps, sub-steps and variables. Sometimes this network of events includes upgrading CAD/CAM tools, apparatus in a fabrication facility (FAB), changing specifications to sub-contractors or suppliers, or even building a new fabrication facility.

(1b) Complexity Measure High & Quantify-Ability Measure High—Automotive Design and Fabrication Example:

This example relates to a network of events starting from a discussion about an initial design concept, continues with the eventual testing of a newly manufactured vehicle, and concludes when all of the sales and maintenance reports are studied against the actual design and manufacture. Like the semiconductor example, this network of events includes inter-relations between hundreds of thousands of related steps, sub-steps and variables. Sometimes this network of events includes upgrading CAD/CAM tools, apparatus in assembly plants, changing specifications to sub-contractors or suppliers, or even building a new assembly plant.

For classification purposes, the network of events of examples 1a or 1 b should properly be represented as a model having a very large number of nodes wherein each node has complex inter-relationships (edges) with sometimes-large numbers of other nodes. In the context of such a model, many of the variables need to be recorded to high degrees of precision, both in the specifications and as measured at many stages in the fabrication (or manufacture), process.

A very large network of events of this type is related to, in the prior art, by dividing the network into many substantially independent sub-networks (often as long chains of nodes), and applying disparate tools to different sub-networks. For example, the design discussions may be managed using project management time tables and documentation version control indexes. Independently, sections of the fabrication (manufacture) may be managed using statistical process control techniques and design of experiment paradigms. Furthermore, the final results may be aggregated using gross measures of batch yield, customer satisfaction, and corporate profitability. Embodiments of the method of the present invention allow this fragmented management of a single network to be modeled and considered both as a global symbiotic milieu model and as an ensemble of synergetic separable local sub-models.

(2a) Complexity Measure High & Quantify-Ability Measure Middle—Multi-Scale/Resolution Models for Health Optimization Example:

This example relates to the wealth of health related data that exists, and to the seemingly insurmountable problem of how best to integrate this data so as to accrue its highest benefits. This example is a categorized elaboration of one of the introductory examples; combining demographic and actuarial databases with personal medical records and medical research data.

Today, life-relevant data collection is a decentralized parallel process of capturing aspects of public health statistics, actuarial records, medical research, individuals' health profiles, and their respective longitudinal accumulations. While it is generally appreciated that the topological complexity of a hypothetical graph of nodes and relationships integrating data from these numerous sources is at least as complex as examples (1a) and (1b), there is no prior art method for integrating the disparately quantified data-sets included therein, that can provide a sufficiently beneficial result from the integration. However, health data may be classified as less quantified than fabrication data, perhaps in part because fabrication processes benefit from measurements derived from high-precision destructive-type testing.

Embodiments of the method of the present invention provide modalities whereby an individual may be related to a plurality of data-sets that describe him, or his ancestors, or persons having a profile-resemblance to him, or groups to which at least one of the aforesaid belong. These embodiments may portray this individual in his relations to these other individuals and groups. Furthermore, these embodiments may then quantitatively posit and quantitatively test hypotheses about the individual or about groups of individuals. This may provide many new opportunities for superior results in managing health care for individuals, in managing public health policy, in improving actuarial table precision, etc.

(2b) Complexity Measure High & Quantify-Ability Measure Middle—"Ordinary" Medical Diagnosis & Treatment Example:

This example relates to the process of improving the health of a patient, regardless of whether the patient is sick or healthy. The first stage of this process includes combining subjective observations by a patient, objective observations by that patient's medical-service professionals, and quantitative clinical pathology metrics for the patient. The second stage of this process includes a definitive analysis of the patient's health, a prognosis for that patient, a strategy to improve the patient's health, and—often—a follow-up procedure that iterates another pairing of these first and second stages.

In this example, there are virtually endless potential categories and combinations of categories for the observations and metrics of the first stage. Simultaneously, these categories include significant subjective qualitative data, objective low precision data, and objective high precision data. Classically, the analysis first focuses on how to reduce the complexity of the data, substantially by pruning away as much of the general medical profile data about the patient as may be eliminated, without risking any inadvertent elimination of an optimal strategy option. Within this pruned data graph topology, there is a need to apply the disparate precision data and to then focus the results into a custom health strategy for the patient. Briefly stated, this is the art of medicine.

When applied to this problem, embodiments of the method of the present invention may be configured to resemble an overly conservative physician who performs the pruning of the data graph topology and the applying of the disparate precision data. These method-enabled pruning and filtering operations should save the skilled physician considerable time when positing a patient specific health improvement strategy. Alternatively, these method-enabled operations should permit the physician to expend greater consideration on the actual object of the process, achieving a best possible health improvement for a specific patient.

(3a) Complexity Measure High & Quantify-Ability Measure Low—Triage (Medical Emergency Classification & Prioritization of Casualties) Example:

This example relates to a classic operations research problem wherein all available substantially external data about a casualty is juxtaposed against available medical resources (facilities, supply, personnel, etc), in order to classify the casualty as destined for initial treatment: immediately, as soon as possible after those classified immediately are treated, or eventually.

This problem essentially attempts to transform a topologically complex set of interrelated physiological observations into a simple decision result. Existing triage models, while attempting to consider these interrelated physiological observations "scientifically," usually focus on the actual decision that needs to be made; given the limited medical resources of the actual situation. Therefore, seemingly external considerations (such as medical treatment success statistics, short term and long term costs, and expected resultant life "quality"), often dominate in choosing a triage decision model.

Embodiments of the method of the present invention may be used to integrate physiological data and actual casualty data with existing triage models in order to test if any of these models objectively deliver the results that they expect to deliver. Alternatively, embodiments of the present invention may be used to derive new triage models, test-simulate them, and compare them to known field-tested triage models.

(3b) Complexity Measure High & Quantify-Ability Measure Low—Occupational Measurement And Tracking Example:

This example relates to the well-appreciated problem of comparatively evaluating and proportionately compensating employees. This problem is further complicated by a desire of the employer to improve the productivity of his employees individually and to develop an optimally integrated organization; presumably in order to better compete with like employers. Job categories, skill categories, and metrics of productivity are often simplistic and subjective; depending on non-standardized evaluations by supervisors or co-workers. Nevertheless, in large corporate organizations, a mapping of skills, tasks, productivity, and workflow will quickly grow into a highly complex model; for which the dynamics of improvement are often axiomatic rather than scientific.

Embodiments of the method of the present invention may be applied to organize data about workflow, skills, evaluation, etc. Thereafter, the present method may be used to test these fleeting dogmatic axioms of management, to posit more individualized alternatives, and to quantitatively validate these alternatives.

Stated differently, many human resources functions such as selection, recruiting, placement, or career development call for the use of behavioral measurement. Jobs and work settings have their own individual qualities and characteristics. Each job and work setting can be viewed as the shadow or outline of the particular person that would best fill it. Behavioral measurement samples attitudes, skills, and psychological traits, which are important for placement in particular work settings, specific positions, or occupations. Computer software has been developed for monitoring home and work life activities, in terms of level of sophistication, as well as a tool for measuring emotional availability and interpersonal sophistication, which can be used in adult training situations in both instructing and assessing progress of trainees.

There are a number of instruments that contribute to the hiring process. Screening instruments (i.e. Literacy and Numeracy Test) are used by today's typical large manufacturer to direct in-house training programs. Career Planning (or Competency) Models encourage individuals to explore and gather information, which in turn enable them to gain competencies, make decisions, set goals, and take action. Each individual varies in his respective progress through each of these stages, for many reasons. Some advance rapidly through each or all of the stages while others progress more slowly. Between all the occupational tracking models, tests and measurements, there are major gaps; where many individuals drop through or slip by.

Tests and models remain less successful in the selection of suitable candidates for a particular employment slot than a competent manager's intuition and experience. Embodiments of the present invention may incorporate into a model the intuition and experience of many managers, and by doing so improve the results. Typically, embodiments of the present invention may validate presumptions about relationships between the multitude of variables suggested by these managers. Existing occupational tracking models, operating substantially independently of experienced managers, cannot conclusively prove that their respective evaluation methods do not emphasize factors that may be at cross-purposes to the apparent objective.

Simply stated, what presently, in theory, makes one person more successful at a particular job over another person, in reality, remains rather vague and inaccurate. While, on the one hand, there seems to be no end to the complexity of occupational tracking; on the other hand, metrics of quantification remain weakly quantifiable. Accordingly, embodiments of the present invention may be applied to validating accepted conjectures relating tracking to metrics, and may furthermore be applied to testing new prepositional relationships.

(4a) Complexity Measure Middle & Quantify-Ability Measure High—Macroeconomics—Example:

Macroeconomics relates to integrating data about what is produced, its costs, who consumes it, and what they pay for it. Weather, international conflicts, and their effect on the marketplace are all normally measured down to the penny, at the end of any given period, and thus readily classifiable as quantifiably high. Graphs and models representing scarcity, opportunity costs, production possibilities, supply and demand, output, national income, budgets, deficits, the national debt, inflation, unemployment, foreign exchange, balance of payments, and supply side economics; are some of the many aspects that go into making up a fiscal policy; and this fiscal policy is the static model that nations use to navigate the very dynamic inter-relations in international economics.

National banks promote international monetary cooperation, stability, and orderly exchange arrangements to foster economic growth and high levels of employment, as well as to provide temporary financial assistance to countries under adequate safeguards to help ease balance of payments adjustment. This will hopefully validate the fiscal policy by trying to limit the influences of "outside" variables. During some historical epochs, the tendency is for there to be a completely new fiscal policy each year, because the then accepted macro-economic models did not direct their respective economies to a desired result. Nevertheless, when compared to grand industrial fabrication facilities, the macroeconomics example is of intermediate complexity.

Embodiments of the present invention may be applied to allow for a greater understanding of day-to-day changes, or even hour-to-hour changes; with suggestions of relationships pointing to their meaning and significance; in that embodiments of the present invention may be multivariate and dynamic (self-learning); with a potential to validate independent values and to make the necessary adjustments in a more robust manner. Adjustments, feedback and feedforward are applicable modalities of intervention (being a benefit deriving from the high quantify-ability of the present example), which may be applied in real time instead of at the end of set reporting periods; as in known classical cases. Robust modalities of embodiments of the present invention are beneficially distinguishable over known models, which operate with substantially preset parameters.

Thus embodiments of the present invention would not only allow for real time monitoring but also be able to make predictions and suggest possible financial adjustments or corrections; be they at the level of transaction policies of nations, investment management strategies of consortiums, or management of personal financial portfolios. For example, this robust facility may be especially useful in today's electronic-transaction financial-market environment where volatile instruments, such as futures and derivatives, are more actively traded.

(4b) Complexity Measure Middle & Quantify-Ability Measure High—Experimental Physics—Example:

Research in Experimental Physics covers a wide range of phenomena, from the subatomic scale over atomic, molecular, and condensed matter physics; to environmental physics and interdisciplinary astronomy including many examples of both fundamental and applied physics. In the study of electronic structure of solid materials, including their surfaces and interfaces, photo-emission, inverse photo-emission, and other surface sensitive techniques are used. A researcher is limited to the tools in his kit. Based on previous experiments and their models he has a good idea of what he would like to confirm, prove, or discover; and, with this in mind, he sets up his experiment. Even though, by definition, this example is at the high quantify-ability end, actual experimental models do not reach the same massive detail of conceptual integration of particulars that advanced technology fabrications facilities reach.

Embodiments of the present invention would give the experimental physicist an added advantage of narrowing down a wide, but not overwhelming, array of variables. Furthermore, embodiments of the present invention would allow the experimental physicist to discover from previous experiment-models the common modalities and their hierarchy of importance through a dynamic feedback and feedforward analysis processes.

For example, if the main tool in an experiment is an angle-resolved photoelectron spectrometer in the UV range, then detailed and highly precise information can be obtained about valence states in a volume, surface states, resonances, or chemical shifts of core levels with this device. In this context, embodiments of the present invention, utilizing the information of past models and the precise results of recent experiments, would first remove irrelevant variables and add previously neglected ones based on the self-learning enablement and dynamism of newly generated model linkages. This enhancement would lead to a greater ability to predict, with ever-increasing accuracy, the results of future experiments, and would be able to eliminate unnecessary ones and in so doing, would save valuable time and considerable funds.

Furthermore, robustness of embodiments of the present invention, an ability to self-correct and ignore variables that are irrelevant, could allow for the transformation of an experimental model into a practical one; giving it an enhanced ability to project and predict future results. In a hypothetical case, it would show how, more efficiently, this particular information could be applied in the use and improvement of surfaces and interfaces of semi-conducting systems.

(5a) Complexity Measure Middle & Quantify-Ability Measure Middle—Psychiatric Behavior Intervention—Example:

Early intervention plans have multiple uses; have been developed from a technical, and research base, with the hope of short-circuiting future adult anti-social behavior. Level of care assessment and descriptions are objective, based on a child's age, mental health, and behavior. It is a uniform system based on research, Q&A forms, interviews, and statistics. Working with demographics, socio-economic profiles, and various psychological and intelligence tests; one can possibly get a vague outline of an individual's mental health at any given time.

Objective measures are used as required by health management policies and program evaluation criteria. Statistical analysis programs, evaluation, and report generation, including methods and procedures, have to meet the requirements of research-based protocols. Also, more than ever, it is being recognized that "early intervention programs" not only benefit children when they need it the most, but also provide a valuable tool for "cost cutting strategies." This is most evident in the improvement of school attendance, decreased school behavioral referrals, and county foster care placements. County agencies, which provide effective early intervention programs, save up to thousands of dollars per day in foster care placement. This is not to mention the need to address the severe problems with the growing violence school children are exhibiting. Yet, the emphasis on the financial reward of early interventions, linked with the isolation of the child in the intervention procedure, might have dire consequences in the long run.

Today the limits of intervention or behavior modification can only be measured, by short-term observation and repeated testing and monitoring. With the rapid changes in society many of the tools for perceiving the psychological person become outdated well before they can be replaced. This is also true of statistical analysis, based on past social history, used in an effort to predict future social or anti-social behavior.

Accordingly, a topological graph representation of Psychiatric Behavior Intervention models is characterized by being of intermediate complexity, as compared to the aforementioned examples. Likewise, the metrics used in this field are usually of intermediate quantification.

Embodiments of the present invention would enable a model to self-correct and remain relevant in its interpretation of the social patterns that are constantly evolving, as well as allowing for greater individualization. The intuitive fear of aggressive behavior and violence on the part of the medical care community might give more weight to certain variables than they deserve, and at the same time overlook others that play a greater role than previously realized.

(5b) Complexity Measure Middle & Quantify-Ability Measure Middle—Psychophysics Experiments—Example:

Psychophysics is the psychological study of relationships between physical stimuli and sensory response; for example, between vision and perception. This involves the collecting of "effects" explained by a theory of perception. Accordingly, a topological graph representation of any predetermined class of Psychophysics Experiments is characterized by being of intermediate complexity, as compared with the aforementioned examples. Likewise, the metrics used in this field are usually of intermediate quantification.

The Craik-O'Brien-Cornsweet effect (COCE) involves two adjacent figures that are identical in luminance profile (i.e., in distributions of absolute measurements of reflected light) but differ in brightness (i.e., in the subjective perception of lightness and darkness). The two regions are identical in terms of the objective property of luminance profile, but one looks darker than the other does. The difference in brightness between rectangles depends upon the difference in luminance at the borders.

Effects, such as COCE present problems, which it is the business of theoretical work in vision to solve. Any viable model of the human visual system is constrained in the sense that their output should correspond to the percept when their input corresponds to the stimulus. Again, the datum presented by this effect-and to be explained by a theory of vision-is a relation between phenomenological properties (how things look), and physical properties (how the patches reflect light). The reason it counts as a psychological effect is because the curve describing the brightness profile of the percept, does not match the curve describing the luminance profile of the stimulus.

What is reported in this effect is that one patch looks brighter than the other does, even though there is no difference in luminance. And it is hard to see how "looking brighter" can be anything other than a comparison in terms of phenomenological properties. (It cannot, for example, be paraphrased in terms of detecting differences in luminance, because in this case those differences do not exist.) There is no other way to get at brightness as a datum other than by examining your own percepts or accepting other people's reports of their percepts.

In this case, embodiments of the present invention would be able to expand the scope of the experiment by bringing in and comparing variables from many experiments on perception, based on different social and cultural groupings, and how these particular brightness curves compare to those describing luminance in the original experiment. There might, of course, be missing variables in the measuring of luminance as well, which might be the hidden factor for why one rectangle appears brighter when there is no apparent measurable difference.

Likewise, a model enhanced by an embodiment of the present invention, could take into account, that the measure of particular luminance may posses undetected differences. For how is it possible that the eyes and mind of one person being so different than that of another perceive the same difference in brightness, being that it is a psychological effect and the psychology of one is so different from another.

(6a) Complexity Measure Middle & Quantify-Ability Measure Low—Market Research—Example:

Traditional consumer industries are in transition. The Internet is transforming both the overall competitive landscape, and the business models of traditional consumer markets. Market Modules, one of the new models claims: " . . . we allow clients to take the pulse of their specific industry and its place in the consumer Internet economy . . . these analyst-supported services are a supplement to sectorspecific market sizing, 'best practices' profiles of key competitors, proprietary consumer data, and deal-by-deal analysis."

One marketer says, "Integrating online and offline advertising campaigns isn't just a matter of slapping a Web site address onto a magazine or a television ad. True campaign integration involves creating advertising across all media that delivers a similar message, draws on the same creative look and feel, and aims to build brand and sales over the long term." Another market research and Ad agency claims that "Banner advertising is the proven, efficient way to attract new customers on dozens of high quality, subject focused, Internet sites; with a single buy. Your customers are out there surfing the web and we can deliver them directly to you."

Marketers might not know how exactly to sell the clients a product, but they can sell advertising just by claiming they have the "know how." Such agencies certainly know several of the variables that motivate people to buy. The reasons people buy can run the gamut from the psychological (i.e.—impulse, status, fantasy projection, self-worth, lack of self worth), to the practical (i.e.—time saving, life saving, labor saving, etc.). Through testing and experience, the ad people have arrived at a few basic sure-fire principals, the main ones being repetition; and its corollary being lots of money to reinforce a sublimation of the repetition. So they throw together all the ingredients this way and that way, and sometimes their experience creates a successful marketing campaign; in spite of the fact that what the product is could virtually be the least important selling point.

Embodiments of the present invention would allow for a better, long-term, quantitative, view of past and projected modalities of advertising. For example, to quantitatively test a conjecture, stating that, today, Internet advertising may have more in common with old-fashion billboard highway advertising than with more contemporary television advertising. Alternatively, embodiments of the present invention could quantify the validity of a conjecture stating that, fifty years ago, success was a function of what type of product was being sold and of what type of consumer was going to buy it. Embodiments of the present invention could have both a feedback as well as a feed-forward adjustment that could take in new information such as economic changes and relate them to how they are effecting consumer habits; thereby improving the success of ongoing advertising campaigns.

(6b) Complexity Measure Middle & Quantify-Ability Measure Low—Advertisement Portfolio Management—Example:

This example relates to the classic problem of trying to use a fixed advertising budget to maximum advantage. On the one hand, there are numerous advertising media, and numerous media providers therein. For example, there are usually multiple broadcast-TV and cable-TV channels, multiple radio channels, multiple newspapers and magazines, multiple targeted and general mailing services, etc. It is the portfolio manager's job to determine what mix of media to use, how to design and coordinate an advertising campaign to best achieve the clients aims in those media, etc. This may be represented as an intermediate complexity topology graph (process diagram), since not only are there multiple media advertising conduits, each directed to an audience having a different distribution of personal profiles, and each having a different rate structure; but each media has an innately different quotient of effectiveness within each sub-population. On the other hand, quanta for effectiveness are generally only accessible through limited sampling studies. For example, some small percentage of subscribers to a service, or purchasers of a product, might agree to provide some response data about how they came to buy the service or product, and therein might remember which advertisement helped them to decide; if an advertisement helped them to decide at all.

Embodiments of the present invention may be useful to help integrate diverse aspects of data collection and to validate portfolio management models therewith.

(7a) Complexity Measure Low & Quantify-Ability Measure High—Engine Control—Example:

Conceptually, a topological graph of a combustion engine's process is relatively almost a non-branching chain of events. Measured fuel and measured air are mixed and ignited under controlled conditions, so that their resultant rapid oxidation events are converted into mechanical energy and into exhaust. Nevertheless, every measurement and virtually every aspect of the controlled conditions may be captured as data to arbitrarily high precision.

TEC (Total Engine Control) is an advanced engine management system. It combines state-of-the-art fuel injection with a Direct Ignition System, and replaces the existing carburetor or fuel injection system and ignition distributor and coil. This advanced, digital computer based technology is used for improved power-delivery system, smoother "drive-ability," and lower fuel consumption. The TEC-I series of engine control units consist of a Direct Fire Unit—that holds the coils, and a TEC controller—that holds the injector drive circuits and control logic. This configuration represents an improvement for extremely powerful engines with multiple injectors at each cylinder. Unfortunately, these hand built and custom configured systems are purpose built special order items.

Using a known model dictates that specific engine input and condition specifications will deliver a certain output. When these expectations are not met, the engineers must investigate where the fault lies. What is needed is a model that measures the expected output of standard variables in the combustion system against its actual output, rather than a model that only predicts overall system output. Embodiments of the present invention would be able to establish a more global model that would help to increase the optimization of a whole combustion system. At that point, more esoteric and overlooked variables could begin to be added to the present invention model, in its empirical self-learning capacity. Thus, the present invention would allow for an improvement of individual engine controllers, which today is only attempted with labor-intensive human intervention; almost on the level of the engine craftsman.

(7b) Complexity Measure Low & Quantify-Ability Measure High—Cow Life Cycle—Example:

One might describe an example of Cow Life Cycle equally well in terms similar to any other management or process description. Specifically, one monitors genetic makeup, health, and nutrition, with an aim to optimization of milk or meat production; clearly on an individual animal basis rather than on any larger grouping. Nevertheless, a topological graph of a cow life cycle is likewise relatively almost a non-branching chain of events. Measured fodder and measured genetic makeup are integrated and developed under controlled conditions, and resultant in milk or meat, or leather or offspring, or other byproduct productions. Nevertheless, every measurement and virtually every aspect of the controlled conditions may be captured as data to arbitrarily high precision. Accordingly, embodiments of the present invention are useful to model aspects of cow life cycle; on individual cows, on genetically like cows, on individual breeds of cows, on conjectural mixed breeds of cows, etc. Furthermore, these models may be developed to manage real time aspects of the cow's management.

(8a) Complexity Measure Low & Quantify-Ability Measure Middle—Sub-Set of Assembly or Service Process—Example:

Similarly to the above, any Sub-Set of a larger process control problem, relating Assembly or Service Process, would benefit from improved process control. Substantially, these examples include modeling small portions of those described in examples (1a) and (1b) above. When the "small portions" reach the resolution of individual items of manufacture or fabrication equipment, then this example begins to resemble classical Statistical Process Control (SPC) methods or the like. Embodiments of the present invention may be applied to improve the performance of individual units or aggregates of units; all of which are subsets of the larger respective process. Nevertheless, embodiments of the present invention integrate the subsets in all their detail and not only according to external metrics of their respective performance.

(8b) Complexity Measure Low & Quantify-Ability Measure Middle—Common Gardening (or any of a Myriad of Processes which are often Addressed in "How To" Books or Articles)—Example:

This example relates to any nexus of complex processes that is simplified into a low topological complexity representation, with an intermediate scale metrification of associated variables. Embodiments of the present example can validate the relative significance of elements of the respective representation. This transforms any initial recommended strategy for success into a qualified portrayal of the actual weighting of significance that empirically successful strategies actually employ. Simply stated, "wouldn't it be nice to know" which pieces of common advice actually yield significant results.

(9a) Complexity Measure Low & Quantify-Ability Measure Low—Customer Satisfaction Surveys—Example:

The present example relates to gathering, analyzing, and beneficially using the results from consumer satisfaction surveys. Since consumers will only answer short simplistic surveys, wherein there is usually lots of room for misunderstanding, and since there have not been discovered any better way to glean a description of the consumers' actual impressions, consumer research is restricted to understanding a system that is limited to low resolution quality process maps (topological graphs), having a quantitative basis which is likewise of lowest order metrics. Since these surveys form the basis of countless corporate decisions, it would be beneficial to improve the quality of conclusions that can be derived from such systems. Embodiments of the present invention may prove to be of great value in validating models of such systems and in improving these systems, to become better instruments for accomplishing their intended purposes.

(9b) Complexity Measure Low & Quantify-Ability Measure Low—Voting Preference—Example:

The present example relates to a class of lowest complexity with lowest quantify-ability, because it is commonly never known how any individual actually voted nor which configuration of factors actually determined his actual vote. Nevertheless, it is common practice to spend lots of money to influence the voting habits of the populace. Could it be proven that obscure modalities of electioneering (e.g.—planting trees in public areas, or providing a free car tune-ups), are more effective than commonly accepted mass media campaigns, then there might probably be a significant change in electioneering practices. The present invention may be applied to developing and analyzing such models, even if they are focused to test peculiar speculations.

In substantially all of the above examples, there is a benefit derived from using empirical results from a population, to replace testing on global empirical data-sets for populations, with testing on individual instantiations, and thereby to direct optimization and decision processes into higher resolution empirical data. This is the ultimate goal of any deterministically directed system: to correctly diagnose and treat an individual patient, to optimally tune an individual engine, to force an individual tree to produce a total maximum of produce value marketable fruits, etc. Many tools and models have been applied to improving existing technologies, however the technology of the present invention is directed to integrating such tools and models, and therewith to shifting the burdens of proof from theoretical constructs to empirical truths.

Technological Need Issues: There is a need in the art for facile tools that will improve the efficiency or durability of individual physical machines, each of which actually differs from the theoretical machine upon which it was originally based. The knowledge-engineering protocol-suite of the present invention provides the context to define, develop, integrate, and test such tools. More specifically, the present invention provides such tools embodied as methods, systems, and apparatus for search-space organizational validation; and as other appurtenances developed for use with the knowledge-engineering protocol-suite.

Ergonomic Need Issues: There is a need in the art for facile tools that will improve the efficiency or durability of individual physical organisms (e.g. in human medical treatment or in veterinary applications), each of which actually differs from a class or sub-class of theoretical organisms that have been collectively studied and tested. The knowledge-engineering protocol-suite of the present invention provides a facility for developing such tools.

Economic Need Issues: There is a need in the art for facile tools that will improve the efficiency or durability of individual instantiations of systems integration, each of which actually differs from the theoretical designs upon which it was originally based. Simply stated, regardless of the complexity of any specific model, and regardless of the degree of technical expertise that may be necessary to postulate improvements for such a model, there is a need in the art to accurately present a present situation (including its options), in a format that a non-technical manager can appreciate. This need is most acute when the model relates to unique, expensive, or very large, individual system instantiations. The knowledge-engineering protocol-suite of the present invention is configurable for integrating considerations when relating to such modeling situations.

Notices

The reader should appreciate that a reference to an existing commercial product, which circumstantially derives from granted or pending patents, should be considered as a reference to the present best enabling mode of the technology disclosed in those patents.

Furthermore, numbers, alphabetic characters, and roman symbols are designated in the following sections for convenience of explanations only, and should by no means be regarded as imposing particular order on any method steps. Likewise, the present invention will forthwith be described with a certain degree of particularity, however those versed in the art will readily appreciate that various modifications and alterations may be carried out without departing from either the spirit or scope, as hereinafter claimed.

In describing the present invention, explanations are presented in light of currently accepted scientific theories and models. Such theories and models are subject to changes, both adiabatic and radical. Often these changes occur because representations for fundamental component elements are innovated, because new transformations between these elements are conceived, or because new interpretations arise for these elements or for their transformations. Therefore, it is important to note that the present invention relates to specific technological actualization in embodiments. Accordingly, theory or model dependent explanations herein, related to these embodiments, are presented for the purpose of teaching the current man of the art—or the current team of the art—how these embodiments may be substantially realized in practice. Alternative or equivalent explanations for these embodiments may neither deny nor alter their realization.

GLOSSARY of Terms used in Documenting the Prototype

Layer 1 of the protocol suite of the present invention: A physical layer for interfacing with apparatus.

Layer 2 of the protocol suite of the present invention: A data-link layer for facilitating data-communications within any of these Layers 1–7, or between any plurality of these Layers 1–7.

Layer 3 of the protocol suite of the present invention: A network layer for maintaining transactional access to data ensembles (e.g. an index of data related to empirical contents from Layer 1).

Layer 4 of the protocol suite of the present invention: A transport layer for organizing and maintaining token correspondences and adjacency lists, wherein are represented network layer relationships between the data sets or between elements in the data sets (e.g. a tabular organization for maintaining relationships between indexed data or data categories in Layer 3).

Layer 5 of the protocol suite of the present invention: A session layer for validating the transport layer represented relationships (e.g. a convergence for checking elements of model relationships from Layer 4 with indexed empirical data from Layer 3), and for simulating alternative transport layer relationships (from Layers 6 or 7).

Layer 6 of the protocol suite of the present invention: A presentation layer for designing and executing experimental session layer simulations, evaluations thereof, and modifications thereto; (e.g. a propositional logic formation region wherein alternative or supplemental relationships to those maintained in Layer 4 may be articulated and passed to Layer 5 for testing against indexed empirical data from Layer 3).

Layer 7 of the protocol suite of the present invention: An application layer for prioritizing n-tuple strategy dynamics of presentation layer transactions, (e.g. a combinatoric set formation region wherein the entire collection of all possible Layer 4 permutations are considered with a specific view to considering what the most productive order for their evaluation might be; and this order is used to pass substantially one at a time to Layer 6 on an as available for testing basis).

Empirical Controller: A layer-based embodiment for controlling the underlying Layer 1 interconnected devices and apparatus, including sensors, actuators, etc.

Knowledge Tree: A composite topological graph constructed from Layer 4 contents (as input via Layer 1). These contents generally include a process map (either derived from a single source or composed from fragmentary process maps), and expert suggested relationships between "nodes" (herein called interconnection cells), in the topological graph; such as "causal" relationships suggested by experts, or relationships proposed in Layers 6 or 7 and subsequently validated against empirical data; also used to describe a graphical presentation of same.

Interconnection Cell: a node in the topological graph "Knowledge Tree" wherein is represented inputs and outputs from the process map and metrics and relationships suggested by experts or Layers 6 or 7.

POEM: a general methodology used for validating individual or contiguous Interconnection Cells in Knowledge Tree.

Thus: The Empirical Controller (E-C) The concept consists of several components described in the sequel. The qualitative component of the invention that integrates physical knowledge and logical understandings into a homogenetic knowledge structure is called the Knowledge Tree (K-T) The Knowledge Tree is displayed graphically as a directed network with nodes, which are called Interconnection Cells. These cells express the local relationship between input and output process parameter measurements. The POEM algorithmic approach is applied to obtain (from process measurement data) the precise quantitative relationship at each cell. Each Interconnection Cell is converted to an Interconnection Model or Model, in short. The Model contains the quantitative relationships between input and output. The Knowledge Tree together with this quantitative layer yields the Empirical Model. The Empirical Model serves as a multivariable characterization of the process being described, and can be used to predict and control process behavior. The component of the invention that sits on top of the Empirical Model, and converts human determined operational objectives into system useable form, is called the Automated Decision-Maker (ADM, alternatively ADAM.) The ADM operates and analyzes the Empirical Model to determine solutions that best meet the specified objectives and constraints. The entire three-tier structure consisting of the ADM, the Empirical Model, and the Knowledge Tree, is refereed to as the Empirical Controller. The Empirical Controller is a generic learning and thinking system, which performs Empirical Control.

Adam: A conceptually highest level refinement of Knowledge Tree which is ultimately achieved at the completion of Layer 7 processing, and is practically achieved as the progressive results from Layer 7 are observed to be less significant than previous groups of results.

Eden: A conceptual cluster of EVEs; equivalently a meta-interconnection cell representing a contiguous Knowledge sub-Tree contained therein.

Eve: Validation and/or Testing for a specific Layer 1 connected device (or machine) corresponding to an Interconnection Cell in Knowledge Tree.

Poem: a general methodology used for validating individual or contiguous Interconnection Cells in Knowledge Tree. For example, using a known modeling tool for the specific device or apparatus represented by the Interconnection Cell, or using SPC, or using IPC, or using APC, etc.

Thus: The product that contains the E-C technology and is the realization of the Automated Decision-Maker is referred to as the Adam (Automated Decision-Maker). Adam serves as a global Decision-Maker tool, encompassing the entire process. The E-C technology when embodied in a product and used for intermediate process control of work groups or equipment clusters is referred to as the Eden (Empirical Decision Enabling Network). The E-C technology when embodied in a product and used for troubleshooting, optimization and control at the processing equipment or measuring tool level is referred to as the Eve (Equipment Variable Evaluator).

GENERAL OVERVIEW AND SUMMARY OF THE INVENTION

The present invention relates to a knowledge-engineering protocol-suite for facilitating open systems interconnection transactions in a multi-layer knowledge-engineering reference model substantially having Layer 1—a physical layer for interfacing with apparatus;
Layer 2—a data-link layer for facilitating data-communications within any of these Layers 1–7, or between any plurality of these Layers 1–7;
Layer 3—a network layer for maintaining transactional access to data ensembles;
Layer 4—a transport layer for organizing and maintaining token correspondences and adjacency lists wherein are represented network layer relationships between the data sets or between elements in the data sets;
Layer 5—a session layer for validating the transport layer represented relationships and for simulating alternative transport layer relationships;
Layer 6—a presentation layer for designing and executing experimental session layer simulations, evaluations thereof and modifications thereto; and
Layer 7—an application layer for prioritizing n-tuple strategy dynamics of presentation layer transactions;
wherein the knowledge-engineering protocol-suite includes:
1st) either a structured system having
A) at least one process-management computer with a program for relating Layers 1–3,
B) at least one computer embodying a search-space organizational validation method program for relating Layers 3–5, and
C) at least one knowledge-engineering workstation with a program for relating Layers 5–7;
2nd) or equivalently, a distributed asynchronous system of process-modeling computers with programs for relating Layers 1–7.

Generally, the present invention relates to programs for facilitating open systems interconnection transactions in the frame of reference of a multi-layer knowledge-engineering reference model using a knowledge-engineering protocol-suite. According to one variety of the present invention, these programs are embodied for use in a structured system of data-logic processors (e.g. knowledge-engineering workstation, computer, process-management computer). According to another variety of the present invention, these programs are embodied for use in a distributed asynchronous system of process-modeling computers.

While the two varieties are architecturally different, the structured system functionally is a substantially hierarchical (graph directed) organization of the same method embodied programs as those of the distributed system. However, because there are substantive differences between command, control, and communications topologies of the structured and asynchronous systems of the present invention, actual method embodied programs conforming to the knowledge-engineering suite may be embodied differently for each system variety.

Furthermore, there are also numerous hybrid, recursive, or quasi-recursive embodiments of the protocol suite of the present invention, which actually constitute interim embodiments between the structured and distributed systems of the present invention. These interim embodiments need not be explicitly described, since substantially they include a mutually compatible aggregation of equivalencies to aspects of the structures system with aspects of the distributed system.

The knowledge-engineering protocol suite of the present invention provides a conceptual organization that is built on the same framework as the familiar OSI model, and is facilely applied to disparate applications; such as those that differ greatly with respect to "complexity," "resolution," and "quantification." The embodied programs of the present invention generally include search-space organizational validation for such disparate applications, and also other higher knowledge-engineering functions. In the protocol-suite, programs provide a synergistic combining of knowledge bases of disparate resolution data-sets, such as by actual or simulated integrating of lower resolution, expert-experience based, model-like, templates; to higher resolution empirical data-capture dense quantitative search-spaces.

The knowledge-engineering protocol suite of the present invention may be applied to disparate applications; such as manufacturing systems, control systems, command control systems, or command control communications systems. Furthermore, the suite may be applied to computational apparatus associated with these applications, and to the task of providing appropriate quantitative modeling and measuring tools for these applications.

The present invention also relates to a search-space organizational validation method substantially complying with a knowledge-engineering protocol-suite, the method including the steps of:
1st) organizing a search-space for a first plurality of correlated empirical data-sets, by mapping a second plurality of interrelated nodes of graph-directed expertise-suggested data-set relationships onto the first plurality of correlated empirical data-sets, at least until there is a predetermined measure of inclusion by the second plurality of nodes and relationships of particulars in the first plurality data-sets, wherein the data-set resolution of particulars in the first plurality is greater than or equal to that of particulars in the second plurality; and
2nd) validating the search-space from a vantage of a presumption of validity for the first plurality of data-sets, by
A) simulating a validity-metric for an n-tuple of directed graph components in the mapped second plurality, or
B) measuring if each input to a node of the n-tuple significantly contributes to that node's output, wherein a predetermined convolution of these measurings constitutes a validity-metric for the n-tuple.

In the context of the present protocol-suite, correlated empirical data-sets may be derived from sensors of layer 1, conveyed via a communications conduit facility of layer 2, and stored in a memory media of layer 3. More specifically, correlated empirical data-sets generally include raw input, process, or output data from a specific machine or a specific organism, or from a plurality of specific machines or a plurality of specific organisms, or from a conceptual characterization thereof, or from a simulation of a model relating thereto. According to the domain of problems on which the knowledge-engineering protocol-suite of the present invention operates, illustrative, non-limiting, examples include:

A specific machine may be an identified etching machine, or an identified annealing oven in a semiconductor fabrication facility, or an identified locomotive engine, or an identified component or sub-system of a specific machine.

A specific organism may be an identified individual person, or an identified dairy cow or racehorse, or an identified strain of genetically substantially identical bacteria, or an identified organ or part of an organ or specific part of any of the aforesaid specific organisms.

A plurality of specific machines may be a stage in an identified industrial process facility wherein more than one functionally identical specific machines divide a portion of a common input into a parallel process and thereafter into a common output. In this context a semiconductor fabrication facility may divide workflow at a specific stage into one of a group of annealing ovens, presumably because annealing is a time consuming process while other stages of the fabrication are more "instant". This type of "plurality of specific machines" generally occurs at any stage in an industrial process that would otherwise impose a delay on the entire process, unless such a parallel processing is simultaneously precluded for an excessively economically costly machine.

A plurality of specific organisms may be a human family, a herd of dairy cows, or even a fermentation vat.

A conceptual characterization thereof may be a household, a grocery store—in a chain of grocery stores, an elementary school—or a class therein.

A simulation of a model relating thereto may be from an annealing oven modeling, from a line-width etching modeling, from a modeling of public health—and epidemic factorizations therein, from a dairy herd management modeling, from a social modeling of parameters in elementary education, etc.

More specifically, interrelated nodes of graph-directed, expertise-suggested, data-set, relationships; generally may relate to quantitative or qualitative "axioms," which are either accepted as true in a specific domain of applied knowledge, or are postulated by at least one "expert"—according to his long felt suspicions. Diverse situation specific examples of such axioms may include: "Etching line width is primarily dependent on certain specific voltage settings of the etching station," or "An individual cow's milk production is dependent on three specific environmental factors, and four specific nutritional factors," or "The fuel efficiency of a locomotive engine seems to degrade when there has been a lot of up-hill acceleration or a lot of down-hill braking." These expertise-suggested data-set relationships are stored on a memory media of layer 3, however these relations are embodied into a topological graph using facilities in layer 4 of the present protocol-suite.

More specifically, a predetermined measure of inclusion generally relates to a logical intersection between the first plurality of empirical data-sets (associated with layer 1 of the present protocol), and the second plurality of expertise-suggested relationships (associated with layer 3 of the present protocol). Often there is a disparity of scope between the two pluralities. Either there are extra empirical data-sets that have not been addressed as pertinent to relationships, or there are relationships that do not have supporting data-sets from which to test their validity, or there are both—extraneous data-sets and extraneous relationships. It is substantially only in the region of defined relationships having supporting data-sets that any validation can be attempted. This region must be an interconnected entity at the relationship level. The relationship between disjoint relational sub-sets, even if each is supported by its own respective empirical data-sets, is a problem that may only be addressed in layers 6 or 7 of the present protocol. Hence, a predetermined inclusion specifically relates to a topological sub-graph of relationships that can be validated by virtue of having a sufficient pool of empirical records, which can falsify and test each relationship in the sub-graph, according to its respective observed empirical truth. Thus, predetermined in this context relates to a sufficiency for validating according to some statistical metric of certification (e.g.—within a first or second standard deviation of average), or some blanket assertion (e.g.—this can't happen, or—this always happens, or—usually this acts in some prescribed fashion).

More specifically, the data-set resolution of particulars in the first plurality is greater than or equal to that of particulars in the second plurality relates to a situation where the topological complexity of the expertise suggested relationships is not more complex than the supporting data. One may clarify these cases with three examples. Firstly, the most common acceptable modeling situation describes a small number of inter-related variables that can be tested against a large collection of empirical data. Secondly, a less coherent class of modeling exists when each individual instantiation must be tested against substantially the entire empirical data collection, and this occurs when trying to diagnose and treat an individual patient or when trying to tune an individual racing car, etc. However, to describe a model that captures more relationships than there are n-tuples of empirical data-sets, is outside the scope of the present invention. For example, to consider validating the truth of a large literary or poetic semantic description (relationship-model), of an individual item (having few associated empirical data-sets), will not allow any cognitive convergence within the present protocol; and, accordingly, is outside the present scope. In the absence of such a cognitive convergence, the operations performed in the context of layers 5–7 of the present protocol-suite may prove to be computationally divergent.

More specifically, a vantage of a presumption of validity relates to using empirical data in its current form. While many appurtenances may be applied to filter or normalize data, the present invention does not perform these operations. The present invention may be used to characterize an empirical data-set as being statistically distant from other like data-sets. The present invention may also be used to characterize an individual data instance within a data-set as being statistically distant from other like data-instances. However, these characterizations are of secondary importance in the context of the objects of the present invention. The operational postulate of the present invention is that a model, as composed from individual or collective expertise, may be validated and improved, when considered in juxtaposition to empirical data. In the context of the present invention, a data anomaly is an object of study and analysis, not a target for correction. The present invention has an object of finding out what relations characterize this empirical anomaly. It may be that this anomaly is a false representation of the empirical reality. Alternatively, it may be that this anomaly is a statistically rare representative instance of some combination of relationships that might contribute to broadening understanding in the context of a system under study. It is a salient feature of the present invention to disclose and investigate such rare representative instances. Therefore, it would be at cross-purposes to the present invention to automatically filter out the very instances that might be most productive to improving knowledge of a system under study.

More specifically, a validity-metric relates to a synthetic scale assignment that is derived when a relationship, or aggregation of relationships, is quantitatively evaluated, according to the empirical data. Generally, the metric may reflect a reality that an expertise-suggested relationship is completely supported by the data, or that the relationship only accounts for, or correlates with, some measurable part of the data; or, that the relationship is not supported by the data; or, even, that the data supports a relationship contrary to that suggested by an "expert."

More specifically, n-tuple relates to a "multiple of n" ("n" being two or more). In the context of the simulating operation, an n-tuple relates to one or more relations, between two or more nodes, in a directed graph representation for the expertise-suggested data-set relationships.

More specifically, significantly contributes relates to another validity metric than that which was used in the simulating step. Just as for the case of validity metric in the simulating step it is important to know if the empirical data supports the expertise-suggested relationships (between an n-tuple of nodes), it is also important to know this same metric from the vantage of a single node. From the vantage of a single node, one can measure if there is a causal relation between input factors and output results. For example, a node in a process may have temperature designated as a significant input factor to the quality of output products from that node, and this may not necessarily be the case when considered empirically.

Accordingly, the method steps of the search-space organizational validation method relate to:

1st) organizing a search-space for a first plurality of correlated empirical data-sets, by mapping a second plurality of interrelated nodes of graph-directed expertise-suggested data-set relationships onto the first plurality of correlated empirical data-sets, at least until there is a predetermined measure of inclusion by the second plurality of nodes and relationships of particulars in the first plurality data-sets, wherein the data-set resolution of particulars in the first plurality is greater than or equal to that of particulars in the second plurality; and 2nd) validating the search-space from a vantage of a presumption of validity for the first plurality of data-sets, by
 A) simulating a validity-metric for an n-tuple of directed graph components in the mapped second plurality, or
 B) using the validity-metric, measuring if each input to a node of the n-tuple significantly contributes to that node's output, wherein a predetermined convolution of these measurings constitutes a validity-metric for the n-tuple.

The present invention further relates to a program storage device readable by a logic-machine, tangibly embodying a program of instructions, executable by the logic-machine (e.g.—a data-logic processor or a process-modeling computer), to perform method steps for validating a search-space organization, substantially complying with a knowledge-engineering protocol-suite, these method steps including:

1st) organizing a search-space for a first plurality of correlated empirical data-sets, by mapping a second plurality of interrelated nodes of graph-directed expertise-suggested data-set relationships onto the first plurality of correlated empirical data-sets, at least until the second plurality of nodes and relationships substantially includes a predetermined measure of particulars in the first plurality data-sets, wherein data-set resolution of particulars in the first plurality is greater than or equal to that of particulars in the second plurality; and 2nd) validating the search-space from a vantage of a presumption of validity for the first plurality of data-sets, by
 A) simulating a validity-metric for an n-tuple of directed graph components in the mapped second plurality, or
 B) using the validity-metric, measuring if each input to a node of the n-tuple significantly contributes to that node's output, wherein a predetermined convolution of these measurings constitutes a validity-metric for the n-tuple.

Likewise, the present invention relates to a process-modeling computer for use in a distributed asynchronous system of process-modeling computers, substantially according to a knowledge-engineering protocol-suite, the process-modeling computer logically having three active-units, wherein each active-unit has at least one virtual computer processor associated therewith, and wherein the active-units are capable of mutual data-communications interaction, and wherein the process-modeling computer includes:

1st) a first active-unit of the three active-units, and said first active-unit is further capable of data-communications interaction with
 A) sensors or actuators of an associated process-control machine,
 B) at least one other process-modeling computer in the system of process-modeling computers, and
 C) at least one data storage device wherein is collectively represented on at least one memory medium
  1) a first plurality of correlated empirical data-sets including at least one data-set of empirical data for the associated process-control machine, and
  2) a second plurality of interrelated nodes of graph-directed expertise-suggested data-set relationships
   a) wherein the second plurality includes a directed graph component to or from a representation for the associated process-control machine, and
   b) wherein the data-set resolution of particulars in the first plurality is greater than or equal to that of particulars in the second plurality;

2nd) a second active-unit of the three active-units, and the second active-unit is capable of organizing a search-space, for the first plurality of correlated empirical data-sets from the vantage of the associated process-control machine, by mapping, the second plurality of interrelated nodes of graph-directed expertise-suggested data-set relationships onto the first plurality of correlated empirical data-sets, at least until the second plurality of nodes and relationships substantially includes
 A) a predetermined measure of particulars in the at least one data-set of empirical data for the associated process-control machine, and
 B) from the relationships, all directed graph components to or from the associated process-control machine; and 3rd) a third active-unit of the three active-units, and said third active-unit is capable of validating the search-space by
 A) simulating a validity-metric for at least one n-tuple of directed graph components in the mapped second plurality, wherein each said n-tuple includes a directed graph component to or from the associated process-control machine, or
 B) measuring if each input to a node of the n-tuple significantly contributes to that node's output, wherein a predetermined convolution of these measurings constitutes a validity-metric for the n-tuple.

Furthermore, the present invention relates to a distributed asynchronous system of process-modeling computers substantially complying with a knowledge-engineering protocol-suite, the system of process-modeling computers including:

1st) at least one process-modeling terminal wherein at least one of the terminals includes a program storage device as described (above);

2nd) a plurality of process-modeling computers wherein each computer is as described (immediately above);

3rd) a data-communications interaction conduit providing sufficient transactional data exchange services A) between the plurality of process-modeling computers;

B) between at least one of the process-modeling terminals and the plurality of process-modeling computers; and C) between the process-modeling terminals.

In order to further facilitate a coherent appreciation of the broad aspects of present invention, an analogous comparison to the well-known ISO (International Standards Organization) OSI (Open Systems Interconnection) reference model must be noted. This analogous construction is used to organize the many interrelated aspects of the present invention, and to emphasize which outstanding needs of the prior art are beneficially invigorated thereby.

The well-known ISO (International Standards Organization) OSI (Open Systems Interconnection) reference model describes a broad categorization for protocol-suites and elements therein (described in the General Background Of The Invention section, and more specifically in cited references). This model has proved to be very useful in a broad spectrum of data-communications applications; especially for understanding the structure of large systems; and furthermore for developing operable standards for each part of such structures. Other reference models have been developed (e.g.—the US Department of Defense's four-layer reference model). While these other reference models may be conceptually equivalent functionally, they have not proved to be as convenient as the OSI reference model; especially with respect to the interrelated aspects of expressing standards and facilitating understanding.

In a larger context than the ISO reference model, the present invention relates to a knowledge-engineering protocol-suite for facilitating open systems interconnection transactions in a seven-layer reference model. This knowledge-engineering protocol-suite includes: either firstly a process modeling computer for relating layers 1–3, secondly a search-space organizational validation method for relating layers 3–5, and thirdly a knowledge-engineering work station for relating layers 5–7; or equivalently a distributed asynchronous system of process modeling computers for relating layers 1–7.

Therefore, the present invention may be described as including 11 aspects:

seven mono-layer aspects (each corresponding to a single layer of the suite of the present invention), three tri-layer meta-aspects (specifically layers 1–3, 3–5, and 5–7 of the suite of the present invention), and one septa-layer mega-aspect (being especially useful for appreciating substantially-decentralized implementations of the suite of the present invention).

These 11 aspects substantially correspond to respective computer programs, systems of computer programs, and computer architectures, integrating these systems.

The seven-layer reference model for facilitating open systems interconnection transactions is defined in the context of the present invention as having: a seven layer knowledge-engineering protocol-suite wherein:

Layer 1 relates to embodiments of a physical layer from which data about physical input, process, or output attributes, is collected or targeted. The physical layer may be tied to a physical machine such as a process-controlled machine. The physical layer may be tied to a data input terminal through which input, process, or output data may be collected. The physical layer may be tied to a data output terminal (or a printer) through which input, process, or output transactions may be targeted, reports generated, work-orders authorized, process-control parameters modified, etc. In all of these examples, the physical layer is tied to an accessible data storage media.

Layer 2 relates to embodiments of a data-link layer data-communications (including, for example-the ISO OSI model type data-communications per se, inter-net, intra-net, WAN, LAN, and DBMS).

Layer 3 relates to embodiments of a data-set network layer having therein the first plurality data-sets, the second plurality data sets, and other data banks, which may yield content that can be manually or automatically transformed into the aforesaid pluralities.

Layer 4 relates to a transport layer wherein token correspondence (adjacency list) constructions are mapped within each plurality and between sets of the pluralities.

Layer 5 relates to a session layer wherein validation or simulation of the layer 4 mappings may be run on layer 3 data, or as an on the fly control system on layer 1 data.

Layer 6 relates to a presentation layer wherein design of experiments may be articulated for specific sessions.

Layer 7 relates to an application layer wherein a broader construction of experimental strategy may be articulated such as an n-tuple strategy.

Furthermore, in the context of more preferred scale embodiments of the present invention, the knowledge-engineering protocol-suite pertains to:

three tri-layer meta-aspects (specifically layers 1–3, 3–5, and 5–7 of the suite of the present invention, respectively integrated), that relate to three large embodiments of the present invention, and one septa-layer mega-aspect (being especially useful for appreciating substantially-decentralized implementations of the suite of the present invention), that relates to the preferred embodiments of the present invention.

BRIEF DESCRIPTION OF THE FIGURES AND APPENDICES

In order to understand the invention and to see how it may be carried out in practice, embodiments including the preferred embodiment will now be described, by way of non-limiting example only, with reference to the accompanying drawings; in which FIGS. 1–29 are schematic presentations, specifically:

Figure 30:
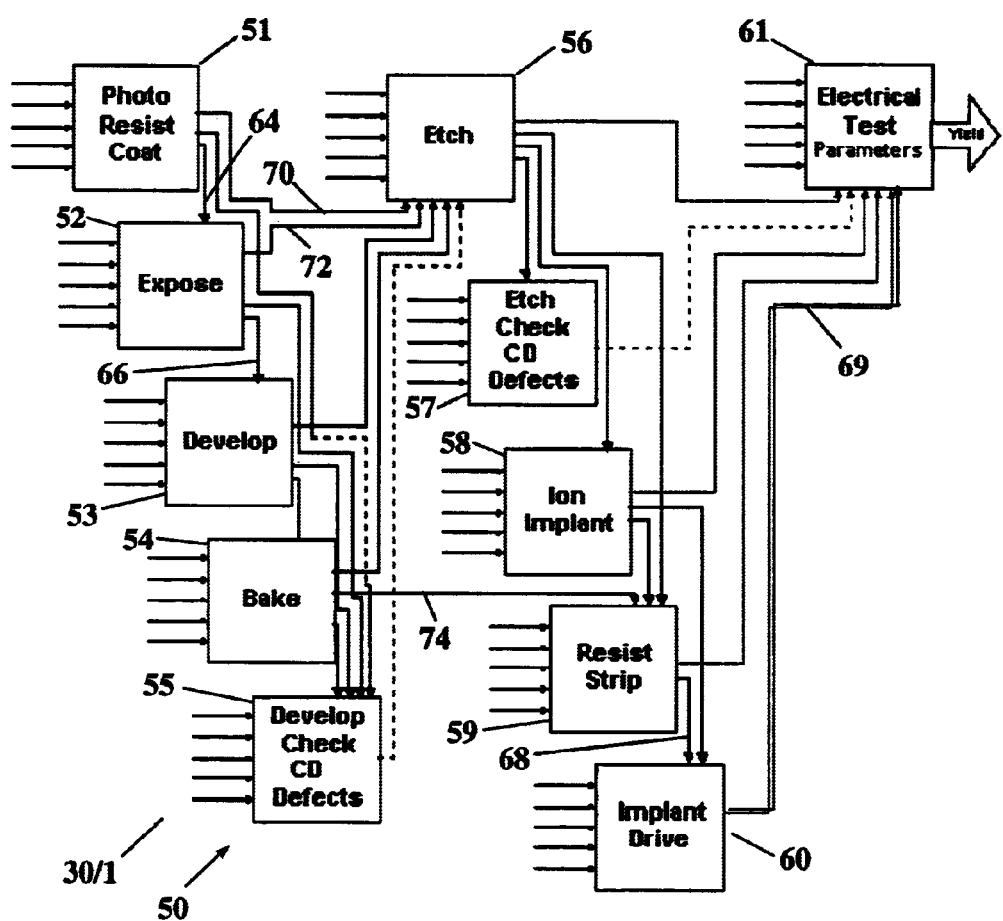

FIG. 30 portrays a typical schematic knowledge-tree representation example; and

Figure 31A:
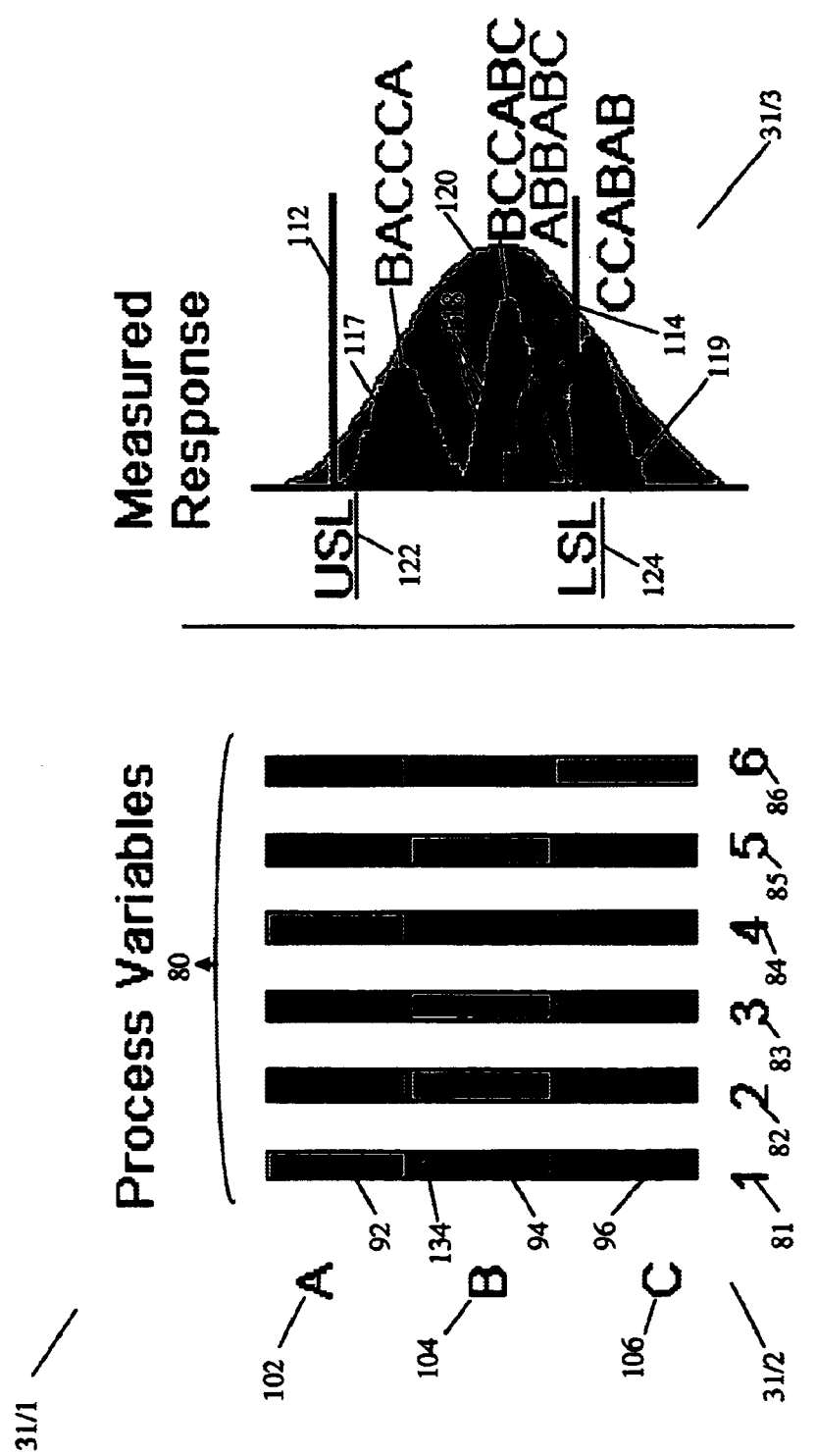

FIG. 31A portrays a set up for a schematic analysis diagram for SPC.

Figure 31B:
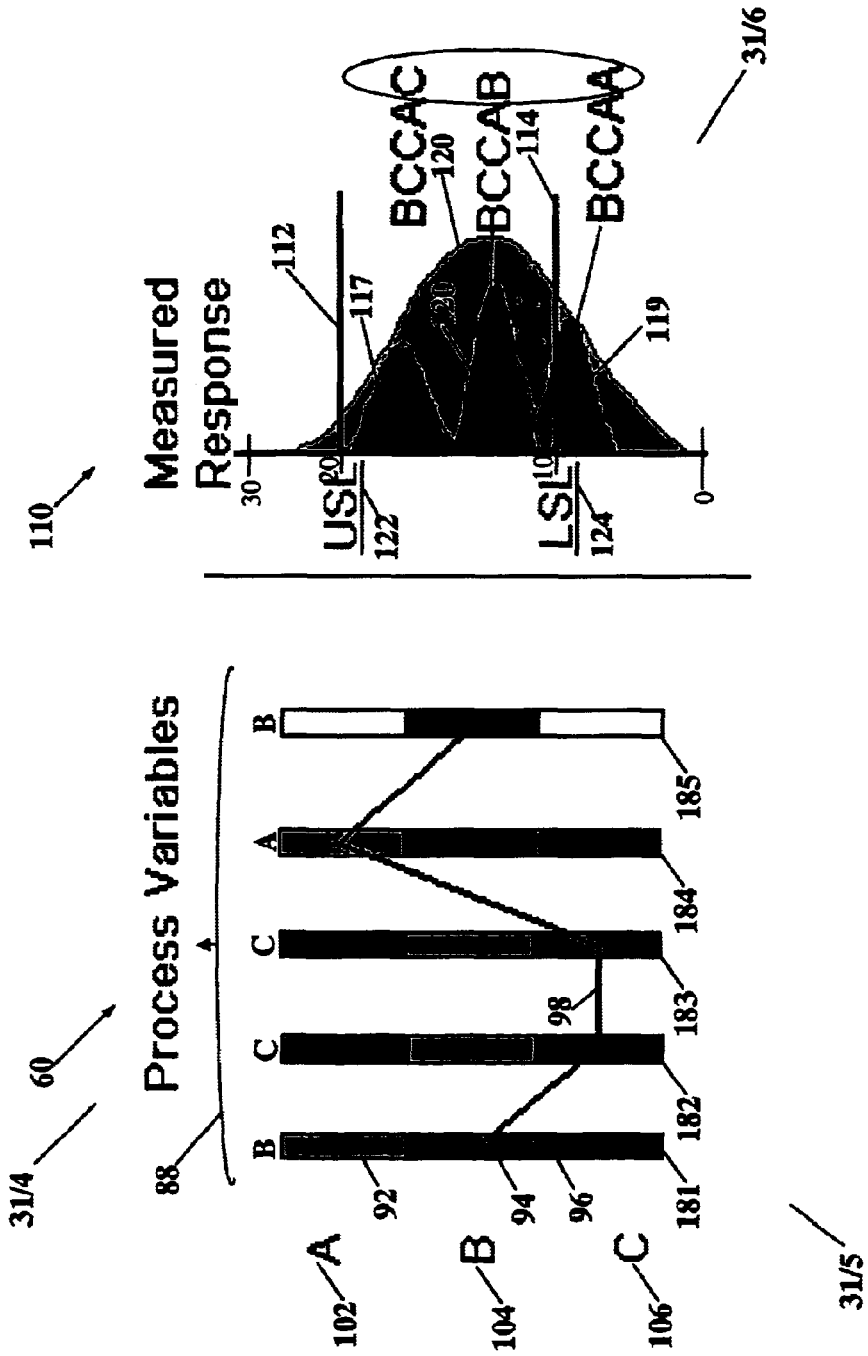

FIG. 31B portrays a typical schematic

Figure 32:
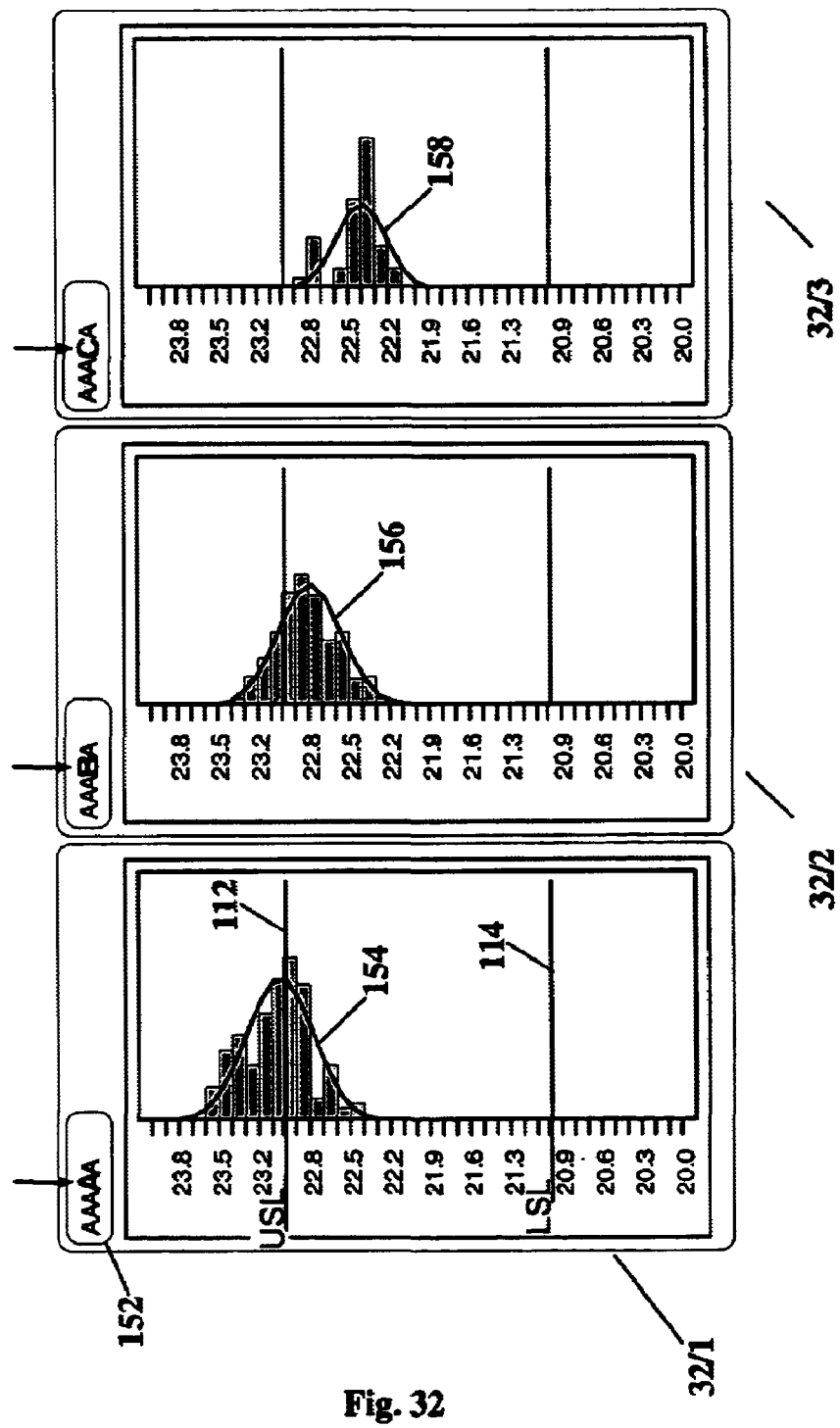

FIG. 32 portrays an analysis diagram for a conditional SPC example.

Figure 33:
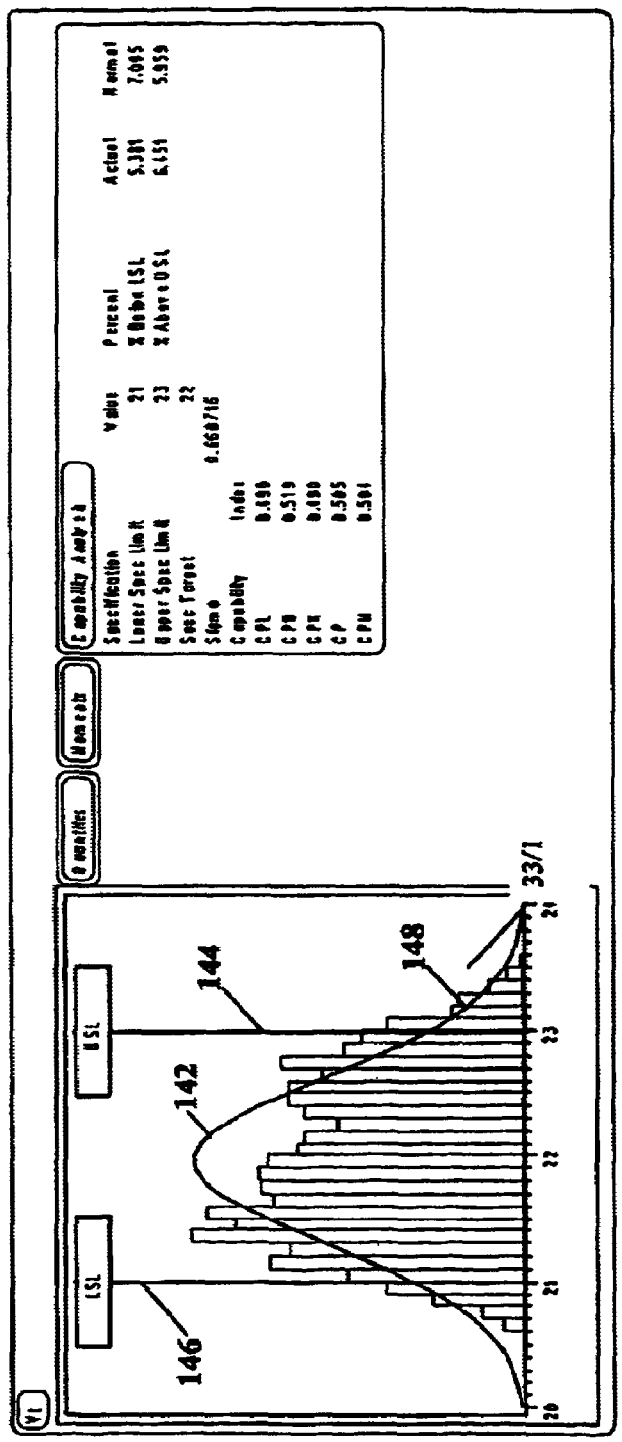

FIG. 33 portrays a diagram for a conditional SPC example.

Appendix 1 presents, software code on Microfiche, from which potentially executable code which can be derived, for running a prototype of a system embodying aspects of the present invention; and includes therein an organized collection of source code, documentation thereof, sample menus, and other working appurtenances that have been developed for use therewith; and Appendix 2 presents, also on the Microfiche, source code independent descriptive notes, and other working papers that have been written in the course of the development of the prototype of appendix 1, especially according to the most recent preferred enabling embodiment.

DETAILED DESCRIPTION OF THE FIGURES AND APPENDICES

Figure 1:
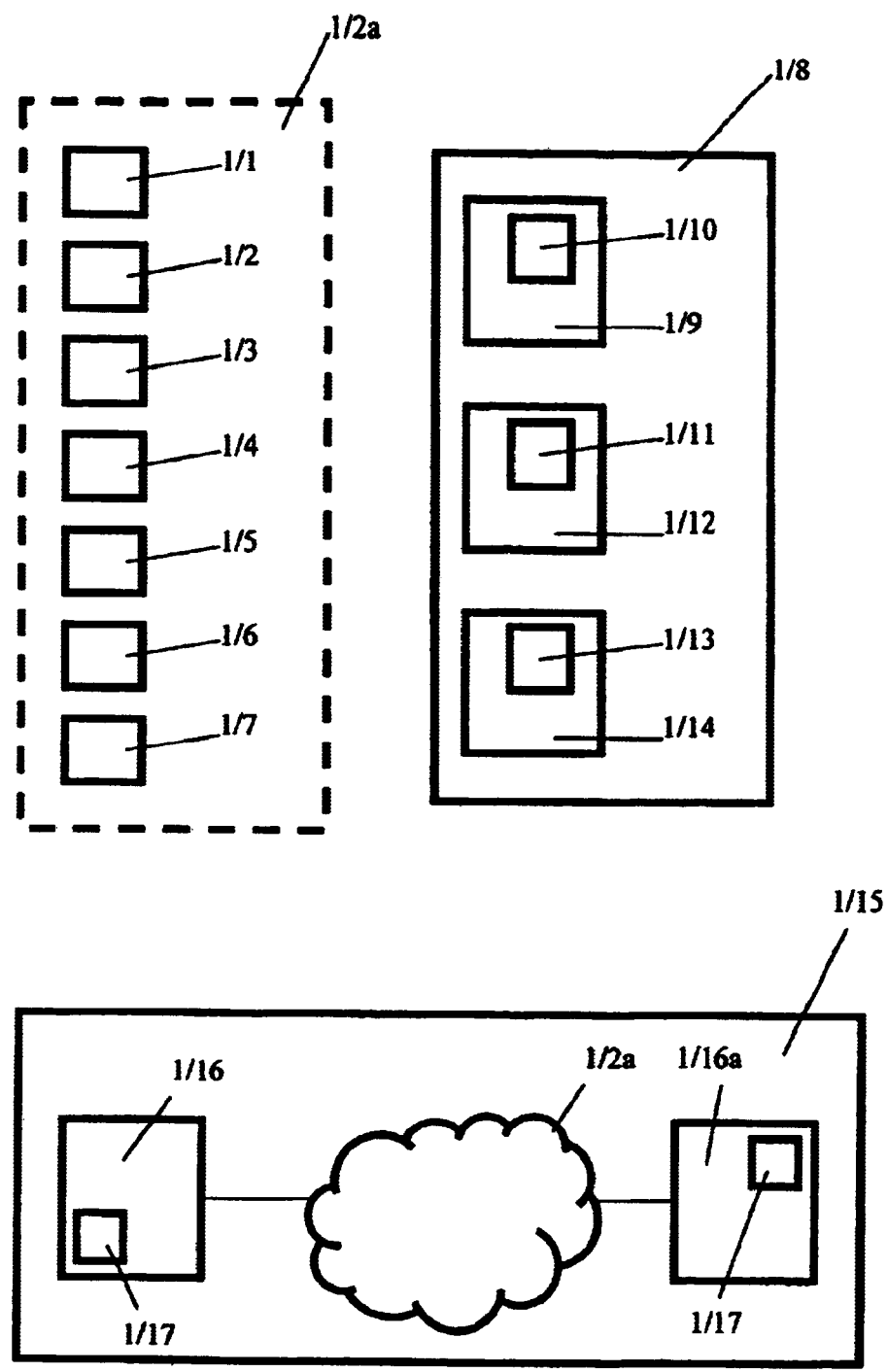
FIG. 1 illustrates systems complying with a knowledge-engineering protocol-suite.

FIG. 1 relates to a knowledge-engineering protocol-suite for facilitating open systems interconnection transactions in a multi-layer knowledge-engineering reference model substantially having Layer 1—(1/1) a physical layer for interfacing with apparatus (e.g. 2/1);

Layer 2—(1/2) (1/2a) a data-link layer for facilitating data-communications within any of these Layers 1–7 or between any plurality of these Layers 1–7;

Layer 3—(1/3) a network layer for maintaining transactional access to data ensembles;

Layer 4—(1/4) a transport layer for organizing and maintaining token correspondences and adjacency lists wherein are represented network layer relationships between the data sets or between elements in the data sets;

Layer 5—(1/5) a session layer for validating the transport layer represented relationships and for simulating alternative transport layer relationships;

Layer 6—(1/6) a presentation layer for designing and executing experimental session layer simulations, evaluations thereof and modifications thereto; and Layer 7—(1/7) an application layer for prioritizing n-tuple strategy dynamics of presentation layer transactions;

wherein the knowledge-engineering protocol-suite includes: either a structured system (1/8) having at least one process-management computer (1/9) with a program (1/10) for relating Layers 1–3, at least one computer (1/11) embodying a search-space organizational validation method program (1/12) for relating Layers 3–5, and at least one knowledge-engineering workstation (1/13) with a program (1/14) for relating Layers 5–7; or equivalently a distributed asynchronous system (1/15) of process-modeling computers (1/16) (1/16a) with programs (1/17) (1/17a) for relating Layers 1–7.

Figure 2:
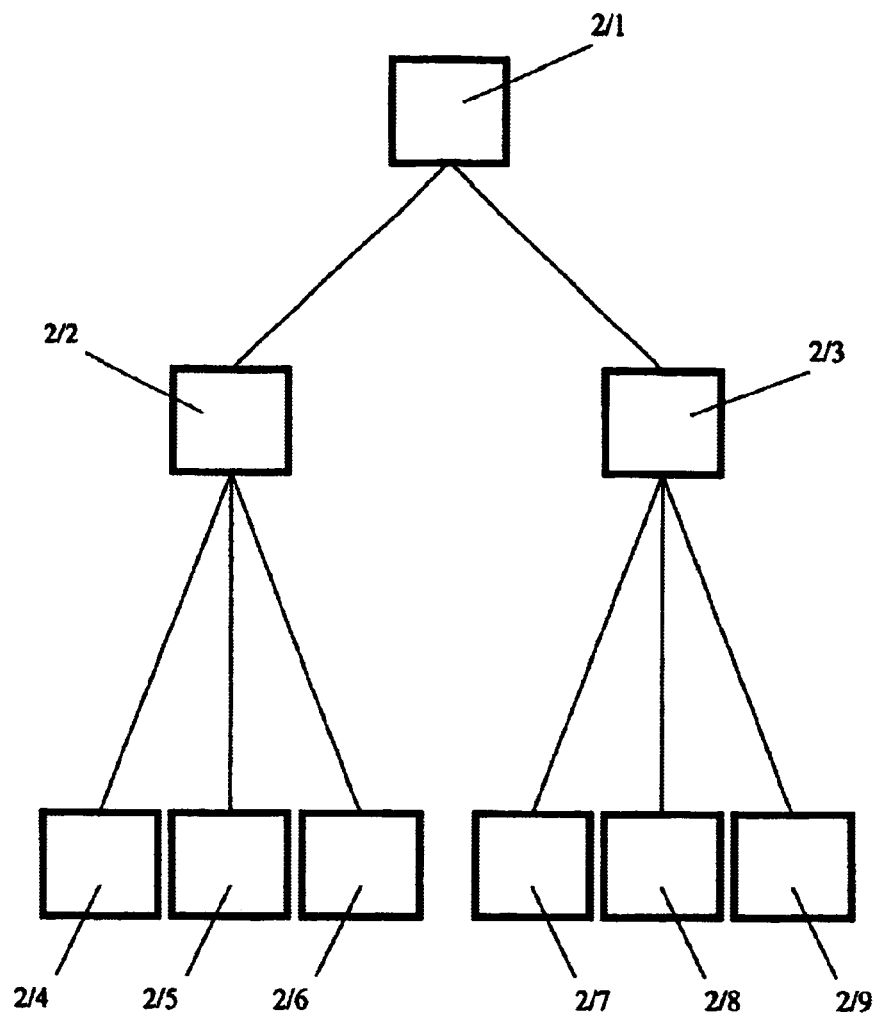
FIG. 2 illustrates apparatus included in the systems of FIG. 1.

FIG. 2 relates to the protocol-suite, as was illustrated in FIG. 1, wherein the process-management computer or a process-modeling computer includes apparatus (2/1) interfacing with the physical layer, used by the process-management computer or by the distributed asynchronous system of process-modeling computers, and these apparatus' are selected from data-communications devices (2/2) or process-control machines (2/3), and the data-communications devices are for input (2/4) or data storage (2/5) or output (2/6), and the process-control machines have sensors (2/7) or program storage (2/8) or actuators (2/9).

Figure 3:
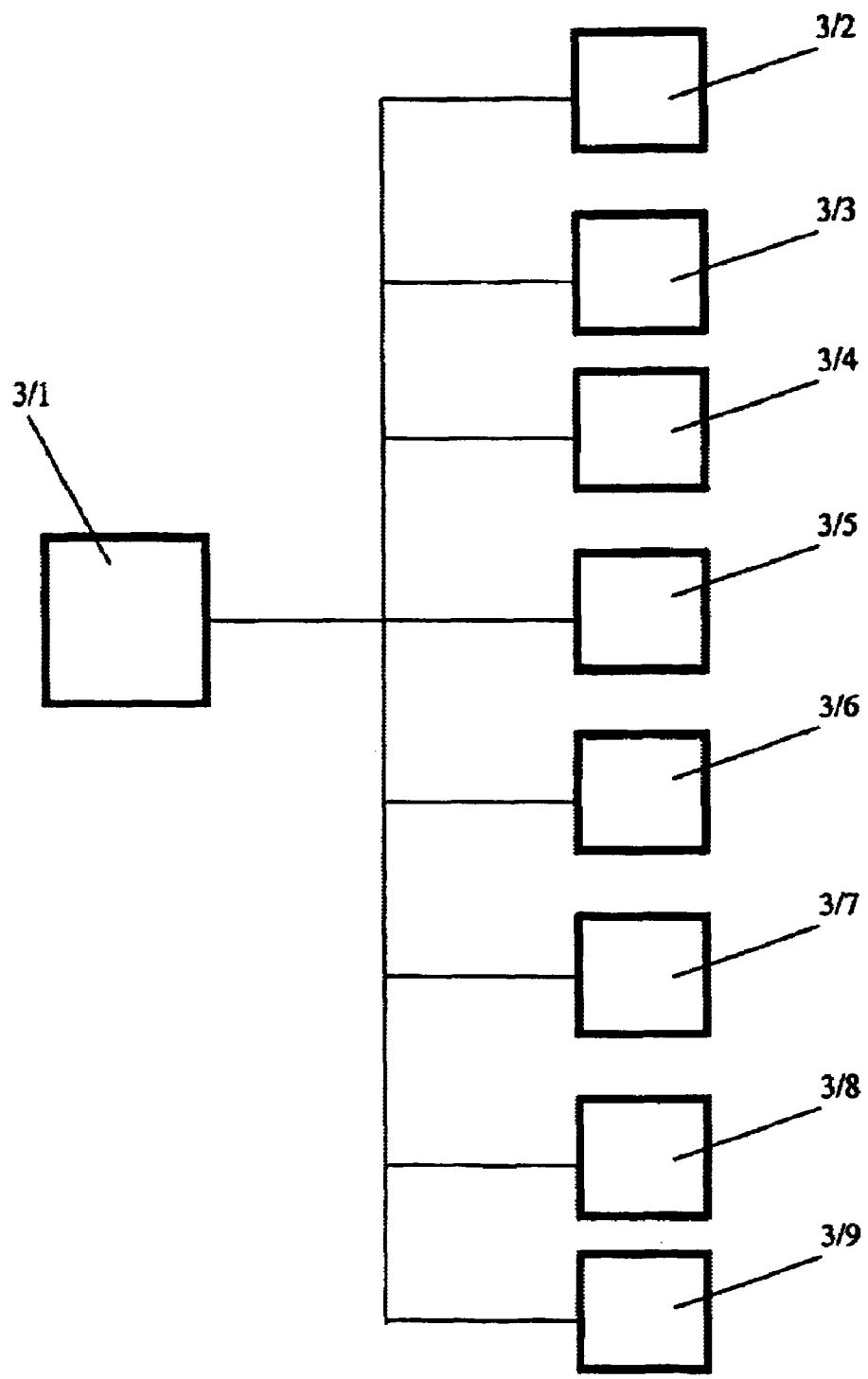
FIG. 3 illustrates optional layer 2 protocols for use in the systems of FIG. 1.

FIG. 3 relates to the protocol-suite as was illustrated in FIG. 1 wherein any said program (e.g. (1/10) (1/17) (1/17a)) relating to the data-link layer, used by the process-management computer (e.g. (1/9)) or by the computer (e.g. (1/11)) embodying a search space organizational validation method, or by the knowledge-engineering workstation (e.g. (1/13)), or by the distributed asynchronous system (e.g. (1/15)) of process-modeling computers (e.g. (1/16) (1/16a)), and used for facilitating data-communications within any of the layers 1–7 or between any plurality of the layers 1–7 as required therein, includes at least one data communications protocol (3/1) selected from the list:

ISO OSI model type protocol (3/2),
inter-net type protocol (3/3),
intra-net type protocol (3/4),
Wide Area Net work type protocol (3/5),
Local Area Network type protocol (3/6),
Data Base Management System type protocol (3/7),
inter-processor type protocol (3/8),
intra-processor type protocol (3/9).

Figure 4:
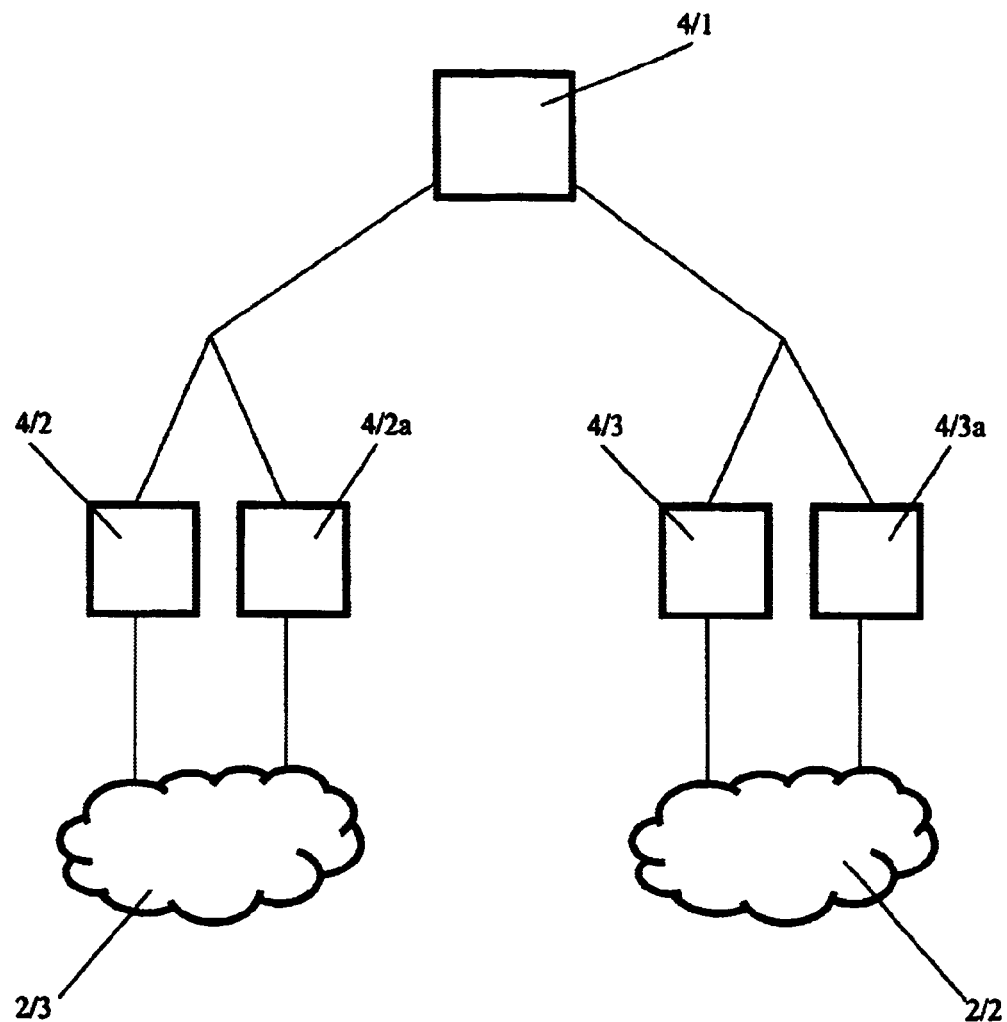
FIG. 4 illustrates useful data-ensembles in the context of the systems of FIG. 1.

FIG. 4 relates to the protocol-suite as was illustrated in FIGS. 1 and 2 wherein any said program (e.g. (1/10) (1/12) (1/17) (1/17a)) relating to the network layer, used by the process-management computer (e.g. (1/9)) or by the computer (e.g. (1/11)) embodying a search space organizational method, or by the distributed asynchronous system (e.g. (1/15)) of process-modeling computers (e.g. (1/16) (1/16a)), and used for maintaining transactional access to data ensembles (4/1), includes in said data ensembles a first plurality of correlated empirical data-sets (4/2) (4/2a) substantially derived from the process-control machines (e.g. (2/3)) and a second plurality of interrelated nodes of graph-directed expertise-suggested data-set relationships (4/3) (4/3a) substantially derived from the data-communications devices (e.g. (2/2)).

Figure 5:
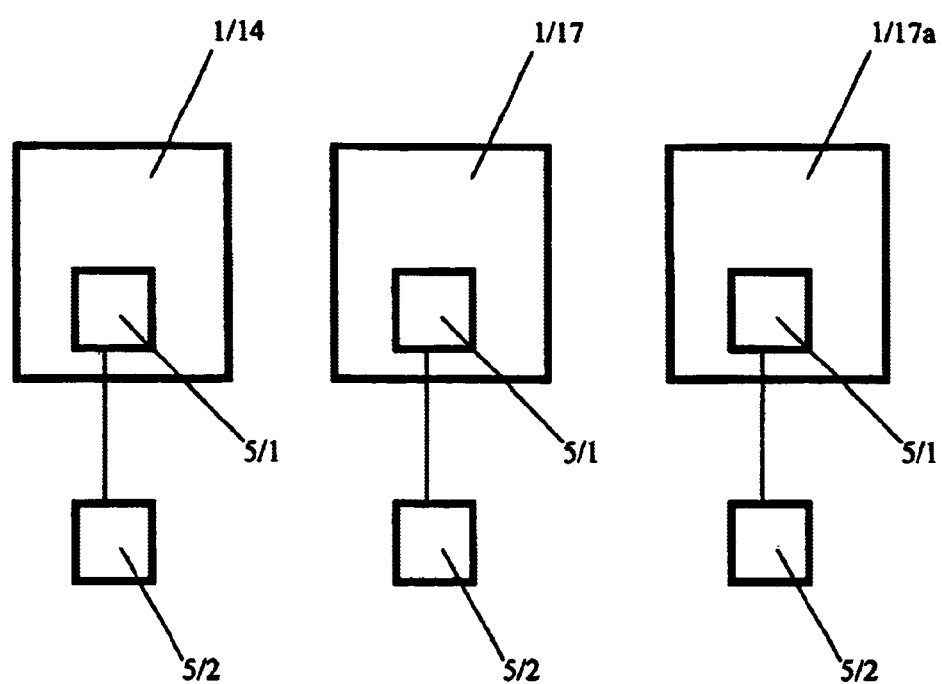
FIG. 5 illustrates localization of graph-theoretic orderings in the context of the systems of FIG. 1.

FIG. 5 relates to the protocol-suite as was illustrated in FIG. 1 wherein any said program (e.g. (1/14) (1/17) (1/17a))

relating to the application layer, used by the knowledge-engineering workstation (e.g. (1/13)) or by the distributed asynchronous system (e.g. (1/15)) of process-modeling computers (e.g. (1/16) (1/16a)), and used for (5/1) prioritizing n-tuple strategy dynamics of presentation layer transactions as required therein, includes performing graph-theoretic orderings (5/2) of elements or of sets, and said orderings are performed sequentially, in parallel, concurrently, synchronously, asynchronously, heuristically, or recursively.

Figure 6:
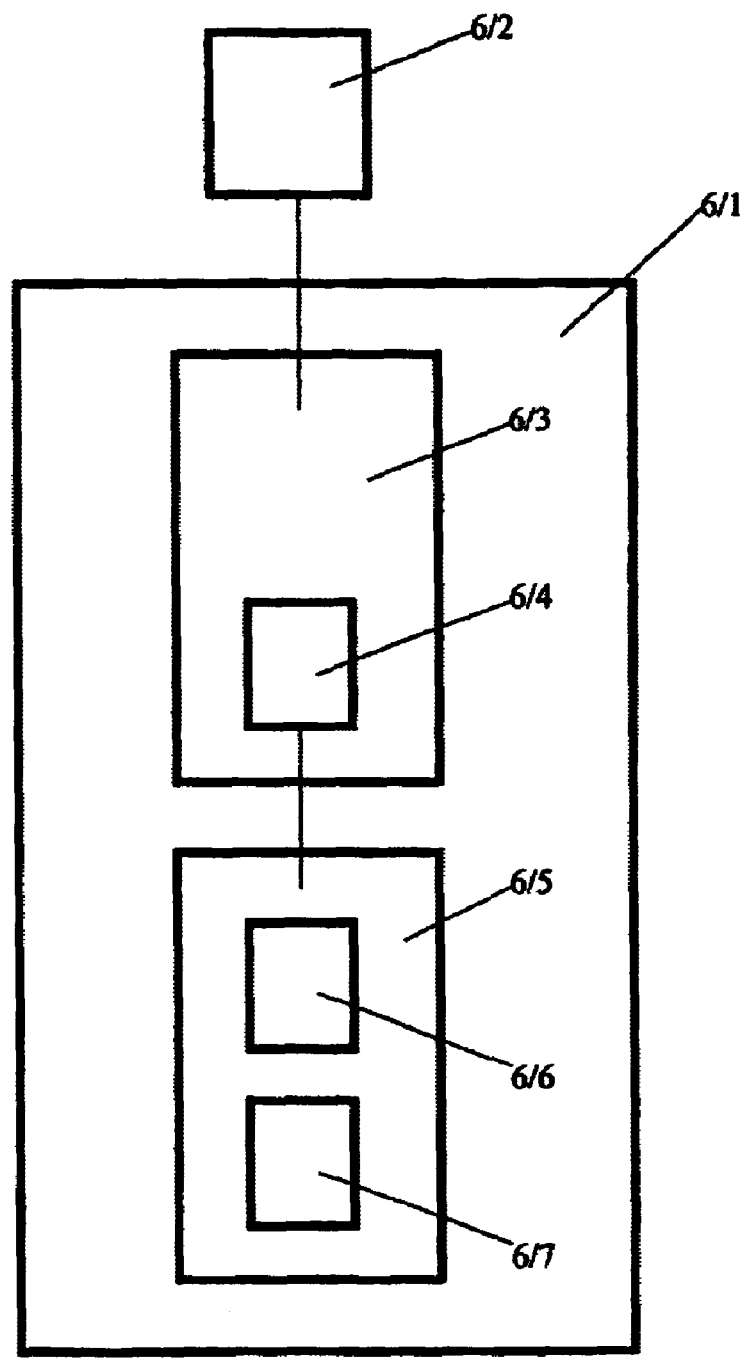
FIG. 6 illustrates a program storage device.

FIG. 6 relates to a program storage device (6/1) readable by a logic-machine (6/2), tangibly embodying a program (e.g. (1/12) in FIG. 1) of instructions executable by the logic-machine to perform method steps for validating a search-space organization substantially complying with a knowledge-engineering protocol-suite, said method steps including:

organizing (6/3) a search-space for a first plurality of correlated empirical data-sets, by mapping (6/4) a second plurality of interrelated nodes of graph-directed, expertise-suggested, data-set, relationships onto the first plurality of correlated empirical data-sets, at least until the second plurality of nodes and relationships substantially includes a predetermined measure of particulars in the first plurality data-sets, wherein data-set resolution of particulars in the first plurality is greater than or equal to that of particulars in the second plurality; and validating (6/5) the search-space from a vantage of a presumption of validity for the first plurality of data-sets, by simulating (6/6) a validity-metric for an n-tuple of directed graph components in the mapped second plurality, or measuring (6/7) if each input to a node of the n-tuple significantly contributes to that node's output, wherein a predetermined convolution of these measurings constitutes a validity-metric for the n-tuple.

Figure 7:
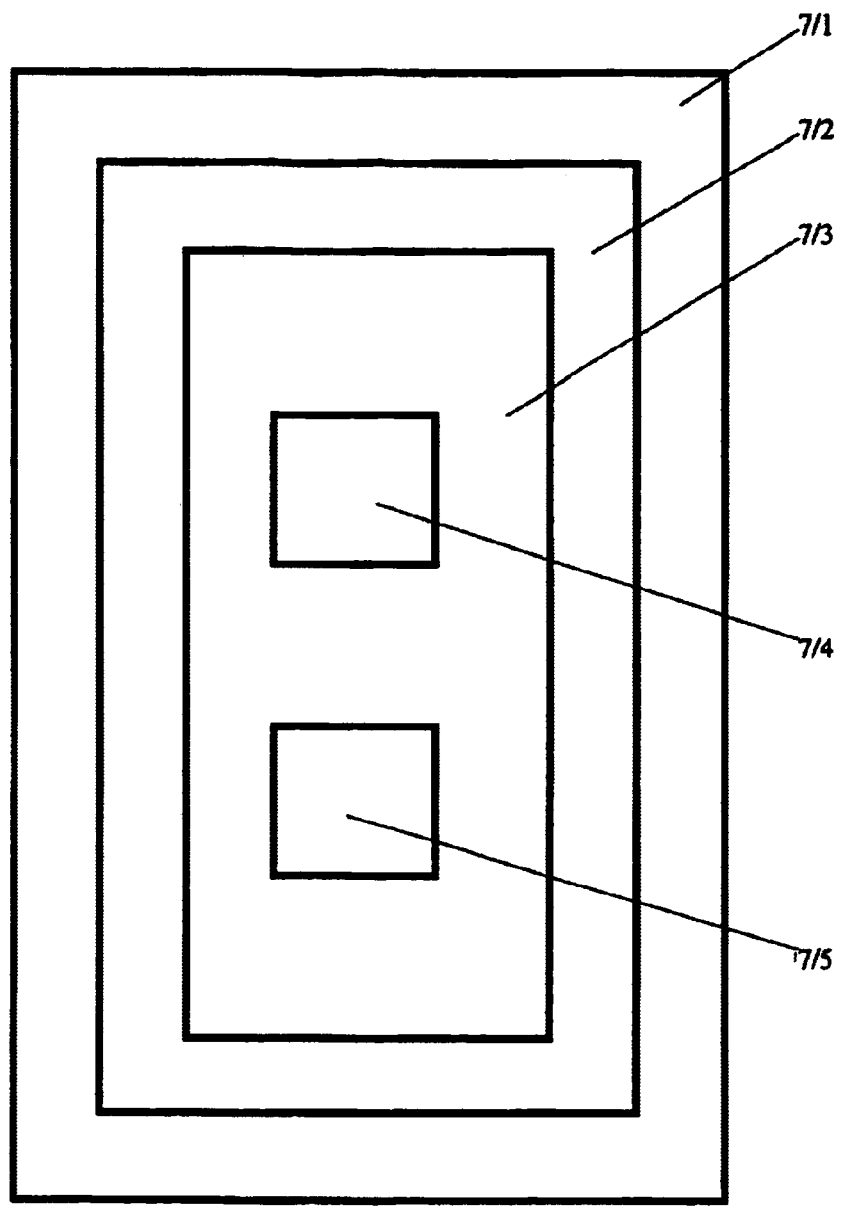
FIG. 7 illustrates an article of manufacture.

FIG. 7 relates to an article of manufacture (7/1) including a computer usable medium (7/2) having computer readable program code (7/3) embodied therein a method for validating a search-space organization and substantially complying with a knowledge-engineering protocol-suite, the computer readable program (e.g. (1/12)) code in said article of manufacture including:

computer readable program code (7/4) for causing a computer to organize a search-space for a first plurality of correlated empirical data-sets, by mapping a second plurality of interrelated nodes of graph-directed expertise-suggested data-set relationships onto the first plurality of correlated empirical data-sets, at least until the second plurality of nodes and relationships substantially includes a predetermined measure of particulars in the first plurality data-sets, wherein the data-set resolution of particulars in the first plurality is greater than or equal to that of particulars in the second plurality; and computer readable program code (7/5) for causing the computer to validate the search-space from a vantage of a presumption of validity for the first plurality of data-sets, by simulating a validity-metric for an n-tuple of directed graph components in the mapped second plurality or measuring if each input to a node of the n-tuple significantly contributes to that node's output, wherein a predetermined convolution of these measurings constitutes a validity-metric for the n-tuple.

Figure 8:
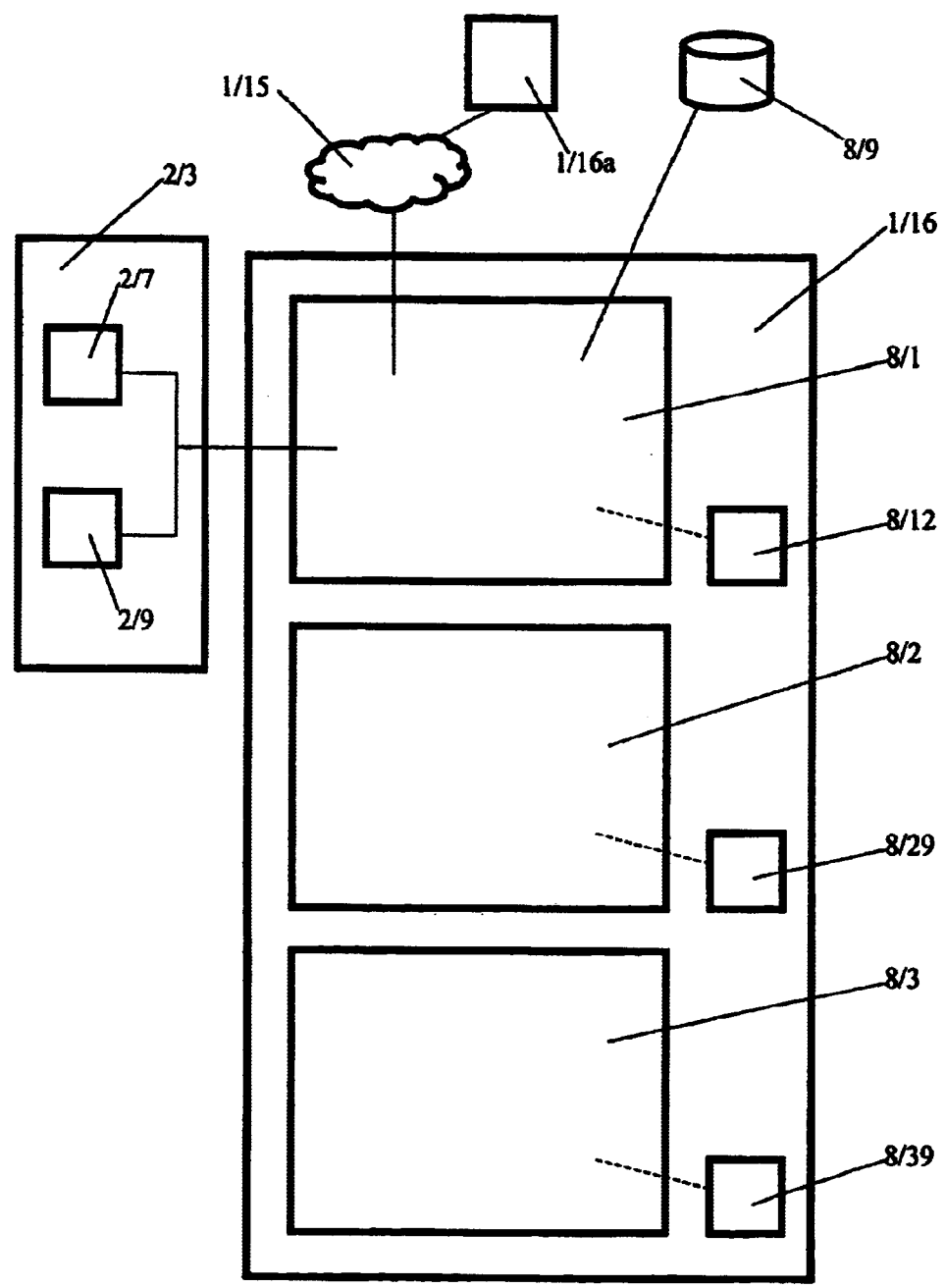
FIG. 8 illustrates a process-modeling computer.

FIG. 8 relates to a process-modeling computer (1/16) for use in a distributed asynchronous system (e.g. (1/15)) of process-modeling computers substantially according to a knowledge-engineering protocol-suite, the process-modeling computer logically having three active-units (8/1) (8/2) (8/3) wherein each active-unit has at least one virtual computer processor associated therewith (8/12) (8/29) (8/39) and wherein the active-units are capable of mutual data-communications interaction, and the process-modeling computer includes:

a first active-unit (8/1) of the three active-units, and said first active-unit is further capable of data-communications interaction with sensors (e.g. (2/7)) or actuators (e.g. (2/9)) of an associated process-control machine (e.g. (2/3)), at least one other process-modeling computer (e.g. (1/16a)) in the system of process-modeling computers, and at least one data storage device (8/9) wherein is collectively represented on at least one memory medium a first plurality of correlated empirical data-sets including at least one data-set of empirical data for the associated process-control machine (e.g. (2/3) in FIG. 2), and a second plurality of interrelated nodes of graph-directed expertise-suggested data-set relationships wherein the second plurality includes a directed graph component to or from a representation for the associated process-control machine, and wherein the data-set resolution of particulars in the first plurality is greater than or equal to that of particulars in the second plurality;

a second active-unit (8/2) of the three active-units, and the second active-unit is capable of organizing a search-space, for the first plurality of correlated empirical data-sets from the vantage of the associated process-control machine, by mapping, the second plurality of interrelated nodes of graph-directed expertise-suggested data-set relationships onto the first plurality of correlated empirical data-sets, at least until the second plurality of nodes and relationships substantially includes a predetermined measure of particulars in the at least one data-set of empirical data for the associated process-control machine, and from the relationships, all directed graph components to or from the associated process-control machine; and a third active-unit (8/3) of the three active-units, and said third active-unit is capable of validating the search-space by simulating a validity-metric for at least one n-tuple of directed graph components in the mapped second plurality, wherein each said n-tuple includes a directed graph component to or from the associated process-control machine, or measuring if each input to a node of the n-tuple significantly contributes to that node's output, wherein a predetermined convolution of these measurings constitutes a validity-metric for the n-tuple.

Figure 9:
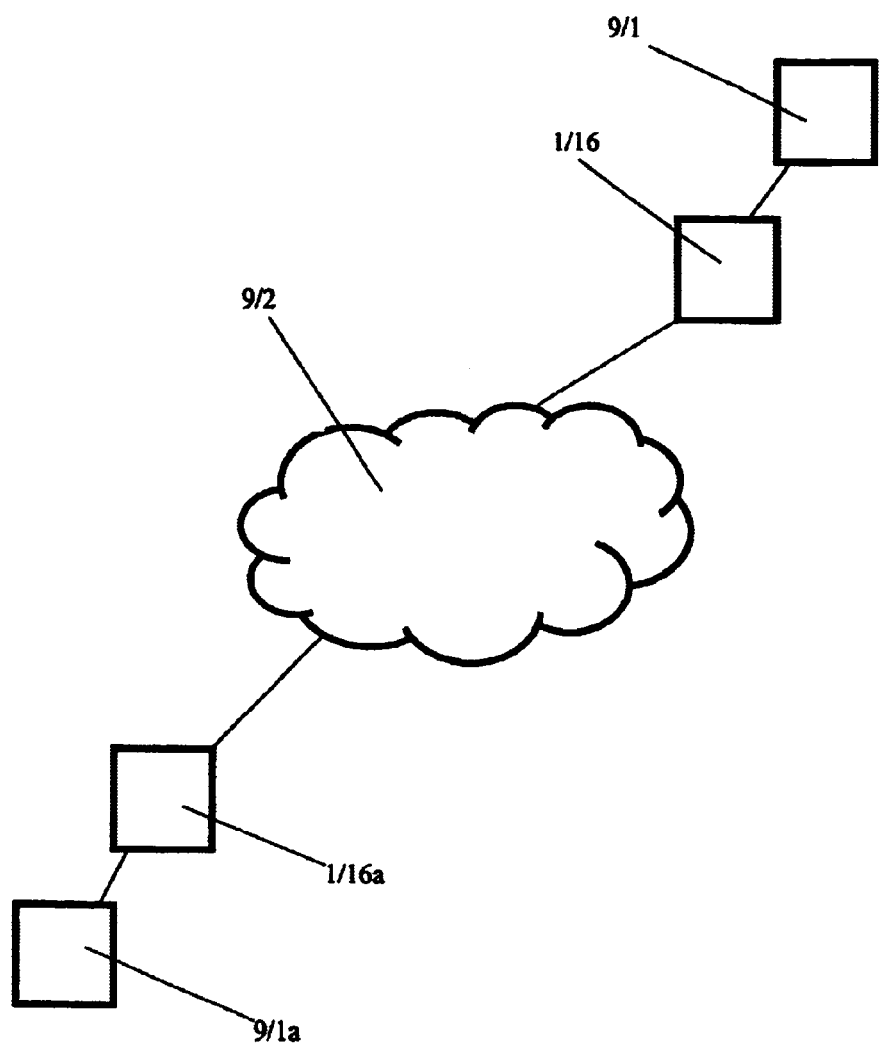
FIG. 9 illustrates a distributed asynchronous system of process-modeling computers.

FIG. 9 relates to a distributed asynchronous system (1/15 in FIG. 1) of process-modeling computers substantially complying with a knowledge-engineering protocol-suite, the system of process-modeling computers including:

at least one process-modeling terminal (9/1) (9/1a) wherein at least one of the terminals includes a program storage device (6/1) as was illustrated in FIG. 6;

a plurality of process-modeling computers (1/16) (1/16a) wherein each computer is as was illustrated in greater detail in FIG. 8;

a data-communications interaction conduit (9/2) providing sufficient transactional data exchange services
between the plurality of process-modeling computers;
between at least one of the process-modeling terminals and the plurality of process-modeling computers; and
between the process-modeling terminals.

Figure 10:
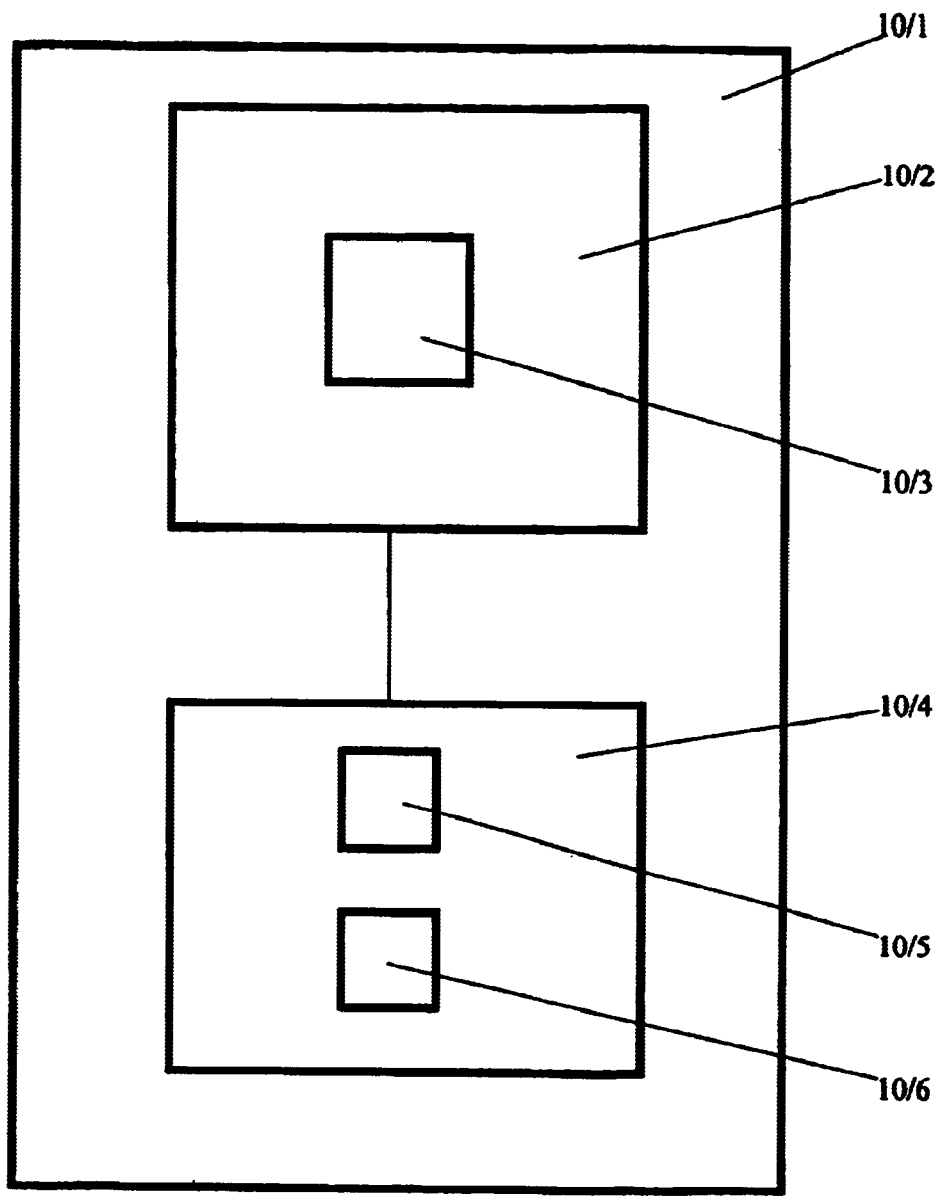
FIG. 10 illustrates a method of search space organizational validation.

FIG. 10 relates to a search-space organizational validation method (10/1) substantially complying with a knowledge-engineering protocol-suite, the method including the steps of:

organizing (10/2) a search-space for a first plurality of correlated empirical data-sets, by mapping (10/3) a second plurality of interrelated nodes of graph-directed expertise-suggested data-set relationships onto the first plurality of correlated empirical data-sets, at least until there is a predetermined measure of inclusion by the second plurality of nodes and relationships of particulars in the first plurality data-sets, wherein the data-set resolution of particulars in the first plurality is greater than or equal to that of particulars in the second plurality; and validating (10/4) the search-space from a vantage of a presumption of validity for the first plurality of data-sets, by simulating (10/5) a validity-metric for an n-tuple of directed graph components in the mapped second plurality, or measuring (10/6) if each input to a node of the n-tuple significantly contributes to that node's output, wherein a predetermined convolution of these measurings constitutes a validity-metric for the n-tuple.

Figure 11:
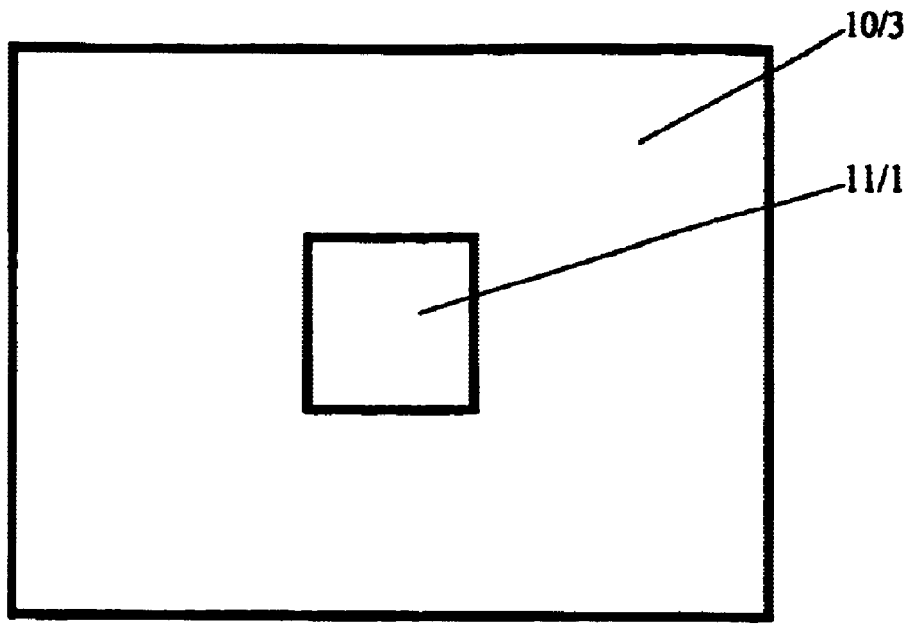
FIGS. 11–15 illustrate variations of the method of FIG. 10.

FIG. 11 relates to the method as was illustrated in FIG. 10 wherein mapping (10/3) includes defining (11/1) substantially every node in the second plurality to have at least one graph-directed input and at least one graph-directed output.

Figure 12:
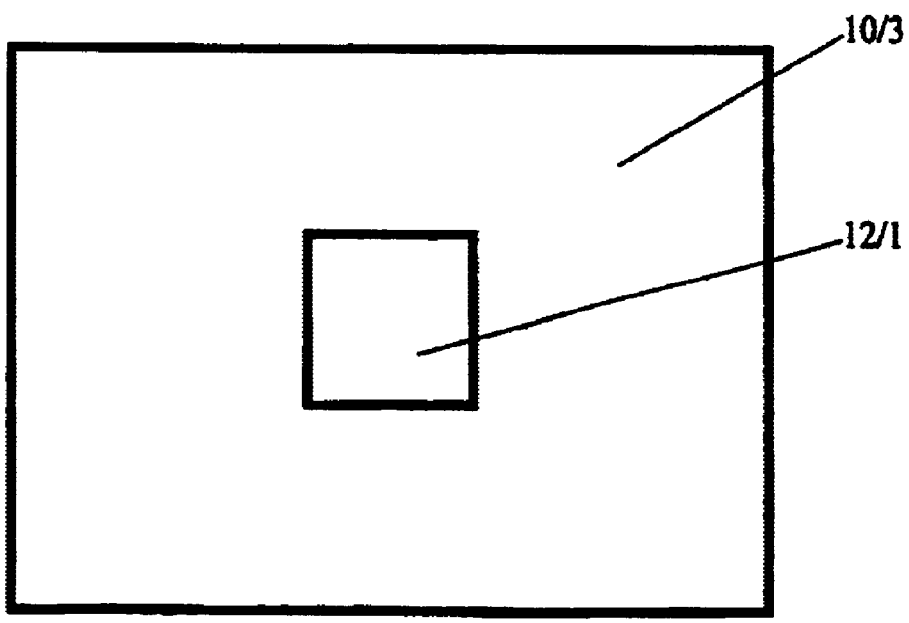

FIG. 12 relates to the method as was illustrated in FIG. 10 wherein mapping (10/3) includes defining (12/1) substantially every node in the second plurality to have only one graph-directed output.

Figure 13:
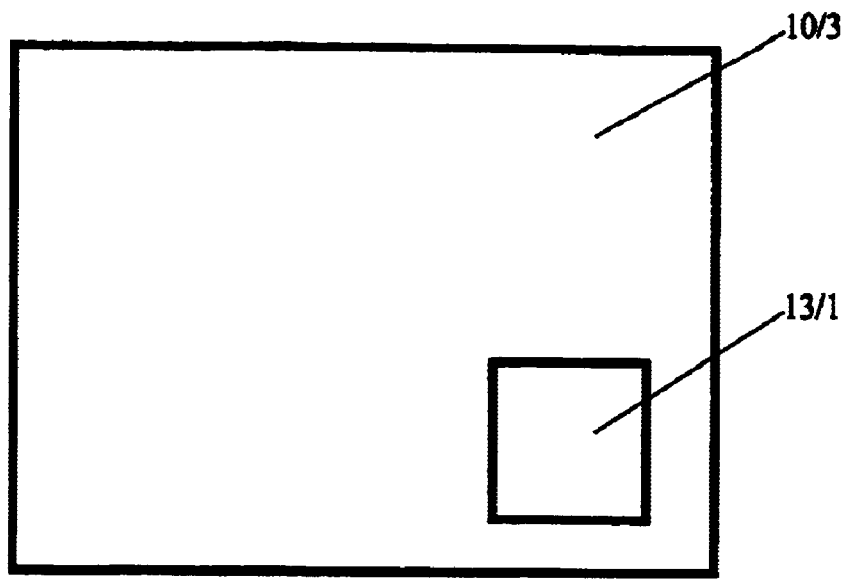

FIG. 13 relates to the method as was illustrated in FIG. 10 wherein mapping (10/3) includes standardizing (13/1) a format representation for nodes or relationships in the second plurality.

Figure 14:
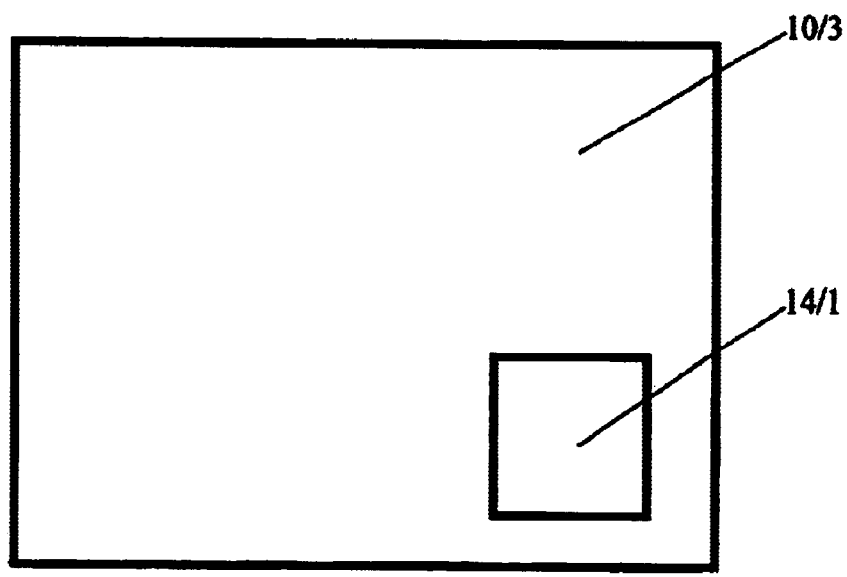

FIG. 14 relates to the method as was illustrated in FIG. 10 wherein mapping (10/3) includes representing (14/1) graph-directed data-set relationships using expertise-suggested initial weightings.

Figure 15:
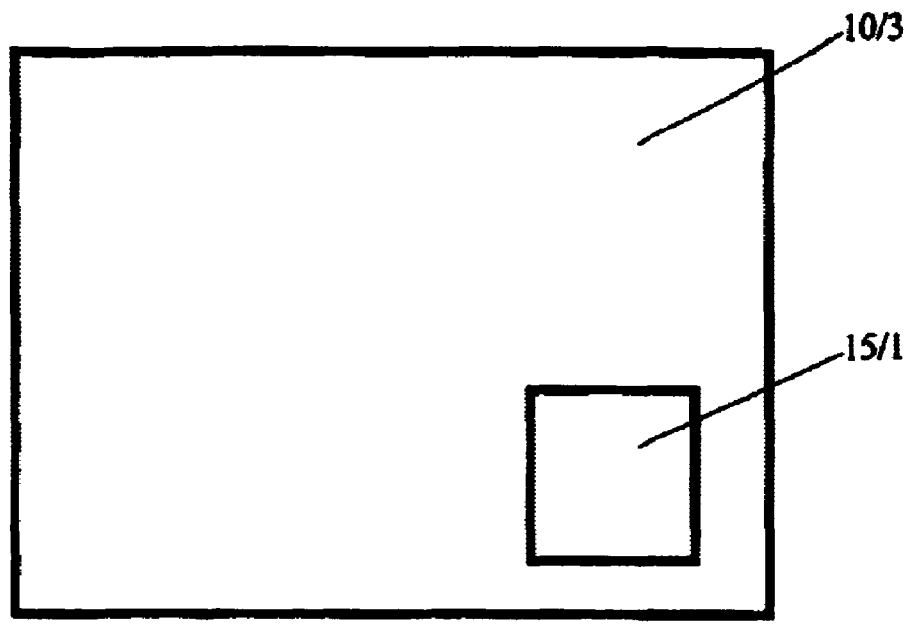

FIG. 15 relates to the method as was illustrated in FIG. 10 wherein mapping (10/3) includes representing (15/1) graph-directed data-set relationships using initial weightings based on statistical process-control generated distribution functions.

Figure 16:
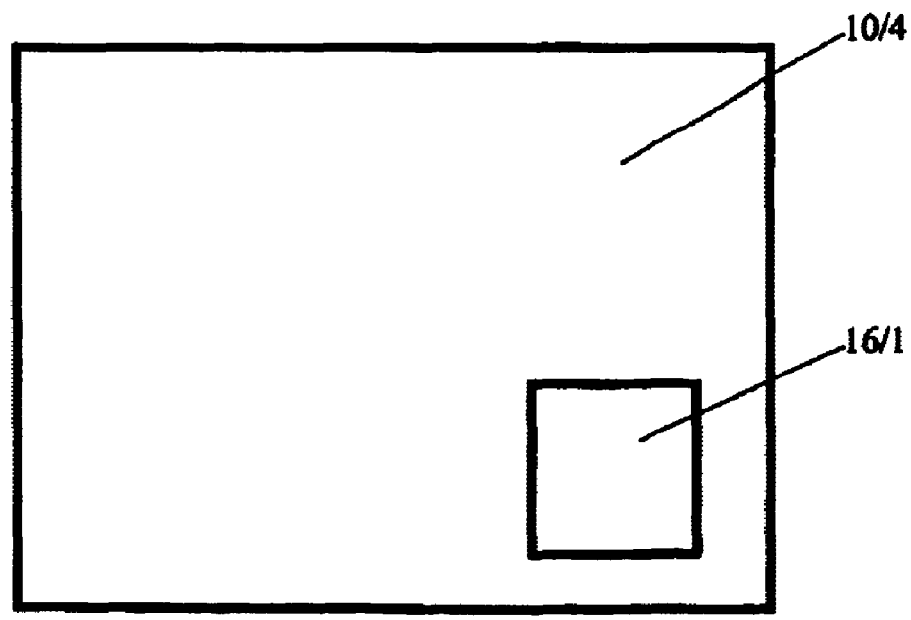
FIGS. 16–19 illustrate variations of the methods of FIGS. 14–15.

FIG. 16 relates to the method as was illustrated in FIG. 14 wherein validating (10/4) includes, for at least one weighted directed graph component in the directed graph of second plurality components, improving (16/1) the weighted component using a validity-metric proportional directed graph component weighting.

Figure 17:
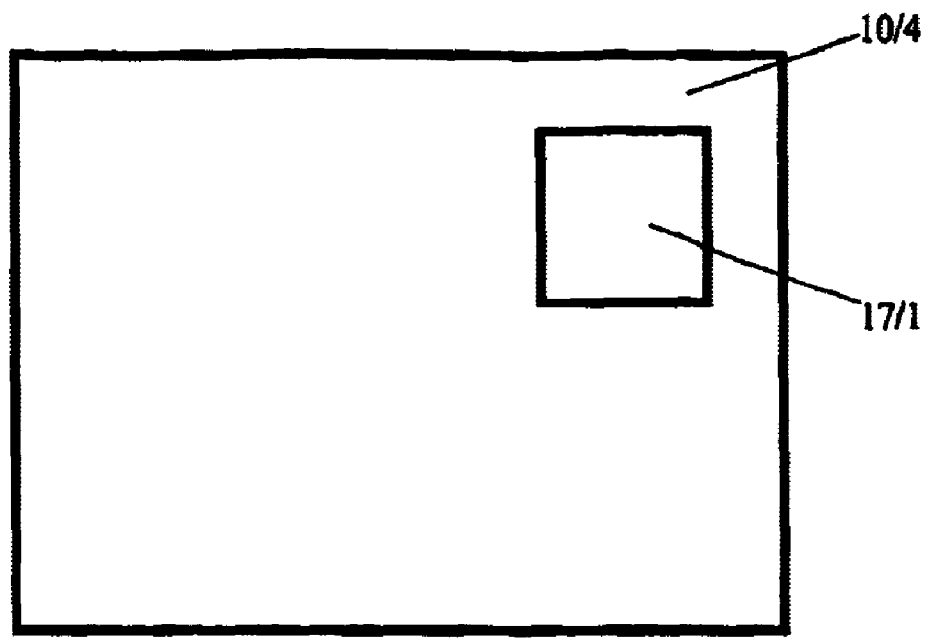

FIG. 17 relates to the method as was illustrated in FIG. 15 wherein validating (10/4) includes, for at least one weighted directed graph component in the directed graph of second plurality components, improving (17/1) the weighted component using a validity-metric proportional directed graph component weighting.

Figure 18:
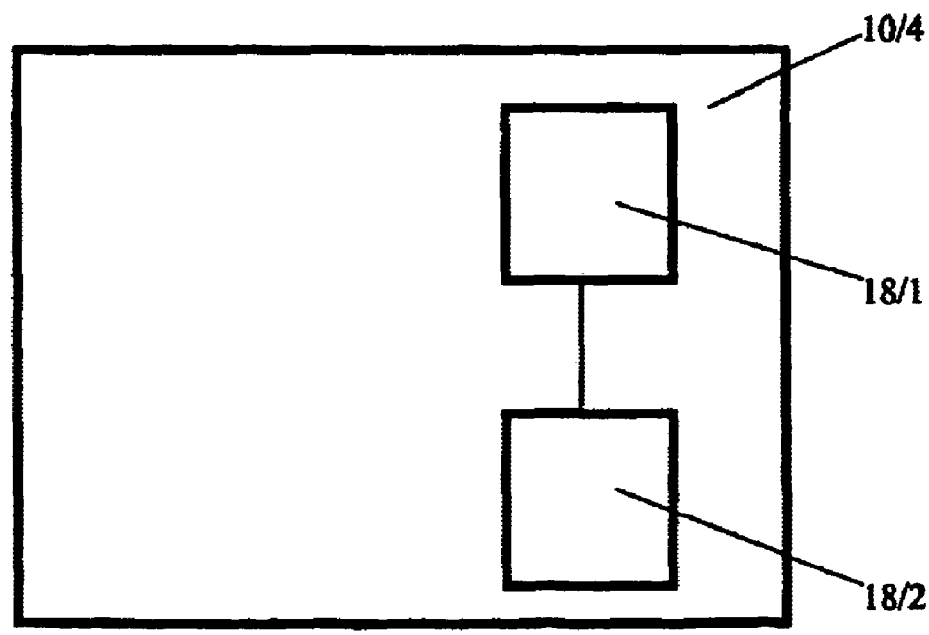

FIG. 18 relates to the method as was illustrated in FIG. 16 wherein validating (10/4) includes generating (18/1) a conditional statistical process-control distribution function and convoluting (18/2) the conditional distribution function with the present weightings.

Figure 19:
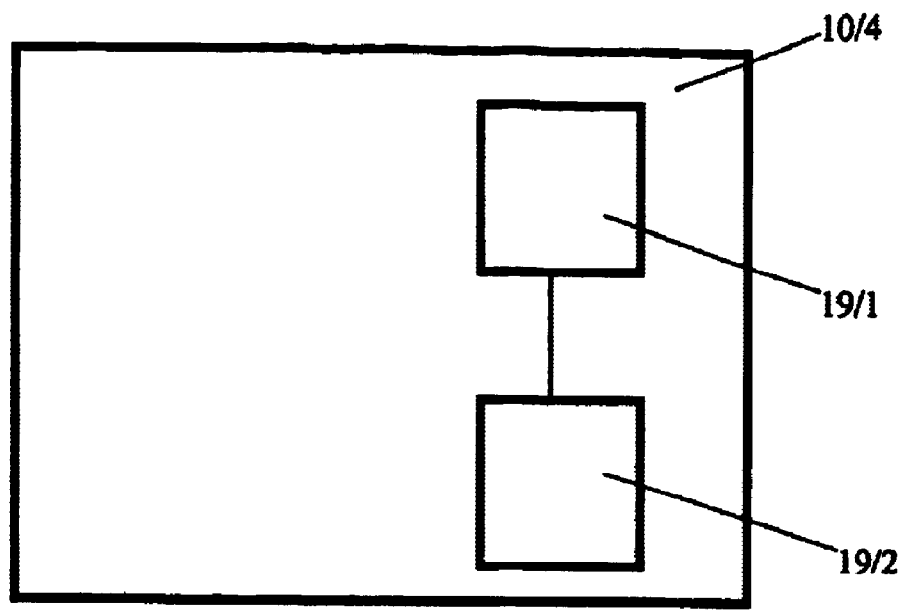

FIG. 19 relates to the method as was illustrated in FIG. 17 wherein validating (10/4) includes generating (19/1) a conditional statistical process-control distribution function and convoluting (19/2) the conditional distribution function with the present weightings.

Figure 20:
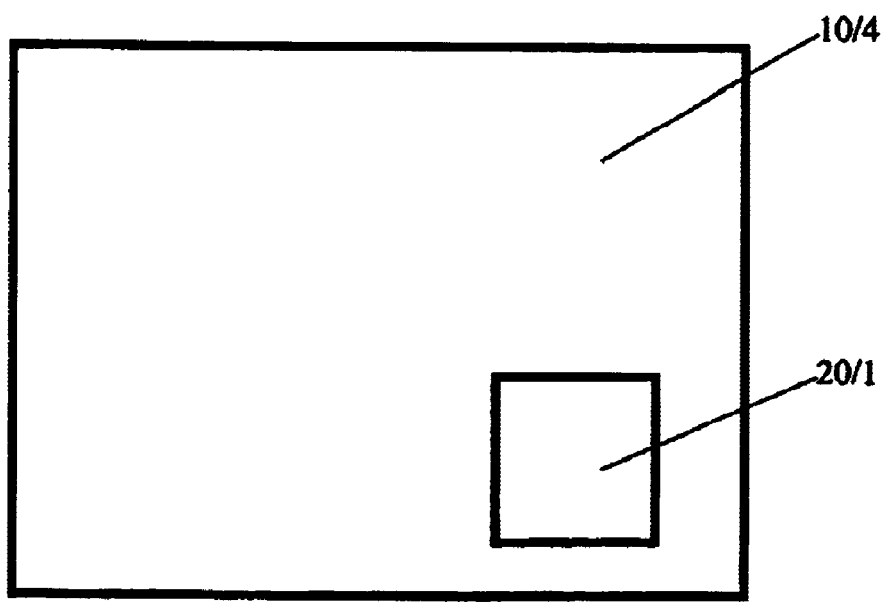
FIGS. 20–23 illustrate further variations of the method of FIG. 10.

FIG. 20 relates to the method as was illustrated in FIG. 10 wherein validating (10/4) includes, for at least one directed graph component in the directed graph of second plurality components, assigning (20/1) a validity-metric proportional directed graph component weighting.

Figure 21:
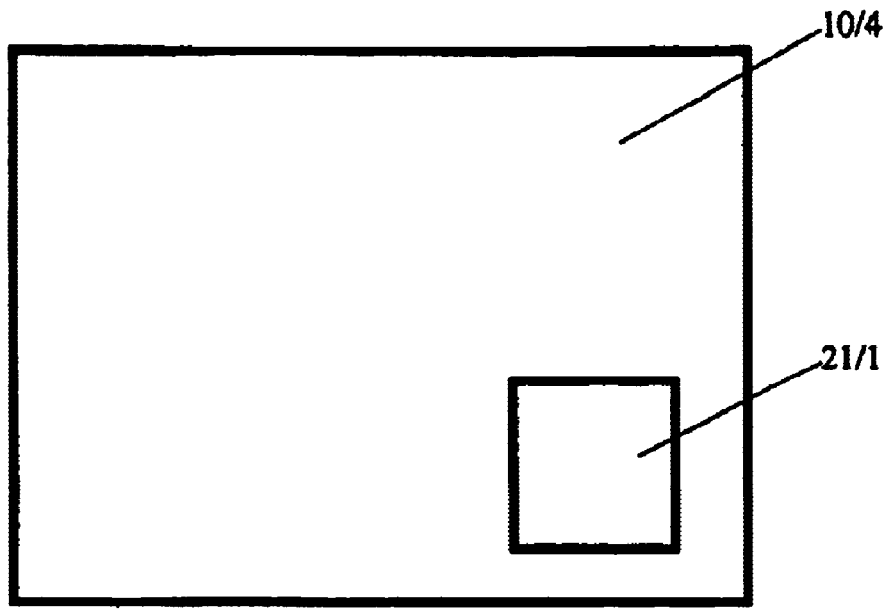

FIG. 21 relates to the method as was illustrated in FIG. 10 wherein validating (10/4) includes, for at least one validity-metric above a threshold value, adding (21/1) a virtual directed graph component to the second plurality.

Figure 22:
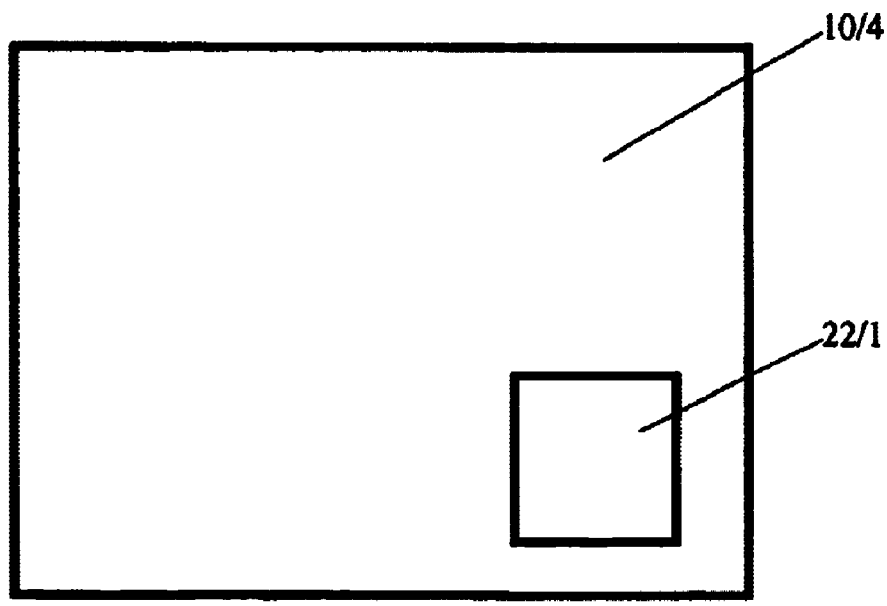

FIG. 22 relates to the method as was illustrated in FIG. 10 wherein validating (10/4) includes, for at least one validity-metric below a threshold value, deleting (22/1) a directed graph component from the second plurality.

Figure 23:
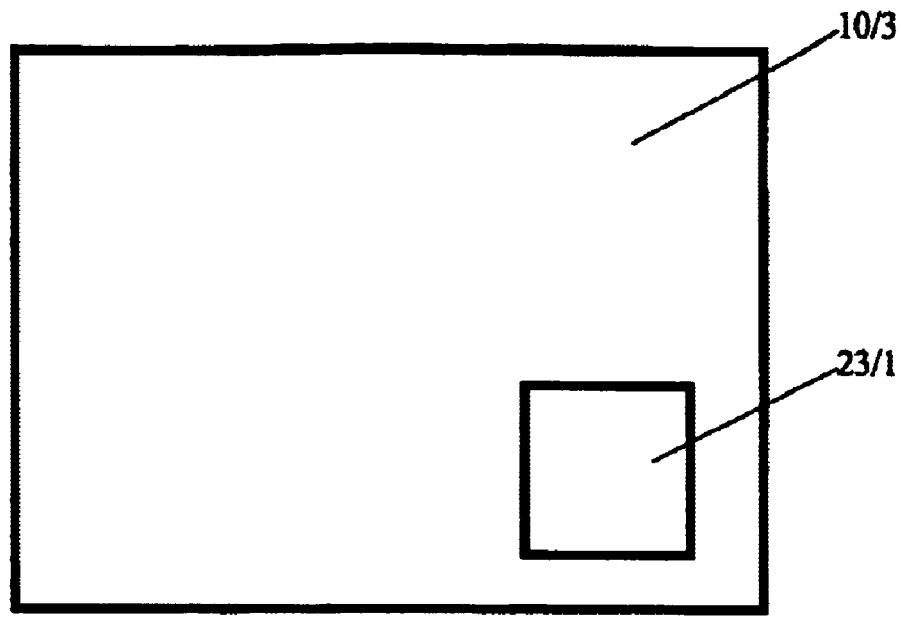

FIG. 23 relates to the method as was illustrated in FIG. 10 wherein mapping (10/3) includes updating (23/1) the first plurality of correlated empirical data-sets.

Figure 24:
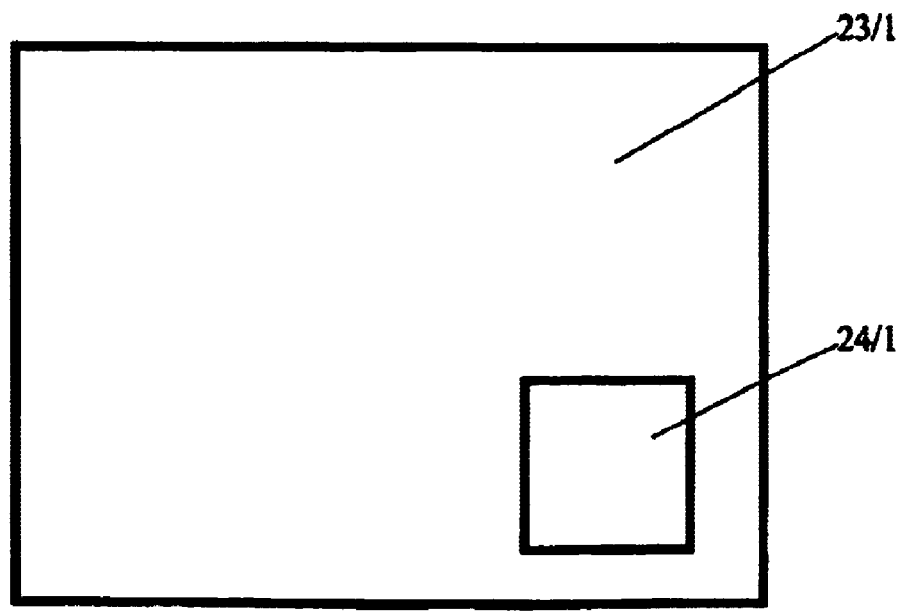
FIGS. 24–26 illustrate variations of the method of FIG. 23.

FIG. 24 relates to the method as was illustrated in FIG. 23 wherein updating (23/1) includes modifying (24/1) at least one real-time empirical data-set.

Figure 25:
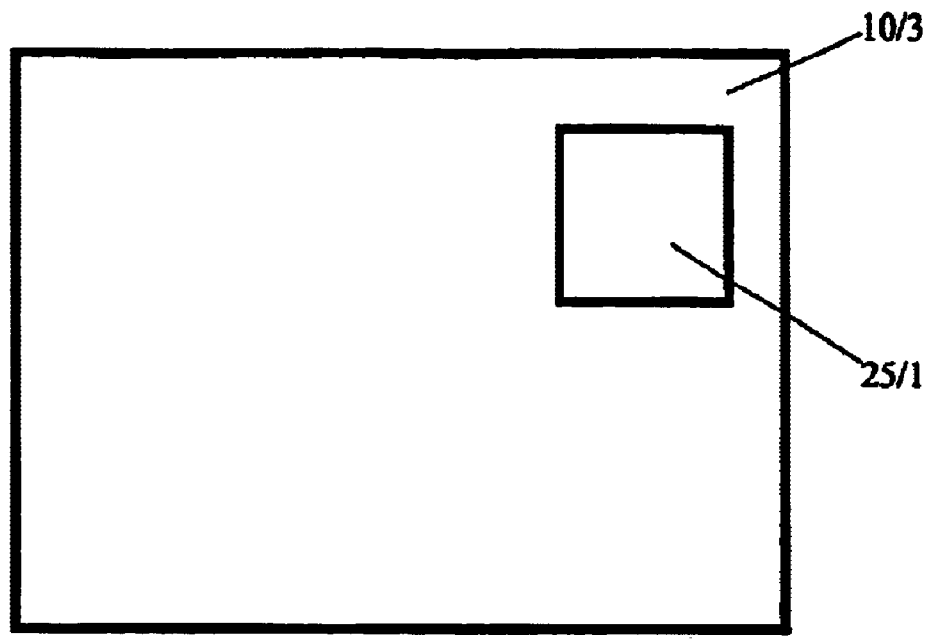

FIG. 25 relates to the method as was illustrated in FIG. 23 wherein mapping (10/3) includes activating (25/1) an alarm when an updated empirical value is outside of a threshold range.

Figure 26:
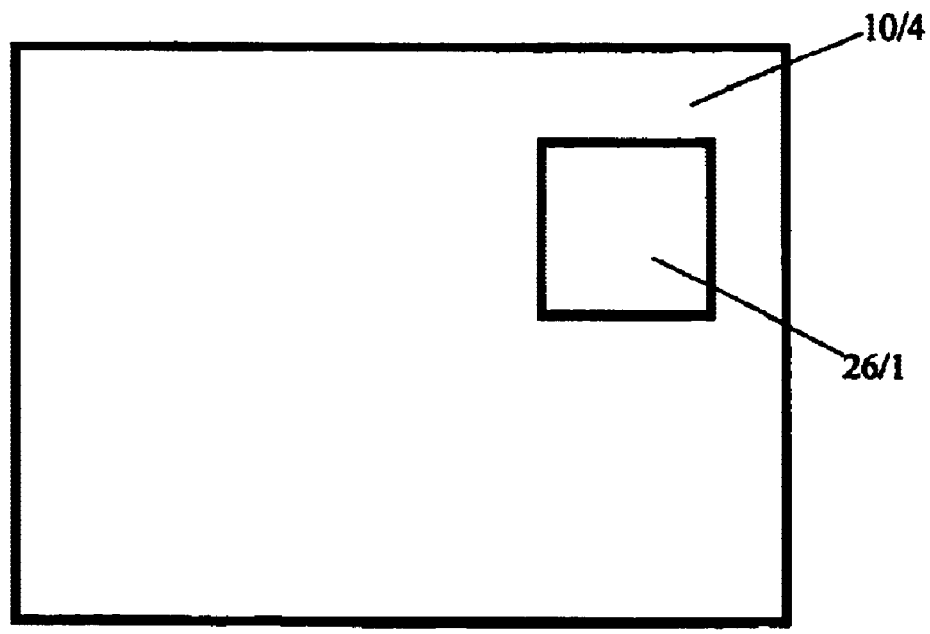

FIG. 26 relates to the method as was illustrated in FIG. 23 wherein validating (10/4) includes generating (26/1) a report having recorded therein an updated empirical value that is outside of a threshold range.

Figure 27:
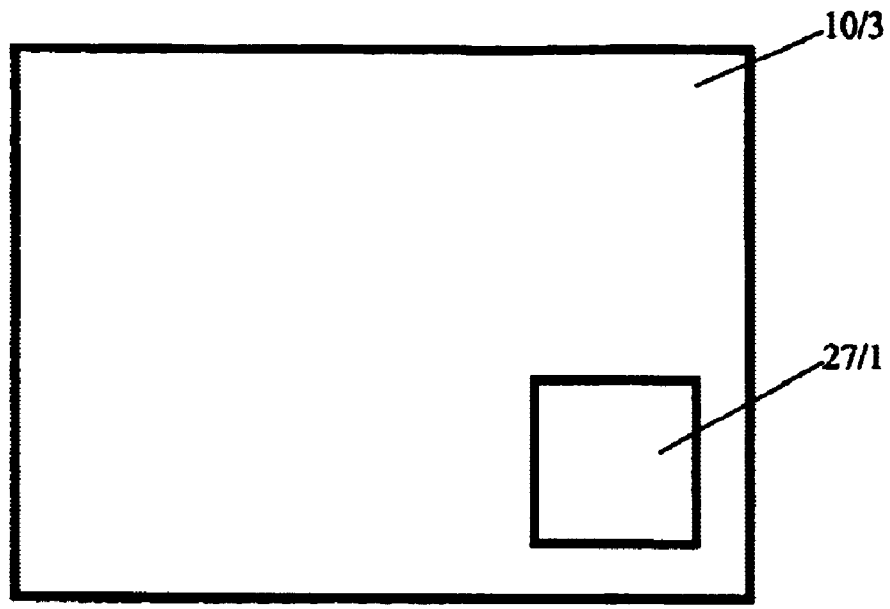
FIG. 27 illustrates another variation option for use with the method of FIG. 10.

FIG. 27 relates to the method as was illustrated in FIG. 10 wherein mapping (10/3) includes accumulating (27/1) empirical data using a data mining engine.

Figure 28:
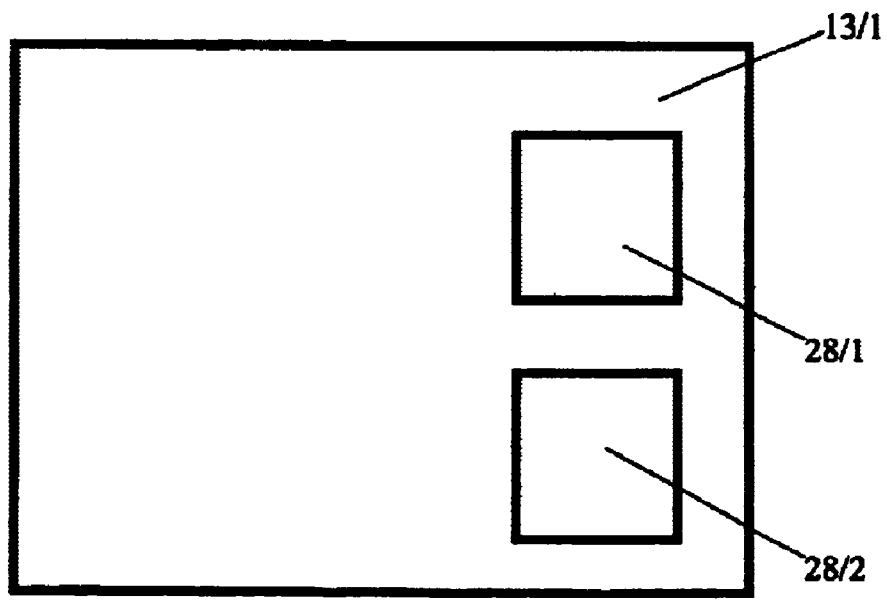
FIG. 28 illustrates a variation option for use with the method of FIG. 13.

FIG. 28 relates to the method as was illustrated in FIG. 13 wherein standardizing (13/1) a format representation for nodes or relationships in the second plurality includes either providing (28/1) for substantially each node in the second plurality: at least one input token; a process token; and at least one output token; or providing (28/2) for substantially each relationship in the second plurality: a first process token, a linkage token; and a next process token.

Simply stated, there are two different ways of representing a topological graph of nodes and/or edges; or, for the example of Knowledge-Tree, interconnection cells, and relationships. One way of representing a topological graph-in a tabular form-is to list each node with that respective node's inputs and outputs. Another way of representing such a topological graph-again, in a tabular form-is to list each edge with the associated pair of nodes that it interconnects. (All of this is true regardless of whether or not this graph is directed or not. That is, the graph represents actual interconnections or not.) More particularly, when applied to Knowledge-Tree, which is stored and managed in a computer system, the tabular representation is either by for substantially each node in the second plurality: having a table including at least one input token; a process token; and at least one output token; or for substantially each relationship in the second plurality: having a table including a first process token, a linkage token; and a next process token.

Figure 29:
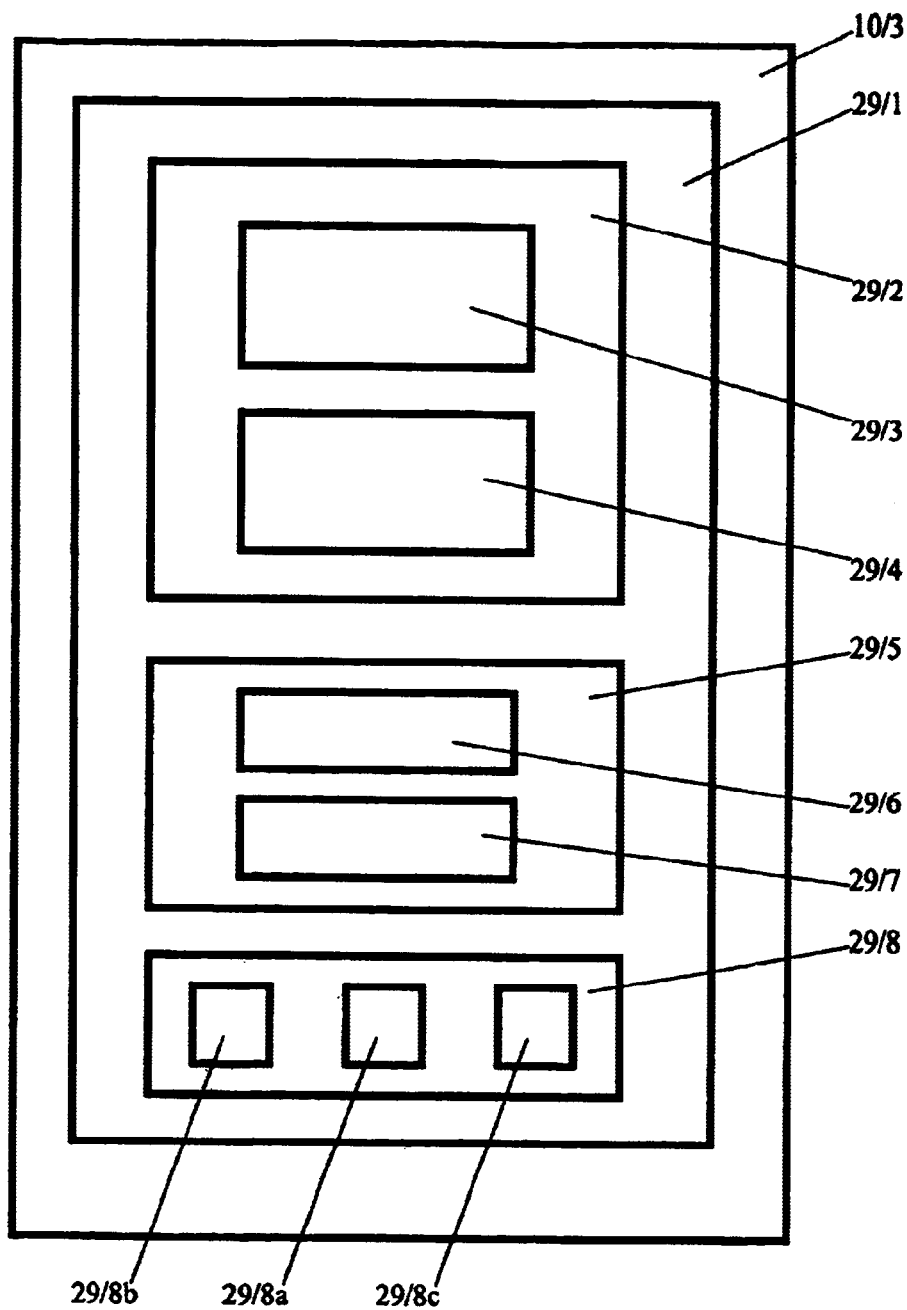
FIG. 29 illustrates still another useful variation for use with the method of FIG. 10.

FIG. 29 relates to the method as was illustrated in FIG. 10 wherein mapping (10/3) includes defining (29/1) a correspondence in the search-space, between the second plurality of interrelated nodes and a process model representation, by performing the steps of:

standardizing (29/2) a format representation for nodes or relationships in the second plurality by
either providing (29/3) for substantially each node in the second plurality:
at least one input token;
a process token; and
at least one output token;
or providing (29/4) for substantially each relationship in the second plurality:
a first process token,
a linkage token; and
a next process token;

standardizing (29/5) a format representation for nodes or relationships in the process model by
either providing (29/6) for substantially each node in the process model:
at least one input token;
a process token; and
at least one output token;
or providing (29/7) for substantially each relationship in the process model:
a first process token,
a linkage token; and
a next process token; and
providing (29/8) correspondence rules (29/8a) between
tokens (29/8b) of the second plurality and
tokens (29/8c) of the process model.

FIG. 30 portrays a typical schematic knowledge-tree representation (30/1) example containing interconnection cells and incorporating graph directed linkages from an underlying process map description and other proven or alleged causal factor graph directed linkages; and FIGS. 30, 31A–B, 32, and 33 portray a typical schematic analysis diagram for a conditional SPC example, wherein the domain of the interconnection cell inputs and the range of the interconnection cell outputs are differentiated into higher precision discrete subsets than are classically represented using SPC, and the combinations of inputs are n-tupled and correlated to substantially each the output subsets.

Referring now to FIG. 30 (30/1), there is seen a schematic representation of an example of a knowledge-tree, referenced generally 50. This knowledge-tree 50 contains modules or interconnection cells, referenced 51–61. There are further seen linkages represented by arrows; as, for example those referenced 64 and 66; between interconnection cells 51–61. These linkages are based upon various factors as described following.

Linkages between interconnection cells normally include those based upon actual steps in a manufacturing process. For example, linkage 64 connecting interconnection cells 51 and 52 represents the transition between the a first shown and a second shown manufacturing steps.

Linkages further normally include those based upon proven causal relationships. Proven causal relationships are defined as those relationships for which there is empirical evidence such that changes in the parameter or metric of the source or input interconnection cell produce significant changes in the output of the destination interconnection cell. Significant changes are defined as those that produce differences greater than a certain previously determined amount. These changes may be determined by, but are not limited to, those greater than two sigmas (2σ's) of the calculated standard deviation of the values designated as in-specification. For example, linkage 72 connects interconnection cells "Expose" 52 and "Etch" 56. Data (empirical evidence) exists which proves that changing a metric of the Expose manufacturing step will produce a significant change in the output obtained by subsequently executing the Etch manufacturing step.

Linkages may still further include those based upon alleged causal relationships. These relationships are usually, but not limited to, those relationships suggested by professed experts in the manufacturing process, or in some portion thereof. An example of such a relationship is shown in FIG. 30 (30/1) by arrow 74 wherein arrow 74 is seen to connect interconnection cells Bake 54 and Resist Strip 59. Linkages of this type may be tentatively established, and added to the knowledge-tree, on any basis whatsoever; real, imagined, supposed, or otherwise. It is an integral part of the invention to later test and/or validate these linkages.

The term Knowledge-Tree is used to include the various types of linkages described above. A Knowledge-Tree that includes only manufacturing steps is equivalent to a process map, a term familiar to those skilled in the art. The term Knowledge-Tree in fact indicates a process map that has been modified to include other types of linkages, such as, but not limited to, those described above.

Referring now to FIG. 31A (31/1), there is seen a graphic representation of a feed forward optimization process which is divided into two sections. A set of bars, section 31/2; and, a bell-shaped curve, section 31/3. The set of bars themselves, generally referenced 80, represent a set of input or manufacturing process variables. In the section, six such variables or manufacturing steps are represented by bars 81–86. Each of the six bars 81–86 is in turn divided into three sections.

For example, bar 81 is divided into a upper section 92, a middle section 94 and a lower section 96. These upper, middle, and lower sections (92, 94, and 96; respectively), are also assigned arbitrary letters in order to further facilitate graphic representation of some inputs to the manufacturing process. The upper section 92 is assigned a letter-A, 102; the middle section 94 is assigned a letter-B, 104; and, the lower section 96 is assigned a letter-C, 106. The letters A, B, and C, are also used to designate the upper, middle, and lower sections, respectively; of bars 82–86. It should be noted that the choice of three letters and three sections is also completely arbitrary and has been made solely in order to simplify description.

Each bar in section 31/2 is used, at this point, to represent a single, complete integration cell, such as the Expose cell, 52 (FIG. 30.) What is postulated here is that this bar is part of a conditional statistical process control and that some factor associated therewith is involved in a direct causal relationship in a change in the interrelated output produced in this manufacturing process. Factors affecting each integration cell are, at least three-fold. Such types of factors include, but are not limited to input/internal factors, cell output/external factors, and adjacent—but non-proximate—factors. This last mentioned type is normally associated with those alleged factors described above. All of these types are further described below.

The actual division of manufacturing process variables, representing various specifications of these variables, as described below, can be set to any user-defined value whatsoever. It is in fact, a further integral part of the current embodiment of the invention to provide the ability to refine and sub-divide these variables into as many increments as may be necessary in order to refine the actual manufacturing process. There is no theoretical limit to the number of increments possible to set up; and, in actual use the number is usually limited to that value which has been shown to produce a significant output response.

Although the letters A, B, and C are arbitrary, they represent specific subjective value ranges for each of the input variables represented by bars 81–86. The "A" or upper sections of each of the bars 81–86, represent input values above or greater than some pre-determined upper specification limit. The "B" or middle sections of each of the bars 81–86, represent input values within some pre-determined specification limits. The "C" or lower sections of each of the bars 81–86, represent input values below or less than some pre-determined lower specification limit.

The specification limits of section B, represent a range of input values known to produce a high yield of usable products when utilized throughout the manufacturing process. This range of values has usually been determined by statistical process-control generated distribution functions. The invention uses these statistical process-control, hereinafter referred to as SPC, distribution functions to "map out" an initial range of in-specification values.

Referring now to FIG. 31, and specifically section 31/3 thereof. There is seen a curved line 120 representing the bell-shaped curve itself. Curved line 120 is intersected by two straight lines, an upper (as depicted in section), line 112; and a lower (as depicted), line 114. Straight lines 112 and 114 are associated with three-lettered labels 122 and 124, respectively. Three-lettered label 122, which is designated USL represents an upper in-specification limit; and three-lettered label 124, which is designated LSL represents a lower in-specification limit.

Specification limits can be set in a variety of fashions. These manners include utilizing empirical data, consulting with process engineers, referencing text-book values, as well as using arbitrary values. These values may also be set to customer customized limits as required. For example, for a military specification, a limit of "use a ¼" nut" may be modified to: "use a 6.35±0.01 mm nut." The present embodiment of the invention includes the possibility of employing SPC evaluation of empirical data and, in addition, provides ways to validate "expertise-suggested" (read: knowledgeable process engineer recommended), information.

It should be recalled that in classical SPC systems, input manufacturing process limits are set, usually using some statistically compiled and/or computed metrics. The manufacturing process is thereinafter required to run through the "middle" or in-specification range between those limits. Problems arise in that a given current range of in-specification limits may allow for sufficient fluctuation between those limits such that these metrics result in a manufacturing process run being performed with all input process variables in an in-specification range but wherein the measured response, or actual production output, may still be unacceptable.

For example, referring again to FIG. 31A (31/1), the input metric values for the six process variables, 81–86, may all be in the "B" area of each bar. That is, the middle in-specification range; which is area 94 for bar 1, 81. However, the actual values may reflect an input very close to the "A" area of each bar. For example, a value for the first process variable represented by dot 134. If this barely in-specification choice of input values is repeated throughout the manufacturing process, an unsatisfactory product may result. Processes for evaluating input values and for methods of returning measured response values back to within acceptable limits are part of the function of the present invention and are described below.

It has been customary when such unacceptable production output has been obtained, to call a process engineer to modify the input process variables in some manner in order to return the production output back to acceptable in-specification production response values. This is typically done in one of two manners.

That is, modifications may be made to the integration cells or to the linkages between the cells. Modifications to the integration cells are referred to as internal modifications and involve changing the actual input to the relevant cell. For example, this change may be altering an oven temperature or the thickness or quality of a raw material.

Alternatively, modifications effected at the level of linkages between integration cells are based upon what is received by any given cell in the manufacturing process from a cell earlier in the process. Changes may be made based upon the relevancy of the known interrelationships between cells.

For example, referring again to FIG. 30 (30/1). Let us suppose that the relationship between integration cell Bake 54 and integration cell Resist Strip 59, which is represented by arrow 74, is valid. Let us further suppose that it is known that changes in baking temperature result in qualitative differences in the brittleness of the resulting resist strip. Using this knowledge, the process engineer may alter the baking temperature in order to increase the suppleness of the output of resist strip.

It is an integral object of the present invention to provide for significant improvement in this process. Firstly, in that the system described in the present invention can utilize data regarding known working combinations of input metrics to modify inputs further along the manufacturing process to return the measured out put response to acceptable in-specification values. And, additionally, that the invention can be set to monitor and effect these changes as part of the manufacturing process itself, and to perform the necessary changes and corrections on-line without need to halt the process.

At least two types of information are utilized by the system included in the invention. That is, validation data and data produced by convolution. Validation data is defined as that which verifies that a change in a specific input process variable directly results in a corresponding change in output response. Convolution data identifies what specific change in the validated input process variable produces that change. Convolution data may further quantify the specific desired change required as well as the extent that the measured response will be affected.

Once input manufacturing process specification limits have been set, in whatever way, these limits represent initial weightings for use in manufacturing processes. In most cases, empirical data or expertise knowledge exists such that changes in input metrics will result in output results that are within these initial specification limits even when the input metrics are outside of the "classical" theoretically required limits necessary to produce in-specification output results.

For example, referring now to FIG. 31B (31/4); and section 31/5 thereof, which depicts a set of bars 88. Let us say that line segment 98, which intersects each of bars 181–185, represents a specific set of input metrics. The chosen set represented utilizes for the second and third metrics, 182 and 183 respectively, values in the C-section of those metrics. That is, values that are below the pre-determined "acceptable" in-specification values and values that theoretically will adversely affect output yield of the manufacturing process. In addition, line segment 98 represents using an input metric for the fourth variable, herein represented by bar 184, that is above the pre-determined "acceptable" in-specification value.

It should be clear that line segment 98 can be represented by the letter combination BCCAB, wherein each of the letters represents that portion of each of the respective input metrics that was utilized in this particular input process. It is a significant part of the presently described preferred embodiment of the invention, that all possible combinations of input metrics can be represented by n-tuples of such letter combinations, it being, of course, understood that the respective combinations must be expanded to include all of the metrics of any given multi-dimensional manifold of the orthogonal system defined by any given set of variables.

Referring now to FIG. 31B, there is seen inside of "classically"-shaped bell curve 120 (31/6), a smaller, narrower-shaped curve 118, which represents the actual output response obtained and empirically measured using the above set of input metrics; namely, line segment 98, represented by letter combination BCCAB; section 31/5 of FIG. 31B.

It should be obvious that this empirically obtained output is completely within all pre-determined in-specification limits and that this particular set of input metrics has in fact produced high-yield output response production.

With the information generated by this SPC evaluated empirical data the system can now refine and/or redefine the current range of in-specification input metric values. It is also possible to continue validation of this data in order to establish a firm causal relationship. Statistical analysis may also be performed to determine the significance of the apparent output response. Data may also be further "convoluted" as described below in order to better view what change or type of change in what given facet of which particular input metric is producing a specific measured output response.

For example, referring again to section 31/6 of FIG. 31B: In addition to smaller, narrower-shaped curve 118 described above, there are also seen two more smaller, narrower-shaped curves. Curves 117 and 119, identified as BCCAC and BCCAA, respectively represent two further actual output responses obtained and empirically measured using the given sets of input metrics. Taken together with previously described curve 118, these three curves represent a theoretically comprehensive set of validated data. In actual practice, such a set of data would contain a much larger number of input variables.

It is common for companies to have such sets of empirical data. Due to the large number of times that a given manufacturing process has been performed, there is a great likelihood that a graph of the outcomes of this multitude of manufacturing runs will resemble the classical bell-shaped distribution for the measured responses obtained. For example, referring now to FIG. 33; the graph 33/1, shows the obtained measured responses reflecting a standard distribution, 142. The vast majority of the results fall between the specified acceptable upper and lower in-specification limits (144 and 146, respectively.) There is also shown a statistically significant number of measured responses that fall outside of acceptable desired response limits (for example those results represented by measured response bar 148.)

Such sets of data can be used by the system in many ways, some of which are described herein. For example, the system can generate all possible, theoretical combinations of n-tuples of input variables. The system included in the invention can then further display the measured responses expected to be obtained from all of those inputs, or from any selected or desired part therefrom. This can be done in at least two ways. Statistical analysis of measured responses already in the system's databases, and/or by applying modeling and predicting, simulation functions to the present data.

Several examples are provided, not as limiting definitions, but as instances of some of the capabilities and applications of system included in the invention.

Referring now to FIG. 32, there is seen a series of graphs depicting the measured responses obtained for a given set of n-tuples of input metrics. Referring now specifically to section 32/1, five-letter combination AAAAA, 152, represents a particular example of such an n-tuple. Recalling briefly section 31/2 of FIG. 31A, will show that this combination of input metrics represents a case wherein all of the inputs were out of specification.

It can however, further be seen that some of the measured responses obtained are within acceptable limits. For example, if line 112 represents an upper in-specification limit, a significant set of outputs, 154 have been known to result. It is an integral function of the present invention to track, access, and reference such data. Additional uses for such data are described herein below.

Let us assume that a specific manufacturing process has begun and proceeded through only the first two steps. At this point, the system alerts the monitors (human or by generating a computerized log), and initiates rescue and repair procedures.

Let us further assume that the third step of the manufacturing process is proceeding at an adjusted rate or range, but that sufficient correction cannot be made in or at the completion of this step. Such an inability may be process oriented. For example, the oven temperature does not extend above a certain range, or the raw material thickness is limited by current supplies or state of the art manufacturing techniques.

The system however has accessed the data appearing in sections 32/2 and 32/3; showing that changes in the fourth process variable can be made to bring the majority 156 or even totality 158 of measured response values into the in-specification output range.

Those skilled in the art will recognize that section 32/3 represents a sample of measured responses that may not be empirically, statistically valid. The system further includes the ability to analyze this data.

It should further be noted that the invention includes the ability to analyze the data depicted in this figure for greater cost-effectiveness. This may be in terms of a savings in the actual expense associated with the purchase of a particularly costly raw material; or the time saved in, for example, reducing the length of time allowed for a specific process to occur.

Appendix 1 presents, software code on Microfiche, from which potentially executable code which can be derived, for running a prototype of a system embodying aspects of the present invention; and includes therein an organized collection of source code, documentation thereof, sample menus, and other working appurtenances that have been developed for use therewith; and Appendix 2 presents, also on the Microfiche, source code independent descriptive notes, and other working papers that have been written in the course of the development of the prototype of appendix 1, especially according to the most recent preferred enabling embodiment.

More specifically, the index for the MICROFICHE Appendix is:

Index for MICROFICHE Appendix*

*NOTE: This MICROFICHE appendix relates to a working prototype and documentation, substantially as originally disclosed on CD-ROM on 31 Nov. 1999 in a Priority Patent Application #132663 Israel.

Section Pages

Source Code used to Generate a Working Prototype

Pbl Libraries:
Func_use.pbl 1–61
Ins_general.pbl 62–63
Insyst.pbl 64–187
Ipc.pbl 188–238
Mapper.pbl 239–308
Wizard_insyst.pbl 309–392
Ins_pfe.pbl 393–465
Screen Shots generated by the source code 466–494
Screen Shot to source code—reference index: 495

Documentation Related to the Prototype
Software Environment for the Prototype 496–497
Summary of Four Basic Technologies 498–499
KnowledgeScape Evaluation 500–504
Garden Tree 505–509
Technology List 510–512
Graphical User Interface 513–527
Database Report 528–565
Eden 566–570
Eden and POEM IPC 571–589
Adam and Eve 590–596
Empirical Controller 597–613
Poem SPC 614–618
POEM 619–627
Process Mapping for Automated Decision Support 628–660
Scientist Technical Report 661–688
Power Point Overview Presentation 689–732

The attached Microfiche presents software for generating therewith executable code, for running a prototype of a system embodying aspects of the present invention; and thereby relates to an "Environment":

This system is developed under MS-NT 4.0 operating system.

The database is SYBASE SQL ANYWARE version 5.5 in stand-alone version.

The connection to database is via ODBC.

The source code is written in PowerBuilder version 6.5.

The C++ code is written in Borland C++ builder version 4.0 with additional dlls of OlectraChart 6.0 charting software.

Power Builder Libraries developed by InSyst (the primary developers of the Present Invention).

Power Builder Libraries used by InSyst (the primary developers of the Present Invention).

C++ code developed by InSyst (the primary developers of the Present Invention).

Database Report—Detailed Data Base Structure of the Global Yield Enhancement System This document contains a data structure diagram with detailed lists describing tables of database. An example of which is code generated by the software which is then labeled: ins_batch_010, which is set up to keep track of a particular batch of semi conductors from the beginning to the end of production.

Eden and Poem IPC

This document describes the advantages of Poem IPC over standard SPC.

Included in this document is an explanation of two of the present inventor's technologies i.e.—Knowledge Tree and Eden. The Eden environment is defined by three principal components: 1. Server 2. Administrater 3. Client. The three are clearly outlined in function and inter-relation. POEM IPC (Process Outcome Empirical Modeler-intelligent Process Control) is performed on data collected by both the MES (Manufactured Executed System) and the EDEN (Empirical Decision Enabling Network). The MES collects data in real time from the manufacturing floor whereas the Eden acquires additional data from other sources, for example: E-Tests (electrical tests), the Sort (end of process where every chip is checked), data entered by an operator, etc. These two sources of data are combined to make the Eden Warehouse. This document surveys the problems and limitations of standard SPC and explains how POEM IPC overcomes them with the help of the Knowledge Tree and Process Model (that contain the knowledge of the manufacturing process and the internal dependencies between the parameters). The IPC determines the control limits for each individual input vector based on the statistics of that vector. This enables EDEN to point to specific problems and offer solutions as well as automatically predict the value of a measured parameter of a specific batch ahead of time etc. The document continues with a description of various EDEN users (engineers, operators, administrators), and components (server, administration tools and client display used by FAB engineers). This section contains several diagrams, such as Client Manager, Functions Manager, etc. Under the heading of Administration Tools, there is the System Administrator and the Eden Administrator. Eden Administrator defines outputs and inputs; this is the model (Knowledge Tree). Eden can relate every measurement from MES to its related function. (The models are built from the functions and every function has its own conditions for alerts.) The next heading is Client, which gives a succinct description of GUI for POEM IPC: a display of data of specific functions to a user, in real time, showing specification limits from MES etc. and Eden on-line optimization that can automatically compute a prediction for a batch allowing a user to adjust an input thus optimizing the output (displayed in window). Alerts are issued in various ways (on-screen, e-mail, etc.), and accompanied by wizard guides. This is followed by a section on Eden Processes: including client connect, new measured data, and alert solution hints. Finally, the Architecture and Technology are defined. The Eden system has three tiers: 1. Database 2. Application Server, i.e. the engine that does overall computing and manages user connections 3. Client, i.e. the human-machine interface of the product. Eden needs three types of Clients: 1. Regular for engineers or operators 2. System Manager for defining functions, alerts, users, etc. 3. System Manager for administrative tasks to define backups and restore, clean data etc.

Eden's Functions and Advantages relates to Eden's base: a core technology known as Knowledge Tree and Inter Connection Cell (KT defines the dependencies of the various parameters by containing all the Inter Connection Cells). The document shows that on the basis of this technology Eden's implementation, in Advance Process Control and Health Monitoring will substantially maximize wafer fabrication by improving control and analysis tools. The document also includes a description of Eden's Architecture, which includes both interactive and background components. The interactive component, which the user interacts with, sets and updates data of the manufacturing process, builds KT, maintains (reading system messages, backup and restore), enters manually measured data, displays KT, displays system model, displays prediction/optimization, displays alerts and possible solutions, displays statistical charts and information. The background component builds and updates models of the Inter Connection Cells, saves new measured data in database, issues alerts for existing and expected problems while offering solutions when possible.

Graphical User Interface

This document displays some of the windows that are used in the present invention's systems and includes a technical description of each window. For example there is a window titled Knowledge Tree, it has a name and a type, in this case it is sheet (multiple document window) and is called from the menu>Adam>Knowledge Tree. The argument is given; in this case, there is none. Finally the description: In the left tree the user can navigate through the process flow . . . can select output and . . . output is displayed in right tree . . . displayed as well, the parameters that effect this output, etc.

Power Point Overview Presentation—Emphasis Poem (Process Outcome Empirical Modeler)

This document gives an introduction to the present invention and its technologies, including: Adam (Automated Decision Maker), Eden (Empirical Decision Enabling Network), Eve (Equipment Variable Evaluator), Knowledge Tree, and Poem. At least half the slides are dedicated to Poem modeling and optimization diagrams, with emphasis on Poem's role in fault detection and health monitoring.

Scientist Technical Report

This report first explains the shortcomings of previous yield improvement technologies and the advantages of the technology of the present invention. The document, in short, goes on to describe the system developed by the inventors and how it is capable of significantly improving the process of IC (integrated circuits) manufacturing in the semiconductor industry. The system is based on the present invention's core technology that combines the vast data of measurements taken during the IC manufacturing, and engineering knowledge. It is done by using its unique technology called Knowledge Tree™ (KT), which encapsulates the line data and reflects the internal dependencies of the data. The IC manufacturing is improved by applying KT which is a Multivariable Analysis Tool, and Expert Systems to work on a large array of different tasks, to make the manufacturing more cost effective and supply the engineers with tools for analyzing, better understanding, and improving the manufacturing process. ADM (ADAM) for Automated Decision Making integrates the Knowledge Tree, the Process Model with the GUI. The Knowledge Tree is used for the automatic extraction of relevant data from the central database. ADAM provides several types of analysis tools. The first are control tools for on-line analysis of process.

The second is an algorithm (this document gives a description of the various algorithms used by the present invention, with emphasis on the one based on discretizing, used for creating the Empirical Model) that makes for faster and easier troubleshooting. The third are process and device optimization and characterization tools that allow for automated multi-dimensional modeling of process on-line without performing experiments (an advance form of DOE-design of experiment) and automated Robust Optimization involving the nominal setting of process parameters. This document also gives a brief description of the Techo-Eco Model a tool that allows for better technical-economical decisions. There is also a description of the system configuration, in short: it is a client-server system of three tiers or layers. In the lower level on the server is the database, above it resides the software (a client of the database and server for the GUI) that interacts with the database, and on the top level at the client is the GUI. (There is a diagram of the Data Model.)

Adam and Eve

This document gives an explanation and field of Adam (Automated Decision Maker) and Eve (Equipment Variable Evaluator), two products that can stand alone but can be configured together with Eve's communication manager Eden (Empirical Decision Enabling Network) to form a three tier intelligent Empirical Control (diagram included.) This document deals mainly with the present invention's application in the field of semiconductor fabrication. The Adam Global Control, Optimization (including Robust Optimization), and Troubleshooting product can be operated in either an automated mode or in a human decision and intervention mode. In the auto-mode, Adam analyzes data from the engineering and manufacturing database point of view of its internal Empirical Model . . . . The process of updating the decision making model is called Empirical Control (empowered by a dynamic multidimensional learning model). The Eve performs automatic control, optimization, and troubleshooting at the equipment level like Adam performs these functions at the global process level and Eden at the intermediate level for process control of work groups or equipment clusters. This document also explains the enhanced optimization and trouble shooting potential of the products as well as presenting product options available now or in the near future; including the Adam semiconductor analysis pack, the Adam semiconductor data warehouse and the Techo-Eco modeling product from the Or Suite of Products.

Empirical Controller

This document presents and defines various components of the present invention including their functions, interrelations, relevant software design architecture, diagrams and examples of their of practical application (including several diagrams which illustrate the system in its preferred embodiment in a semiconductor operation) and ends with a list of nine claims.

The document begins by giving a general description of the Empirical Controller and its potential embodiments in such varied fields as communications, design of experiments and other operations research, automated control of enterprise, process machines, measuring equipment etc. The document then goes on to describe the Empirical Controller as a generic learning and thinking system which performs Empirical Control and being a three tier structure consisting of Knowledge Tree, Empirical Model and ADM (Automated Decision Maker or Adam, which in non-automated environments provides natural language instructions to engineers or operators who then intervene with system or process operations to achieve objectives within defined constraints.) The three together describe, model, and control the behavior of complex interrelated processes. The component, of the present invention, that integrates physical knowledge and logical understanding into a homogenetic knowledge structure is called the Knowledge Tree. The second component, the Empirical Model sits above the Knowledge Tree and integrates data using various analysis tools to create quantified functional relations in the aforementioned homogenetic knowledge structure. The Empirical Model can be used to predict and control system (process) behavior. The ADM sits on top of the Empirical Model and operates and analyzes it to determine solutions that best meet specified objectives and constraints. The Empirical Model is updated automatically as a function of new data collected by the Process Outcome Empirical Modeler (POEM), which is the core analysis tool of the ADM. The POEM algorithmic approach generates automatically a set of functional relationships between inputs and outputs of each Interconnection Cell in the Knowledge Tree describing a process. Further the Empirical Controller embedded in the three tier Adam, Eden (Empirical Decision Enabling Network), and Eve (Equipment Variable Evaluator) product configuration is able to control large complex processes to bring global process control relationships down to the lowest operational levels for optimum decision making and control. (The Eve performs automatic control, optimization, and troubleshooting at the equipment level like Adam performs these functions at the global process level and Eden at the intermediate level for process control of work groups or equipment clusters.) This document ends with nine claims, in short: 1. The Empirical Model is built around the actual and not theoretical system to be controlled. 2. There is greater optimization with the Empirical Model. 3. The Empirical Model can enable not only feedback and feedforward capability but automatic self-control as well. 4. The Empirical Model adapts automatically to system changes as a result of multivariable changes between variables based on POEM. 5. When used in engine control application the Empirical Controller controls each cylinder. An Empirical Model for each cylinder grants greater efficiency and optimization. 6. Based on claim 5; increased engine durability and reliability. 7. Focused data mining tool. 8. Model construction from data without statistical assumptions. 9. Puts into unified framework all available information and knowledge pieces about the process.

KnowledgeScape Evaluation

This document is an internal memo between the inventors. It is an analysis and comparison of products that appear to be competitive with the present invention. The document lists three fundamental advantages of the technology of the present invention over the competition in processing systems and particularly in its embodiment of semiconductor health monitoring, yield management, and SPC (Statistical Process Control). The first advantage is that the present invention's Knowledge Tree is formed from know-how regarding non-quantified relationships as opposed to quantified relationships. The second advantage is the Process Outcome Empirical Modeler (Poem). As an embodiment of the present invention, it provides a substantially more accurate predictive tool than is available on the market today and at the same time it is simpler to implement. For instance, in computer simulation expert are required who are able to specify mathematical relationships between all inputs and outputs whereas a Protocol only requires the specifying of inputs and outputs which does not require the time or expense of an expert. Also, a Protocol of the present invention is designed to recall and use past relationships to determine by analogy future behavior. Further, a Protocol of the present invention, unlike neural networks, does not impose inappropriate mathematical models on data. The third advantage is that the a Protocol of the present invention is a more effective decision making tool in process control because it has technology that can detect when a process is moving, or likely to move, out of control and by receiving information in advance (feedback), it can successfully intervene (feedforward) and bring the process back into control before there is an excursion.

Technology List

This document is a list of the present invention's applications, including 1. Empirical Controller 2. POEM (Process Outcome Empirical Modeler) 3. POEM SPC application 4. POEM-SPC for engines and for other applications unable to use SPC now 5. Automatic Design of Experiments in Empirical Controller (online tool) 6. Automatic Updating of Knowledge Tree 7. Automatic Creation of the Knowledge Tree 8. Adam (Automated Decision Maker), Eve (Equipment Variable Evaluator), and Eden (Empirical Decision Enabling Network) Application (products).

Summary of Four Basic Technologies

This document is a memo between the inventors. It is a summary of four basic embodiments of the present technology, to be developed at that time:

1. Process Mapping—a homogenetic (deriving from a substantially similar template, format, disclosure structure, etc.) integration of physical and logical means . . . to describe complicated systems. 2. Process Outcome Predictor (POP)—the algorithm used for developing the functional relationships between input and output identified in the development of the PM. 3. On-line Optimization including Robust Optimization—calling for on-line Robust Analysis with operating data and modifying the "Model" periodically, e.g. engine and semi-conductor application 4. Automated Generation of the $1^{st}$ cut Process Map—the IDM system would provide means for the analyst to updated and customize the auto-generated PM.

Process Mapping for Automated Decision Support (PM for ADS)

This document is the first to give a detailed description and field of the present invention.

It is the working document from which the following 1999 documents dealing with various embodiments of the present invention were generated. Some of the material in this document, especially in the field of the invention, does not appear in the later documents due to pragmatic considerations. (One of the main considerations being that the embodiments of the invention in the production process industry is thought to be the easiest and most useful application for introducing the invention.) Many of the embodiments presented in this document are very similar to ones presented later.

One such example is the PM for ADS that is a very similar embodiment of the later Empirical Controller and its various components. Also, the PM for ADS is described as being a very effective application of the present invention when integrated into the Process Optimization and Evaluation System referred to as POEM and in later documents, in a slightly different embodiment, as the Process Outcome Empirical Modeler (POEM) and used for enhancing semiconductor fabrication. This document ends with twelve claims concerning the PM for ADS embodiment of the invention.

POEM SPC: Process Output Empirical Modeler and Statistical Process Control

This document describes the application of POEM and its suggestion of a Conditional Statistical Process Control; a more sensitive and precise form of SPC because it relates to the specific class behavior of the variables. The document gives the POEM methodology for calculating the functional relationship between the input values and the output value (including diagram). The document ends with a list of claims describing the advantages of POEM over conventional SPC.

POEM: Process Output Empirical Modeler

This document is basically an expanded and edited version of the previous POEM document (POEM SPC—Jun. 2, 1999 01:43 p). In this document, we have a slightly different embodiment of POEM (Process Outcome Empirical Modeler) as described in document titled Empirical Controller. The goal, as described in this document, of the Process Output Empirical Modeler is to utilize process data to uncover the functional relationship between the input and the output. POEM plays a central role in transforming the qualitative Knowledge Tree to a quantitative Empirical Model. The concept described in this document is directly applied to significantly improve conventional SPC by introducing POEM SPC. The last part of the document gives a more detailed description of the POEM algorithms than the previous POEM document.

Garden Tree

A memo concerns a meeting for the presentation of two examples of embodiments of the present invention in the fields of semiconductor fabrication and agriculture (growing of vegetables). The memo signifies a change of approach in the way the invention would be presented in order to better elucidate its particular uniqueness. Attached to this memo is a document stating five claims that were to be the basis of the discussion at said meeting. Also attached to this memo is another document entitled Uniqueness of Knowledge Tree, which gives an example of integrating disciplinary and heuristic means into a homogenetic Knowledge Tree in the field of agriculture. This document also contains two Knowledge Tree maps: one for semiconductor FAB and another for the growing of vegetables in a standard agricultural framework.

This document includes a list of five claims concerning the Knowledge Tree (KT) and Knowledge Cell (KC—and in later embodiments Interconnection Cell). In Short: 1. KT describes in non-quantitative terms a homogenetic relationship pattern between input and output variables . . . so that a control unit can utilize the model derived from the KT as a basis for making auto-control decisions. 2. (based on 1) When KT is used as data analysis tool to build a model of a system or process, without human intervention, it adequately describes the behavior of said system of process. 3. (based on 1&2) Wherein KC's describe individual physical and logical components and inter-relations in the KT. 4. (based in 1, 2, & 3) Wherein knowledge used to build KT is derived from process flow diagrams etc. as well as other appropriate disciplinary and heuristic knowledge structures. 5. (based on 1, 2, 3,&4) Wherein each Knowledge Cell is able to be used as a data analysis tool . . . able to build a model of individual tool process within context of KT.

DETAILED DESCRIPTION OF THE INVENTION

Simply stated, the present invention relates to improving the quality of process control by using expert knowledge which facilitates constructing a topological process graph (often times a directed graph; also referred to as a process map), from the descriptions of at least one expert, or even from a composite collection of interviewing many involved workers (e.g. in situations where not even one expert study has ever been conducted.) At this juncture, there is a model of a system or process, not unlike models that are constructed in other modeling type systems (described above). FIG. 30 portrays a typical schematic knowledge-tree representation example of all or part of such a model. Other sample representations may be constructed automatically by running the prototype (of appendix 1) on a sample database (also in appendix 1) or on another database of equivalent form.

Since this model is independent of the level of detail that it describes and since this model may capture multiple descriptions that may even contradict each other, the present invention allows the composite model construction to be used in a novel way. Initially, it is important to validate the composite model. Testing each link in the composite model against actual empirical data accomplishes this validation. In the even that a statistically inadequate quanta of empirical data is available, then the model may be tested against simulation data which was seeded by the empirical data; or in the worst case, by theoretical suppositions.

Validation of each link may be expressed quantitatively. For example, a correlation represented by a link between two nodes may be supported by all available data (100% validated), by some lesser plurality of the data, not at all, or even in opposition to the actual empirical data. At this stage, quantitative validation may be used to prune out links whose evaluation is below an acceptable threshold. Likewise, the same validation that has been used to test expert suggested relationships may be applied to evaluated new suppositional relationships; and even to substitute suppositional relations of greater validity for expertise suggested relationships of lesser validity.

A variety of strategies may be applied to the task of postulating suppositional relationships. Foremost among these strategies is the application of a new SPC strategy for robust-like optimizations; an example of which is present in FIGS. 31A–33; which portrays a typical schematic analysis diagram for a conditional SPC example. Other sample optimizations may be constructed automatically by running the prototype (of appendix 1) on a sample database (also in appendix 1) or on another database of equivalent form.

Taking a simple typical non-limiting example, like those from the matrix of typical examples presented in the ADVANTAGES, OBJECTS AND BENEFITS OF THE INVENTION section, the 7 layer model of the present invention is applied to a system having two interconnected processing machines: a cutting machine (cutter) which is then followed by a polishing machine (polisher).

The process map is of simple linear directed graph topology having initial input connected to the cutter connected in turn to the polisher connected in turn to the final output.

More specifically, there are two input parameters measured by sensors at the input to the cutter, a further two interim parameters measured by sensors between the cutter and the polisher, and a further two parameters measured by sensors at the final output. Experts have suggested that these sensors measure the only really significant factors in the processing.

Additionally there are two controllable actuators in the cutter and a further two controllable actuators in the polisher. In this context, actuators relate to controllable parameter driven mechanical aspects of the respective cutting and polishing action processes.

Thus, an initial Knowledge Tree presents two input factors to the cutter, two interim factors between the cutter and the polisher, two output factors from the polisher, and furthermore two actuator inputs to the cutter and an additional two actuator inputs to the polisher.

Using the protocol of the present invention, the sensors and actuators are connected (e.g. directly or via a LAN) to Layer 1. The description of the process map and of the expert suggested relationships are contained in data sets input on a first data storage device and likewise connected to Layer 1. Furthermore, data sets containing data collected by the sensors and actuators are stored on a second data storage device and likewise connected to Layer 1. The index for each of the data sets is maintained in Layer 3; initialization and updates being provided using the services of Layer 2. In Layer 4, an initial Knowledge tree is assembled from the index of the first storage device.

In Layer 5, validation of each interconnection cell of the Knowledge Tree is performed by computing a causality metric between respective inputs and outputs of each interconnection cell, the data being provided using the index of the second data storage device. This computing may be performed using standard SPC or using conditional SPC of the present invention or using substantially any of the appropriate prior art methods as described for other uses in the Background Section. Insufficiently valid inputs, interim measurements, or outputs may be deleted from the Knowledge Tree. The result is a first version validated Knowledge Tree, which may be used as an Empirical Controller for on-line alarm or report generation from the operating cutting and polishing process.

A process control engineer may consider this Knowledge Tree and propose that a measurement recorded as input to the cutter may hypothetically be of significance as input to the polisher. This hypothetical input to the polishers interconnection cell of the Knowledge Tree is articulated in Layer 6 and directed to Layer 5 for testing; using the empirical data services provided by lower layers. Alternatively, Layer 6 may be used to actually modify and test a change in one of the actuators; since the method of the present invention is not limited nor restricted to theoretical type simulations and their respective validations. In either scenario, if the results are of greater validity and productivity than those of the present validated Knowledge Tree, then the Knowledge Tree may be modified to reflect these results; and the cutting and polishing process modified accordingly.

Finally, a combinatorial algorithm in Layer 7 may be used to articulate all possible combinations and relationships between sensors and actuators; the considerations of how most effectively to generate or consider these combinations may be strategically input; and, in the presence of surplus computational resources, these combinations may be evaluated in Layer 6 (where it is certified that they have not yet or recently been considered), and thereafter forwarded to Layer 5 for actual testing—again either (preferably) against existing empirical data, or (alternatively) by altering the actual process of cutting and polishing.

Operationally, assuming there is no topological change between the expert complimented KT and the validated KT, using conditional SPC of the present invention, a specific combination of sensor derived values for an item entering the cutter will return, from the currently validated KT, actuator values for the cutter. These sensor and actuator history notes on the item are combined with the interim sensor derived values to generate, from the currently validated KT, actuator values for the polisher. Looking at the entire process according to its ultimate goals, each of the respective actuator values was selected in the currently validated KT because they combine to arrive at the most desirable final, after the polisher, sensor values. Essential here is to appreciate that this goal directed methodology is derived from n-tupling of sensor and/or actuator values; and not by narrowing tolerances for actuators or sensors in any independent or arbitrary manner. Stated simply, the intersection of input parameters (e.g. sensor and or actuator parameters) that produces acceptable or optimal yield outputs is generally not a simple rectangular region. Usually it is a complex surface or manifold as is expected in the original neural network-type examples. Accordingly, a selective consideration of n-tuplings defines the actual productive intersection region more precisely. Generally, a proliferation of n-tuplings by increasing the number of discrete regions in each respective parametric representation (e.g. in the mean plus/minus 2 or 3 standard deviations) will increase the respective yield for the process; using the conditional SPC methods of the present invention.

What is claimed is:

1. A modeling and control system for representing a manufacturing process as a quantified prediction model, said model comprising nodes, and having definable relationships between said nodes, where said nodes include inputs and outputs of said process, and using said representation to control said manufacturing process, said system comprising:
   a validator, for validating relationships by analyzing data; and
   a simulator, for simulating process performance of said manufacturing process using said validated relationships;
   thereby to provide said quantified prediction model for at least feed forward control of operation of said manufacturing process.

2. A modeling system according to claim 1, said nodes being inputs and outputs of said manufacturing process, and wherein said validator comprises:
   an input discretizer, for converting data having continuous values for said inputs into discretized data having discrete input values; and
   an output analyzer, for validating relationships between said inputs and said outputs by analyzing said discretized data.

3. A modeling system according to claim 2, wherein said relationships are statistical relationships.

4. A modeling system according to claim 1, further comprising:
   a data generator, for generating sample process data by interpolating between data sets giving process input and output values.

5. A modeling system according to claim 4, wherein said interpolation comprises linear interpolation.

6. A modeling and control system according to claim 1, wherein said manufacturing process is a semiconductor wafer manufacturing process.

7. A manufacturing process modeler for modeling a manufacturing process as a directed network of nodes for control of said process, wherein each node represents a relationship between inputs and outputs of a component of said manufacturing process, each node having at least one input and at least one output, and wherein said manufacturing process modeler comprises an input for qualitative definitions of inputs and interconnections for entry into said model and an output for outputting control instructions for controlled operation of said manufacturing process.

8. A process modeler according to claim 7, wherein at least one of said nodes corresponds to a physical component of said manufacturing process.

9. A process modeler according to claim 7, wherein at least one of said nodes corresponds to a logical component of said manufacturing process.

10. A process modeler according to claim 7, wherein an output of at least one of said nodes comprises an input to a separate node.

11. A process modeler according to claim 7, further comprising a network validator for applying empirical data to said network, thereby to validate the applicability of said network model to said manufacturing process.

12. A process modeler according to claim 11, wherein said network validator is further operable to identify non-influential elements of said network.

13. A process modeler according to claim 12, wherein at least one of said non-influential elements comprises one of a group of process elements comprising: an input, an output, and a node interconnection.

14. A process modeler according to claim 11, wherein said modeler is further operable to remodel said network if said validation shows that said network does not accurately model said manufacturing process.

15. A process modeler according to claim 7, further comprising a network quantifier for applying empirical data to said network, thereby to quantify relationships between said inputs and said outputs.

16. A process modeler according to claim 7, wherein said interconnections comprise known connections between nodes.

17. A process modeler according to claim 7, wherein said interconnections comprise postulated connections between nodes.

18. A process modeler according to claim 7, wherein said modeler is further operable to remodel said network to reflect changes to said manufacturing process.

19. A computerized modeling system for representing a manufacturing process as a quantified prediction model on a computer, said model comprising nodes, and having definable relationships between said nodes, wherein said nodes include inputs and outputs of said manufacturing process, said computerized system comprising:
- a validator, for validating relationships by analyzing data; and
- a simulator, for simulating process performance using said validated relationships;
- thereby to provide said quantified prediction model, said model being usable to provide at least feed forward control of said manufacturing process.

20. A computerized process modeler for modeling a manufacturing process as a directed network of nodes, wherein each node provides a virtual relationship between inputs and outputs of a component of said manufacturing process, each node having at least one input and at least one output, and wherein said process modeler comprises an input for qualitative definitions of inputs and interconnections for entry into said model, said model being useable to provide at least feed forward control of said manufacturing process.

21. A modeling and control system for representing a semiconductor manufacturing process as a quantified prediction model, said model comprising nodes, and having definable relationships between said nodes, wherein said nodes include inputs and outputs of said process, and using said representation to control actual outputs of said semiconductor manufacturing process, said system comprising:
- a validator, for validating relationships by analyzing data; and
- a simulator, for simulating process performance of said semiconductor manufacturing process using said validated relationships;
- thereby to provide said quantified prediction model for at least feed forward control of operation of said semiconductor manufacturing process, and using said validated relationships to set at least said actual outputs thereof.

22. A semiconductor manufacturing process modeler for modeling a semiconductor manufacturing process as a directed network of nodes for control of said process, wherein each node represents a relationship between inputs and outputs of a component of said semiconductor manufacturing process, each node having at least one input and at least one output, and wherein said semiconductor manufacturing process modeler comprises an input for qualitative definitions of inputs and interconnections for entry into said model and an output for outputting control instructions to a manufacturing unit for controlled operation of said semiconductor manufacturing process.

* * * * *